(12) United States Patent
Yasuhara et al.

(10) Patent No.: US 9,249,563 B2
(45) Date of Patent: Feb. 2, 2016

(54) MIXER TAP

(71) Applicant: Takagi Co., Ltd., Kitakyushu-shi, Fukuoka (JP)

(72) Inventors: Kazuma Yasuhara, Kitakyushu (JP); Naoki Ogata, Kitakyushu (JP)

(73) Assignee: Takagi Co., Ltd., Kitakyushu-shi (JP)

( * ) Notice: Subject to any disclaimer, the term of this patent is extended or adjusted under 35 U.S.C. 154(b) by 0 days.

(21) Appl. No.: 14/371,712

(22) PCT Filed: Oct. 1, 2012

(86) PCT No.: PCT/JP2012/075338
§ 371 (c)(1),
(2) Date: Jul. 10, 2014

(87) PCT Pub. No.: WO2013/105311
PCT Pub. Date: Jul. 18, 2013

(65) Prior Publication Data
US 2015/0000032 A1    Jan. 1, 2015

(30) Foreign Application Priority Data

Jan. 11, 2012  (JP) .................................. 2012-003135

(51) Int. Cl.
*E03C 1/04* (2006.01)
*F16K 31/60* (2006.01)
*F16K 35/04* (2006.01)
*F16K 11/078* (2006.01)

(52) U.S. Cl.
CPC ................. *E03C 1/0412* (2013.01); *E03C 1/04* (2013.01); *E03C 1/0404* (2013.01); *F16K 11/0787* (2013.01); *F16K 31/605* (2013.01); *F16K 35/04* (2013.01); *E03C 2001/0418* (2013.01)

(58) Field of Classification Search
CPC ..... E03C 1/04; E03C 1/0412; F16K 11/0787; F16K 31/605; F16K 35/04
USPC ....................................................... 4/675–678
See application file for complete search history.

(56) References Cited

FOREIGN PATENT DOCUMENTS

| JP | 06081383 | A  | 3/1994  |
|----|----------|----|---------|
| JP | 07280113 | A  | 10/1995 |
| JP | 07280113 | B2 | 10/1995 |
| JP | 2534571  | Y  | 4/1997  |
| JP | 2779792  | B2 | 5/1998  |
| JP | 2003129533 | A | 5/2003 |
| JP | 2003129535 | A | 5/2003 |
| JP | 3166820  | U  | 3/2011  |
| JP | 2012002346 | A | 1/2012 |

OTHER PUBLICATIONS

Japanese Patent Office, International Search Report of PCT/JP2012/075338, Dec. 21, 2012, 2 pages.

*Primary Examiner* — Tuan N Nguyen
(74) *Attorney, Agent, or Firm* — Alleman Hall McCoy Russell & Tuttle LLP

(57) ABSTRACT

A mixer tap is provided that includes: a lever; a temperature adjusting mechanism that enables adjusting a discharge water temperature by rotating the lever from side to side; a discharge amount adjustment mechanism that enables adjusting the discharge amount by rotating the lever back and forth; a side-to-side click mechanism that effects a side-to-side click feeling in association with rotation of the lever from side to side; and a back-and-forth click mechanism that effects a back-and-forth click feeling in association with rotation of the lever back and forth. In the mixer tap, a click feeling is varied depending on a lever back-and-forth position and/or a lever side-to-side position. The difference in the click feeling can provide a user with various items of information. This information allows the improvement of the convenience of the mixer tap.

11 Claims, 29 Drawing Sheets

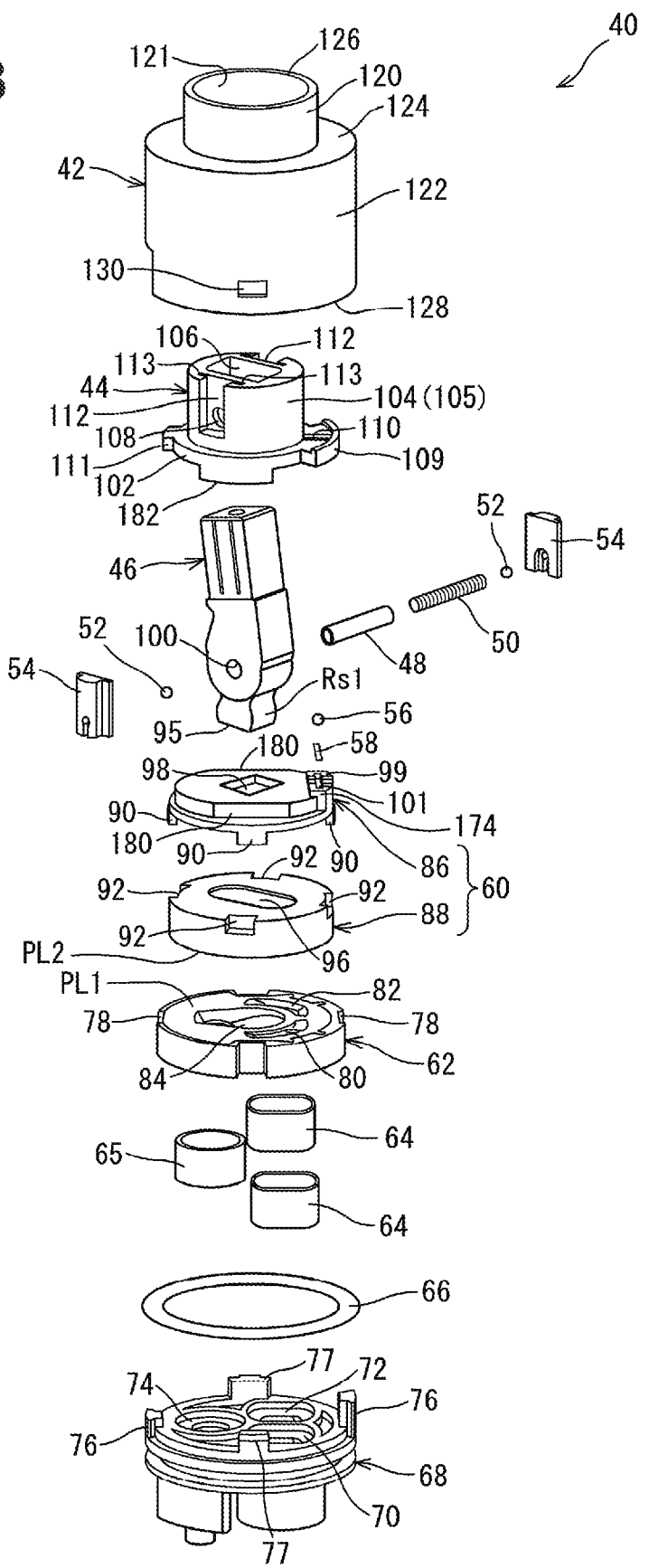

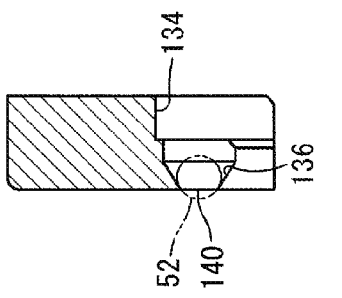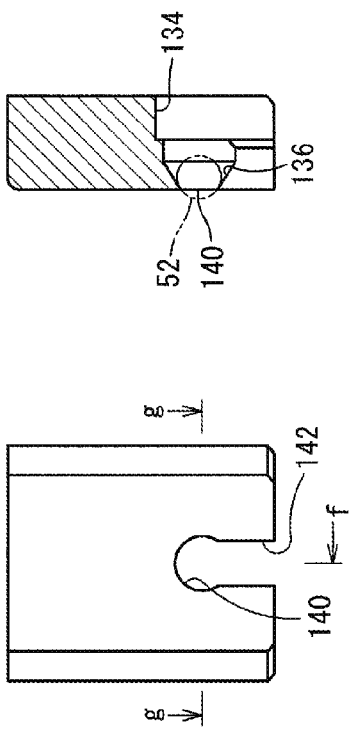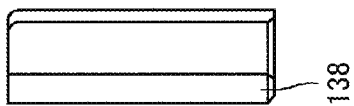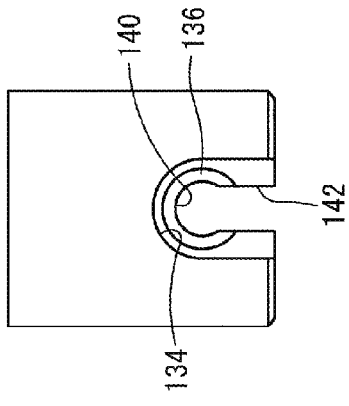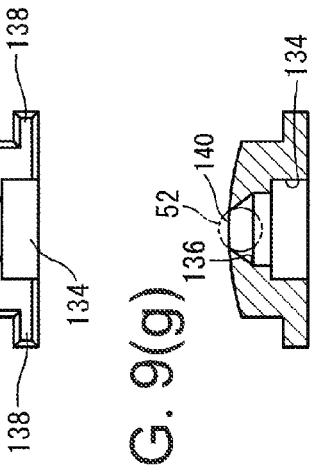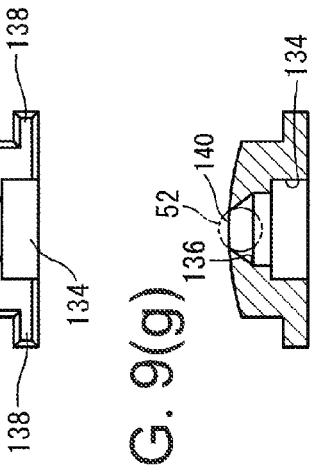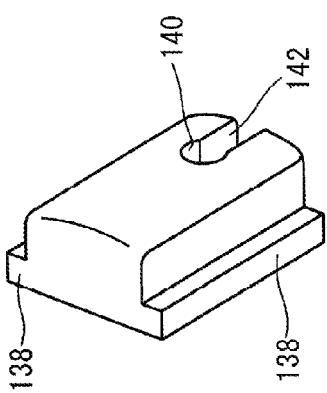

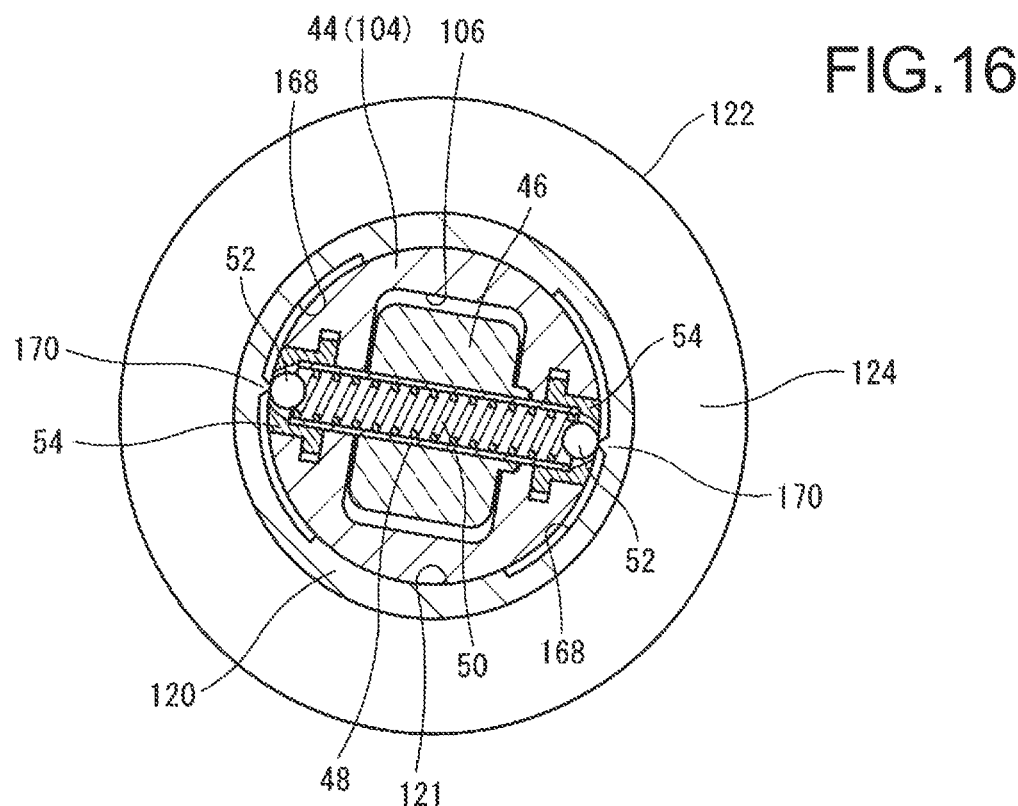
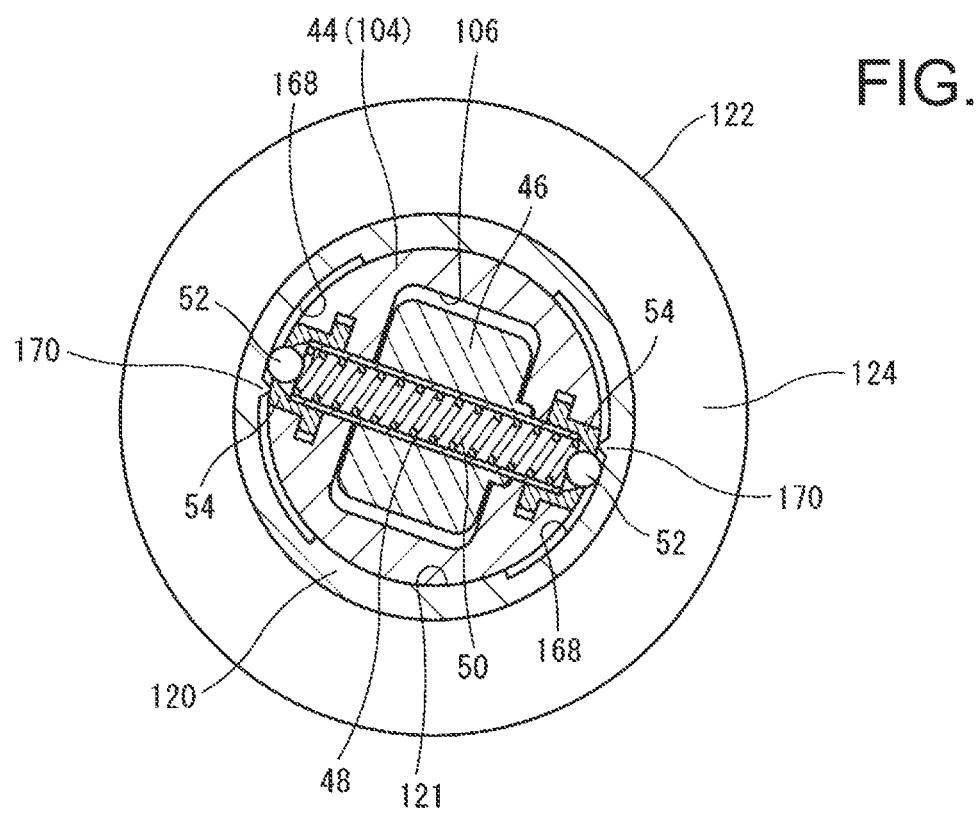

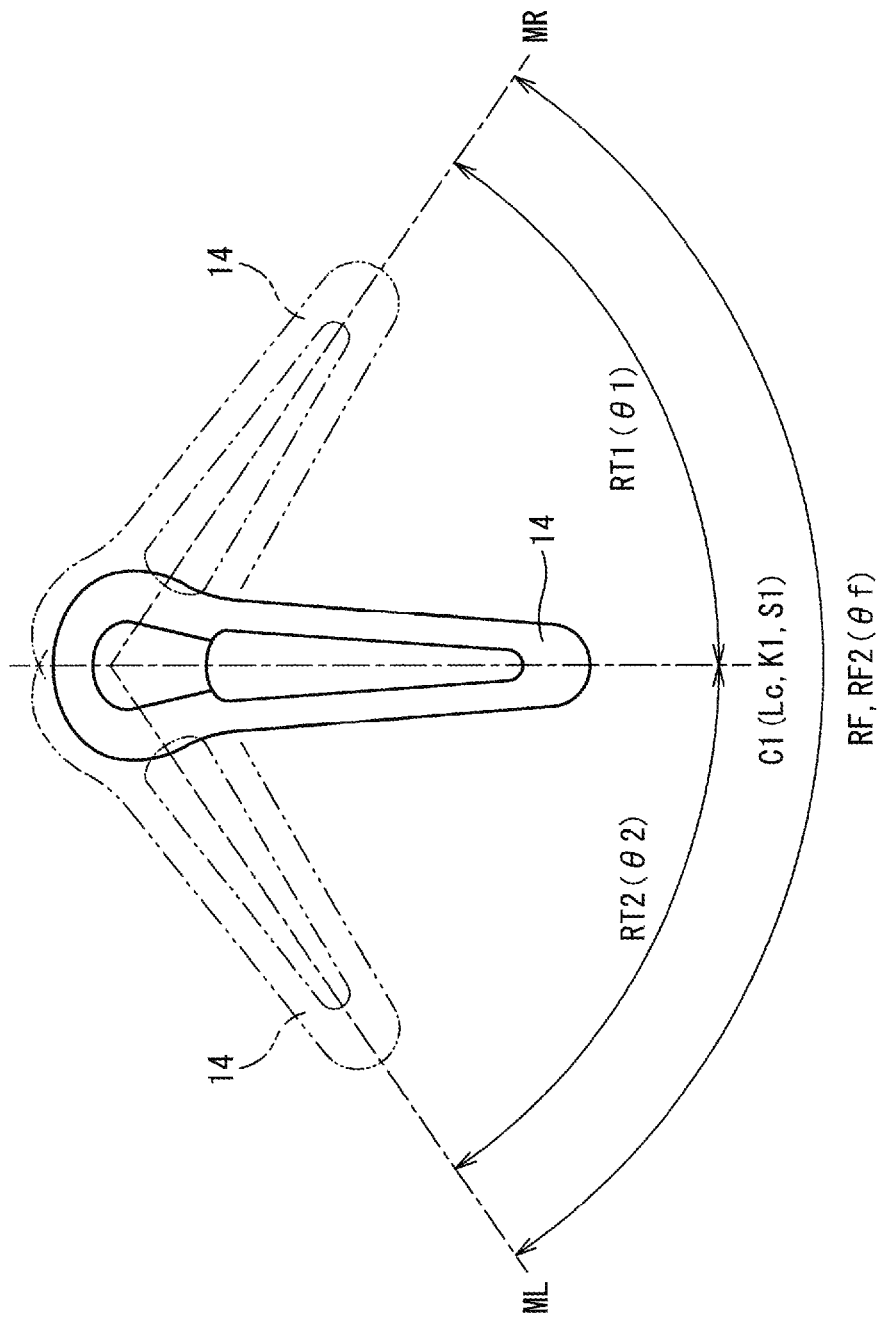

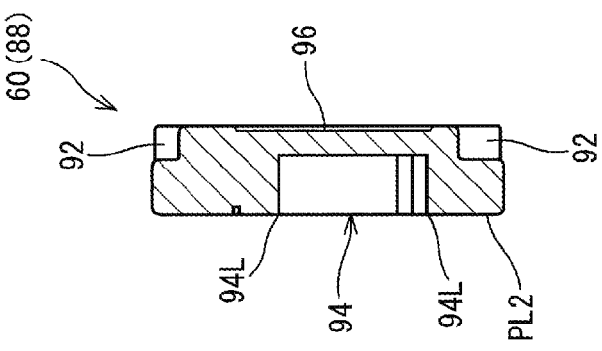
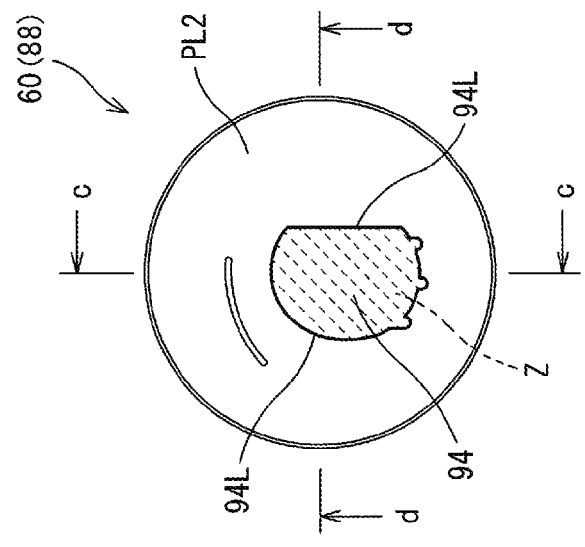
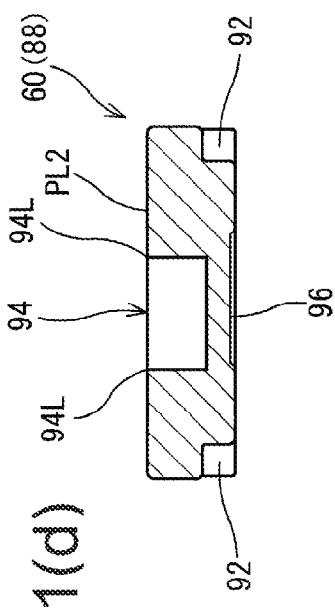
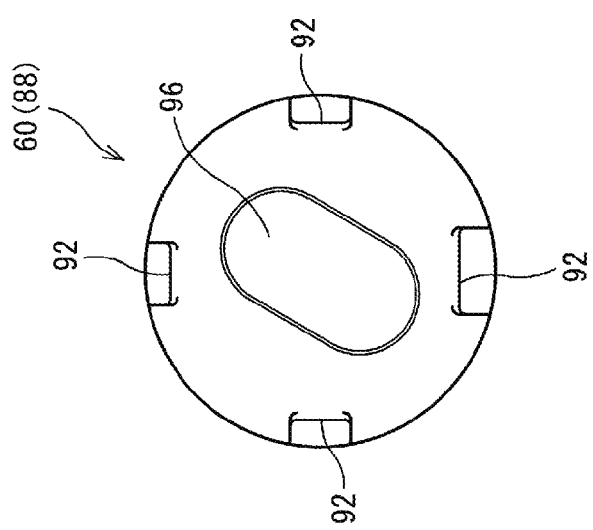

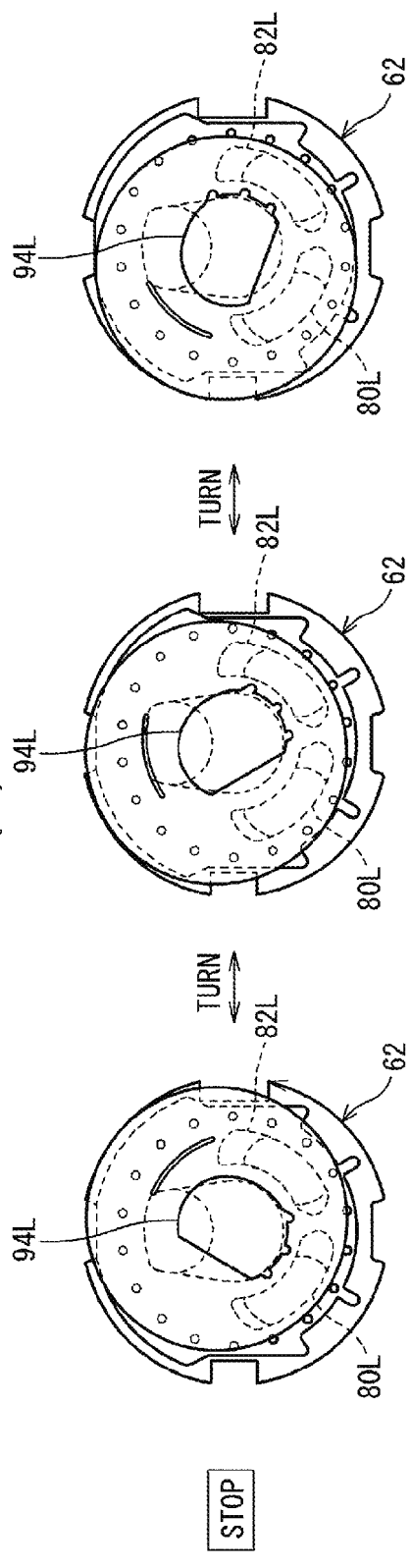

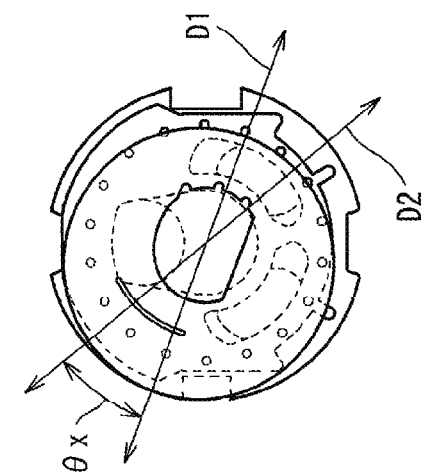
FIG. 23(a)
STOP
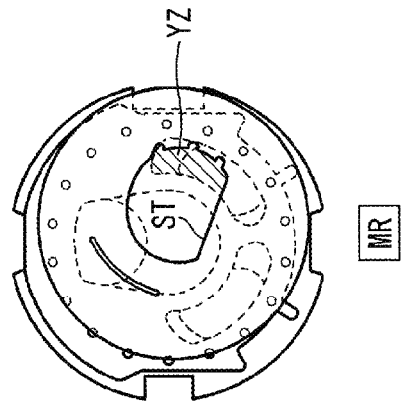
FIG. 23(c)
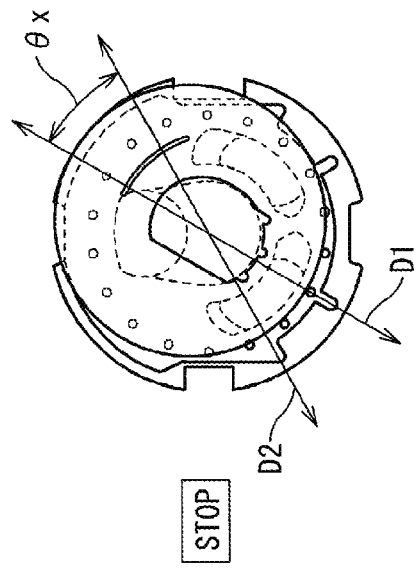
FIG. 23(e)
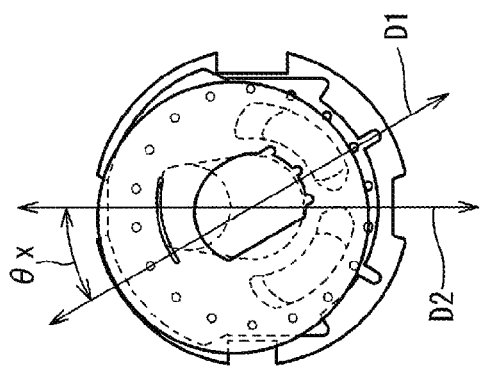
FIG. 23(b) →DISCHARGE
MAX
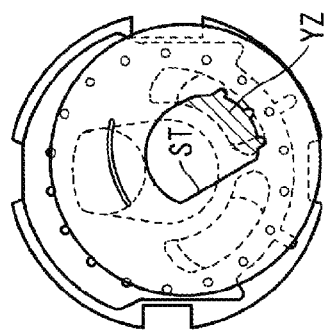
FIG. 23(d) →DISCHARGE
C1
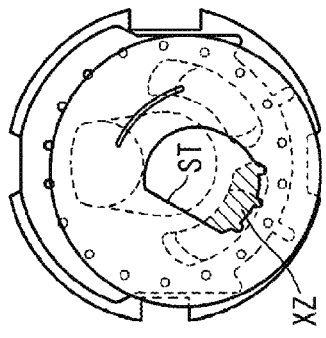
FIG. 23(f) →DISCHARGE
MR

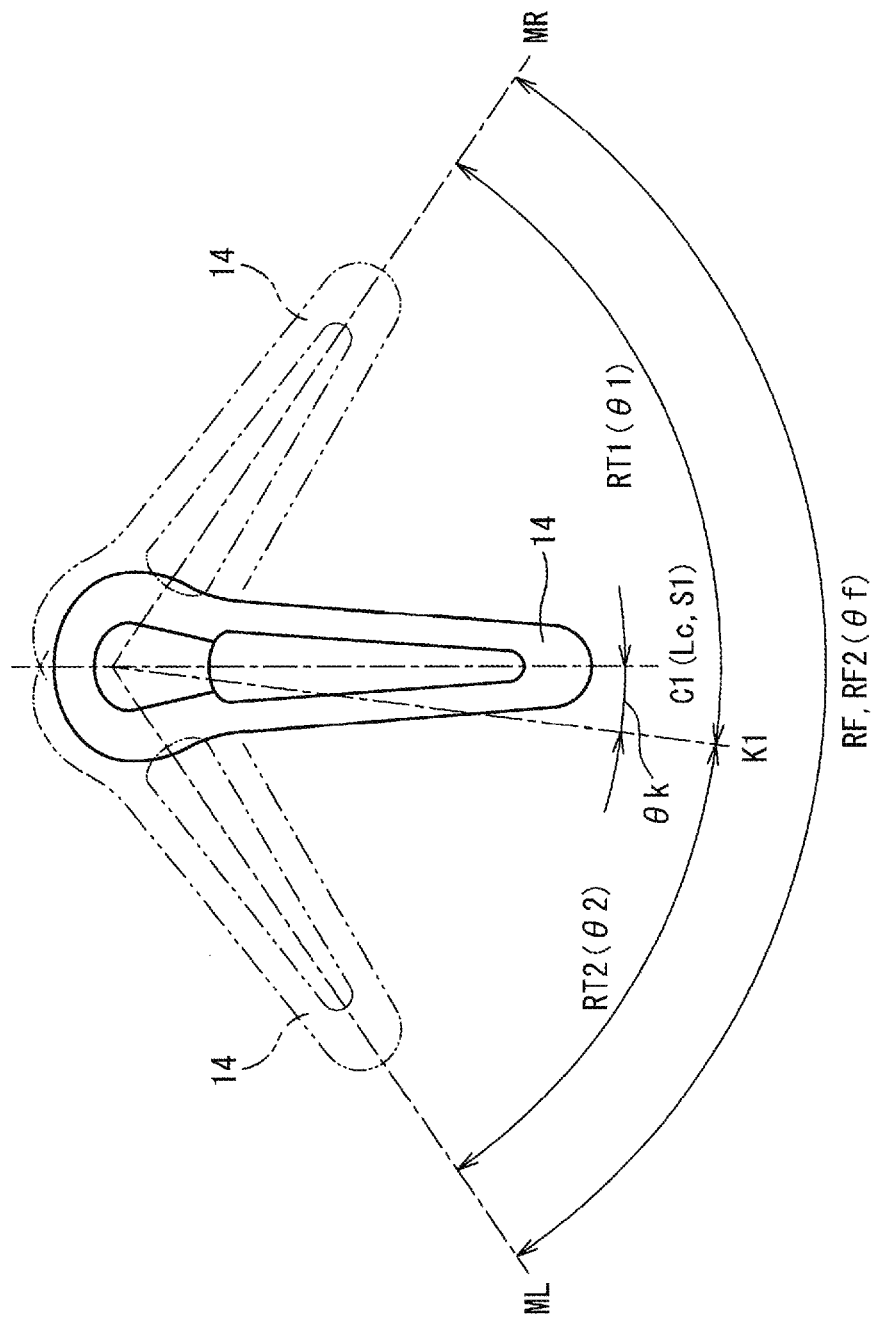

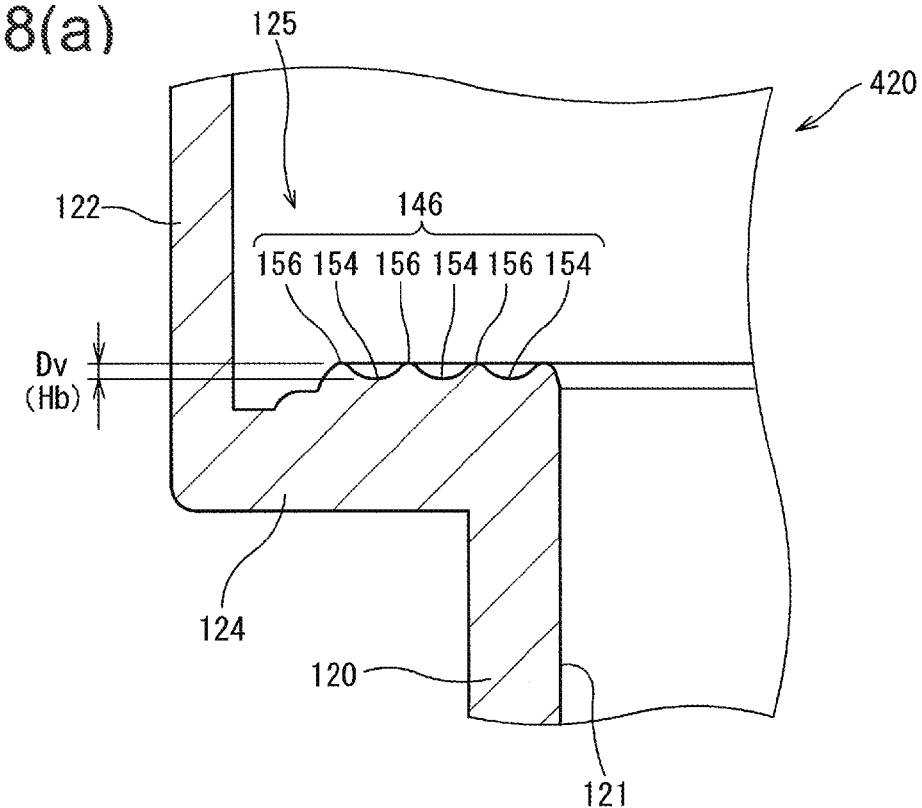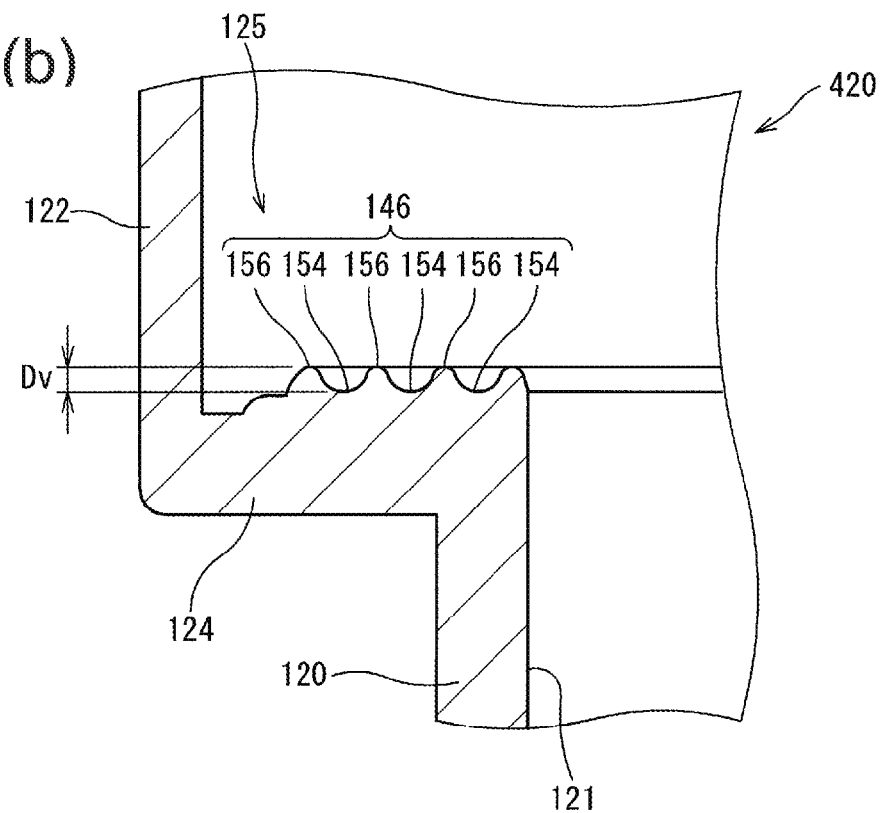

ically to a mixer tap.

MIXER TAP

TECHNICAL FIELD

The present invention relates to a mixer tap.

BACKGROUND ART

There is known a water tap in which the discharge amount and the mixing ratio between heated water and cold water can be adjusted by manipulating a handle. In a single lever mixer tap, heated water and cold water can be switched and the mixing ratio can be adjusted by turning a lever handle, and the discharge amount can be adjusted by manipulating the lever handle back and forth (by manipulating the lever handle up and down).

Some mixer taps include a click mechanism. Japanese Utility Model Registration No. 3166820 discloses a click mechanism in turning a lever. In this invention, the click mechanism is implemented in which a damping edge is formed on a damping spring plate in a nearly circular shape and the damping edge is fit into a bump portion. Japanese Patent No. 2779792 discloses a click mechanism in rotating a lever back and forth. In this invention, the click mechanism is implemented by engaging a plurality of recesses formed on both sides of a lever body with a projection formed on a plate spring.

Meanwhile, JP-A-2003-129535 discloses a single lever mixer tap that discharges water at a position at which the position of a lever handle faces a user. It is an object of this invention to prevent a user from unintentionally using mixed water and to aim for resource savings.

CITATION LIST

Patent Literature

Patent Literature 1: Japanese Utility Model Registration No. 3166820
Patent Literature 2: Japanese Patent No. 2779792
Patent Literature 3: JP-A-2003-129535

SUMMARY OF INVENTION

Technical Problem

A click feeling can provide a user with various items of information. It was revealed that a highly convenient mixer tap can be implemented by setting various click feelings.

It is an object of the present invention to provide a highly convenient mixer tap.

Solution to Problem

A preferable aspect of a mixer tap according to the present invention includes: a lever; a temperature adjusting mechanism configured to enable adjusting a discharge water temperature by rotating the lever from side to side; a discharge amount adjustment mechanism configured to enable adjusting a discharge amount by rotating the lever back and forth; a side-to-side click mechanism configured to effect a side-to-side click feeling in association with rotation of the lever from side to side; and a back-and-forth click mechanism configured to effect a back-and-forth click feeling in association with rotation of the lever back and forth. In the mixer tap, a click feeling is varied depending on a lever back-and-forth position and/or a lever side-to-side position.

Preferably, a difference in the click feeling is at least one selected from (A), (B) and (C), or a combination of two or more of (A), (B) and (C): (A) a back-and-forth click feeling is varied depending on a lever side-to-side position; (B) a back-and-forth click feeling is varied depending on a lever back-and-forth position; and (C) a side-to-side click feeling is varied depending on a lever side-to-side position.

Preferably, the mixer tap includes: a member X that is rotated in conjunction with side to side rotation of the lever and moved in conjunction with back and forth rotation of the lever; a member Y that is rotated in conjunction with rotation of the lever from side to side and not moved by rotating the lever back and forth; and a fixed member Z that is not moved in conjunction with any manipulations of the lever. Preferably, the back-and-forth click mechanism is configured using relative displacement between the member X and the fixed member Z. Preferably, the side-to-side click mechanism is configured using relative rotation between the member Y and the fixed member Z.

Preferably, the mixer tap includes: a mixer tap main body; a housing provided in the mixer tap main body; a fixed valve body provided in the housing and including a heated water valve hole, a cold water valve hole, and a discharge valve hole; a movable valve body slidably disposed on a top surface of the fixed valve body and including a passage forming recess and a lever engaging hole; a lever rotatable from side to side and back and forth; and a rotating body configured to rotatably support the lever back and forth. Preferably, the movable valve body is turned with respect to the fixed valve body by turning the lever, and a mixing ratio between heated water and cold water is adjustable by the turn of the movable valve body. Preferably, the movable valve body is moved with respect to the fixed valve body by rotating the lever back and forth about the lever shaft, and a discharge amount is adjusted by the movement. Preferably, the member X is the movable valve body. Preferably, the member Y is the rotating body. Preferably, the fixed member Z is the housing or the fixed valve body.

Preferably, the mixer tap includes: a mixer tap main body; a housing provided in the mixer tap main body; a fixed valve body provided in the housing and including a heated water valve hole, a cold water valve hole, and a discharge valve hole; a movable valve body slidably disposed on a top surface of the fixed valve body and including a passage forming recess and a lever engaging hole; a rotating body including a lever insertion hole penetrating in a vertical direction and a lever shaft holding hole penetrating in a lateral direction; a lever inserted into the lever insertion hole and including a lever shaft insertion hole; a lever shaft inserted into the lever shaft holding hole and the lever shaft insertion hole and configured to rotatably support the lever back and forth; an elastic member; and a contact member. Preferably, the movable valve body is turned with respect to the fixed valve body by turning the lever, and a mixing ratio between heated water and cold water is adjustable by the turn of the movable valve body. Preferably, the movable valve body is moved with respect to the fixed valve body by rotating the lever back and forth about the lever shaft, and a discharge amount is adjusted by the movement. Preferably, the elastic member is disposed on an upper side or a lower side of the movable valve body. Preferably, the contact member is supported by the elastic member. Preferably, an under surface of the housing or a top surface of the fixed valve body includes a contact surface enabled to contact the contact member supported by the elastic member. Preferably, the contact surface includes a recess and/or a projection. Preferably, the contact member is moved with respect to the contact surface in association with the movement of the movable valve body, engagement is made and engagement is released between the recess or the projection and the contact member in the movement, and the engagement or the releasing of engagement between the recess or the projection and the contact member causes the back-and-forth click feeling.

Advantageous Effects of Invention

It is possible to implement a highly convenient mixer tap caused by various click feelings.

BRIEF DESCRIPTION OF DRAWINGS

FIG. 8 is an exploded perspective view of the lever assembly;

FIGS. 9(a) to 9(h) are a shaft holder; FIG. 9(a) is a plan view, FIG. 9(b) is an inner front view, FIG. 9(c) is a side view, FIG. 9(d) is an outer front view, FIG. 9(e) is a bottom view, FIG. 9(f) is a cross-sectional view taken along line f-f in FIG. 9(d), FIG. 9(g) is a cross-sectional view taken along line g-g in FIG. 9(d), and FIG. 9(h) is a perspective view;

FIG. 16 is a cross-sectional view the same as FIG. 15, illustrating the state in which a side-to-side click ball is engaged with a projection;

FIG. 17 is a cross-sectional view the same as FIGS. 15 and 16, illustrating the state in which the engagement between the side-to-side click ball and the projection is released;

FIG. 19 is a diagram illustrative of an example of side-to-side rotation;

FIG. 21(a) is a plan view of a lower side member 88, FIG. 21(b) is a bottom view of the lower side member 88, FIG. 21(c) is a cross-sectional view taken along line c-c in FIG. 21(b), and FIG. 21(d) is a cross-sectional view taken along line d-d in FIG. 21(b);

FIGS. 22(a) to 22(f) are diagrams of the states in which the top surface opening line of the fixed valve body overlaps with the under surface opening line of a movable valve body, in which in FIG. 22(a), a lever side-to-side position is at a left limit position and a lever back-and-forth position is at a water stop position, in FIG. 22(b), the lever side-to-side position is at the left limit position and the lever back-and-forth position is at a maximum discharge position, in FIG. 22(c), the lever side-to-side position is at a center circumferential position and the lever back-and-forth position is at the water stop position, in FIG. 22(d), the lever side-to-side position is at the center circumferential position and the lever back-and-forth position is at the maximum discharge position, in FIG. 22(e), the lever side-to-side position is at a right limit position and the lever back-and-forth position is at the water stop position, and in FIG. 22(f), the lever side-to-side position is at the right limit position and the lever back-and-forth position is at the maximum discharge position;

FIGS. 23(a) to 23(f) are the same diagrams as FIGS. 22(a) to 22(f);

in FIG. 25(a), the lever back-and-forth position is at the maximum discharge position; in FIG. 25(b), the lever back-and-forth position is at the maximum discharge position; in FIG. 25(c), the lever back-and-forth position is at the water stop position; in FIG. 25(d), the lever back-and-forth position is at the water stop position;

FIG. 26 is a diagram illustrative of another example of side-to-side rotation;

FIG. 28(a) is a cross-sectional view taken along line A-A in FIG. 27, and FIG. 28(b) is a cross-sectional view taken along line B-B in FIG. 27;

DESCRIPTION OF EMBODIMENTS

In the following, the present invention will be described in detail based on a preferable embodiment with appropriate references made to the drawings.

Figure 1:
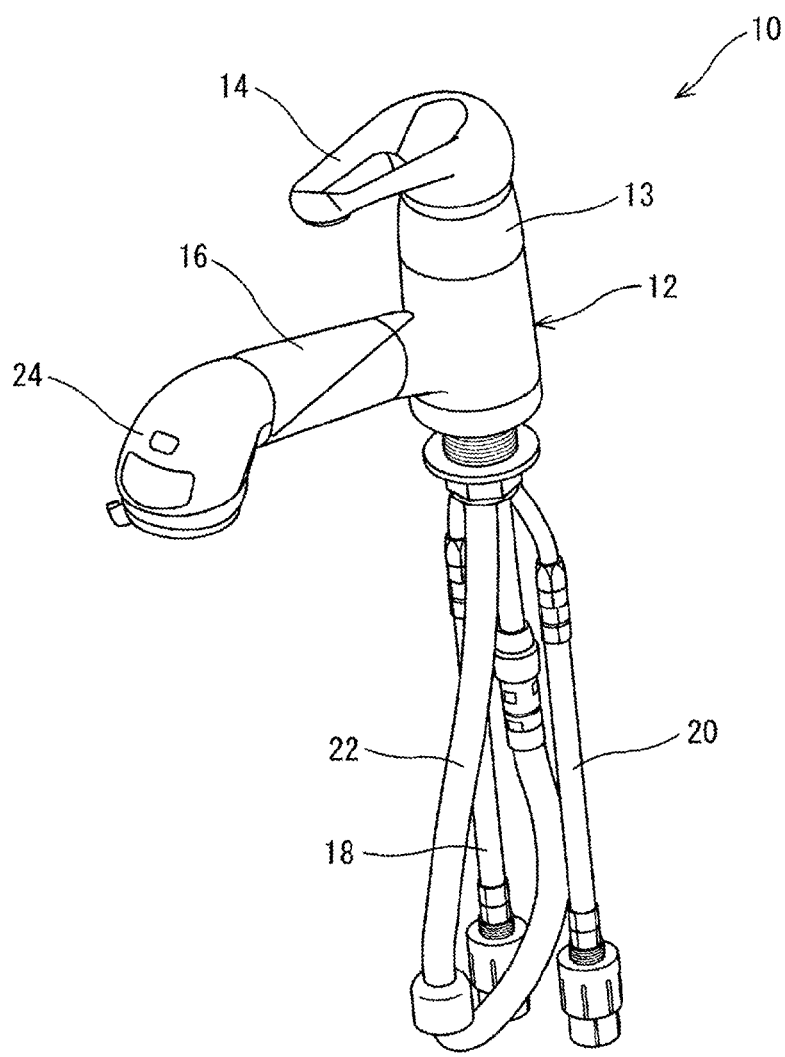
FIG. 1 is a perspective view of a mixer tap according to an embodiment of the present invention.
Figure 2:
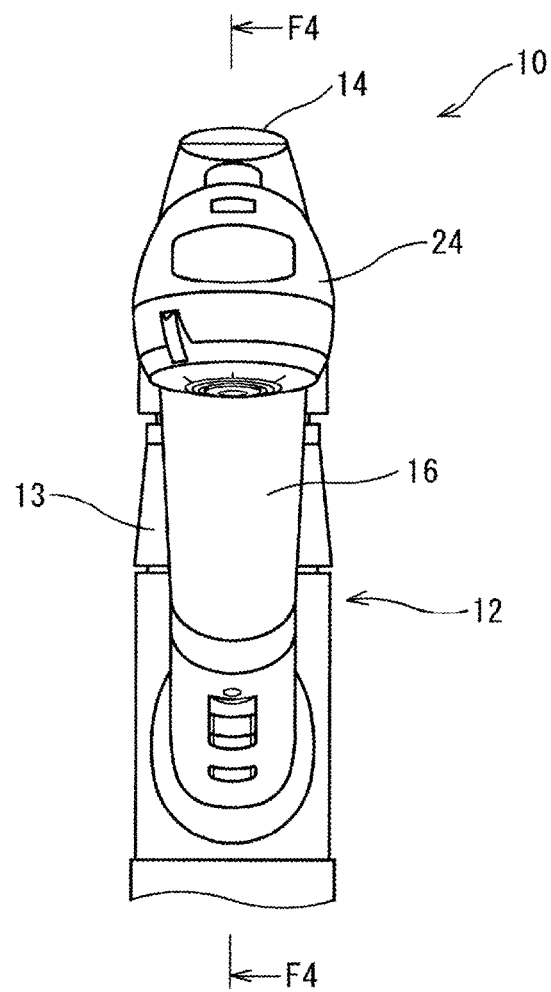
FIG. 2 is a front view of a part of the mixer tap in FIG. 1.
Figure 3:
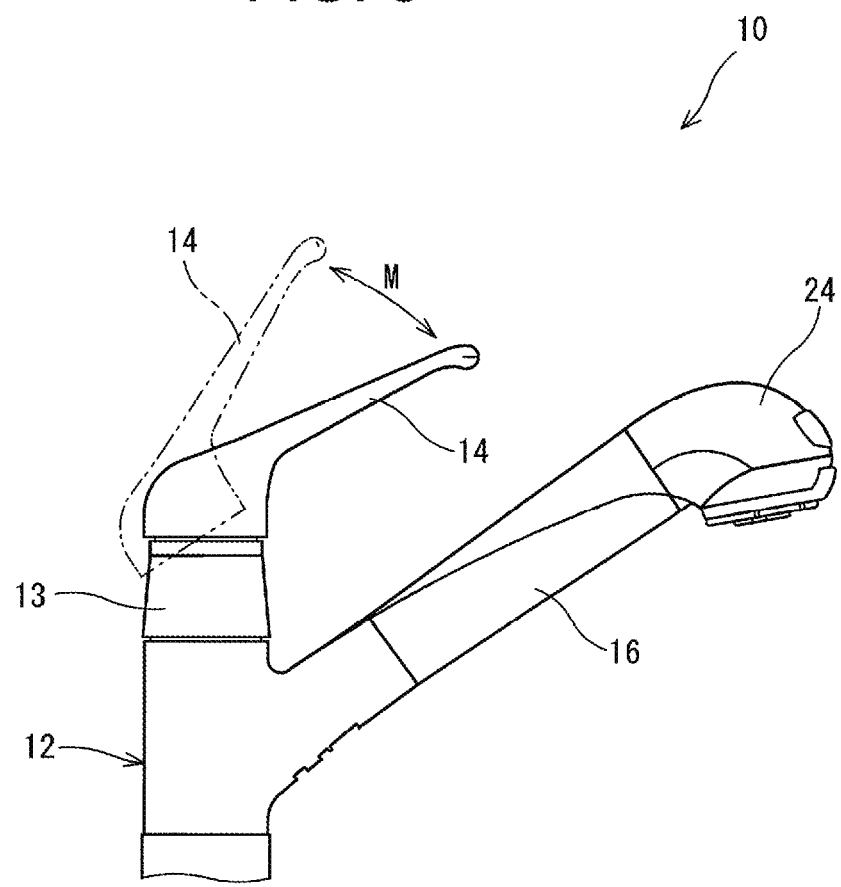
FIG. 3 is a side view of a part of the mixer tap in FIG. 1.

FIG. 1 is a perspective view of a mixer tap 10 according to an embodiment of the present invention. FIG. 2 is a front view of the upper part of the mixer tap 10. FIG. 3 is aside view of the upper part of the mixer tap 10. The mixer tap 10 includes a main body 12, a handle 14, a discharge portion 16, a heated water inlet pipe 18, a cold water inlet pipe 20, and a discharge pipe 22. A part of the main body 12 is covered with an outer cover 13. The discharge portion 16 includes a head 24. In the head 24, shower discharge and normal discharge can be switched. The mixer tap 10 is used in a kitchen, a washstand, or the like, for example.

The handle 14 is moved up and down to adjust the discharge amount (see an arrow M in FIG. 3). In the embodiment, the discharge amount is increased as the handle 14 is moved to the upper side. On the contrary, the discharge amount may be increased as the handle 14 is moved to the lower side. The handle 14 is turned to change the mixing ratio between heated water and cold water. The discharge water temperature can be adjusted by turning the handle 14.

Figure 4:
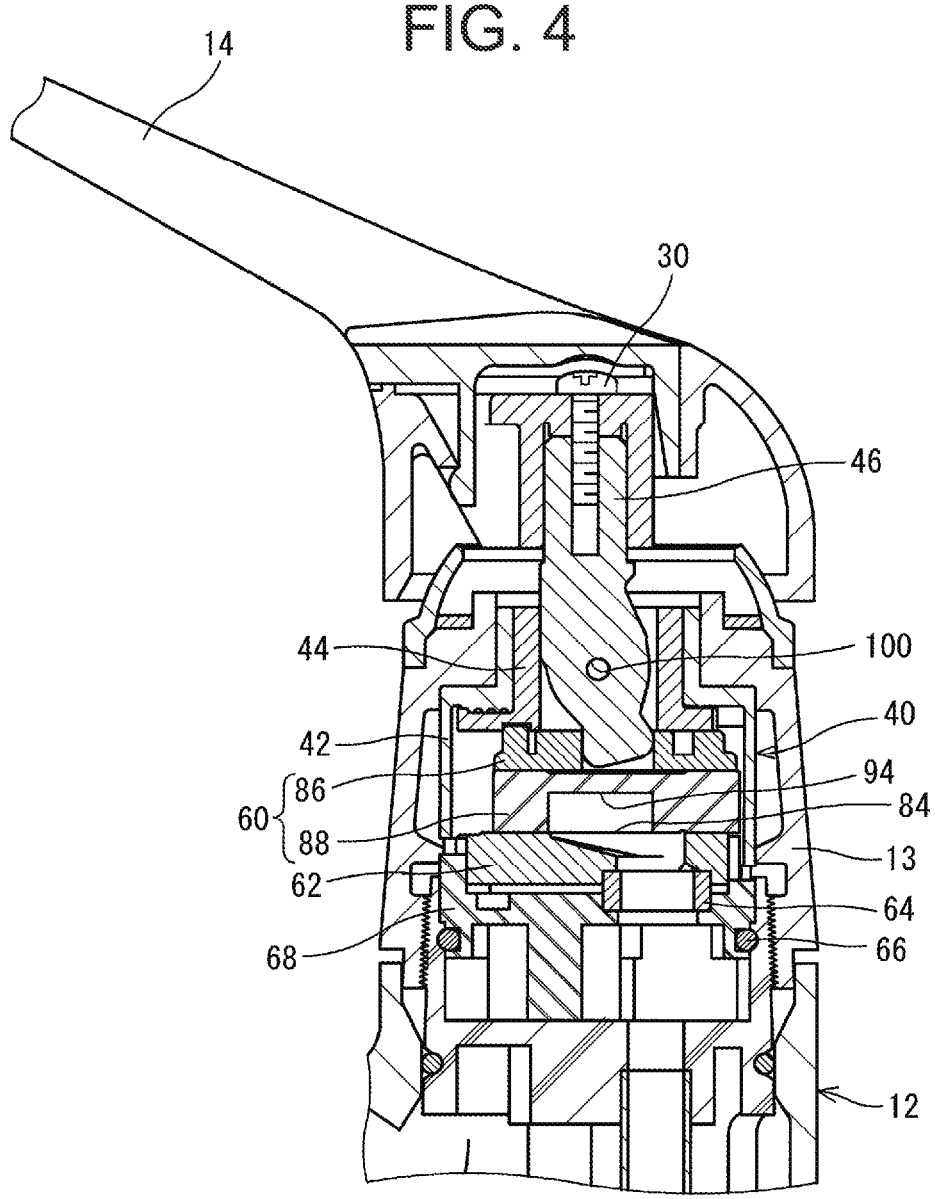
FIG. 4 is a cross-sectional view taken along line F4-F4 in FIG. 2.

FIG. 4 is a cross-sectional view taken along line F4-F4 in FIG. 2. The mixer tap 10 includes a lever assembly 40 in the inside. The lever assembly 40 is disposed in the outer cover 13. The handle 14 is fixed to a lever 46 with a screw 30.

Figure 5:
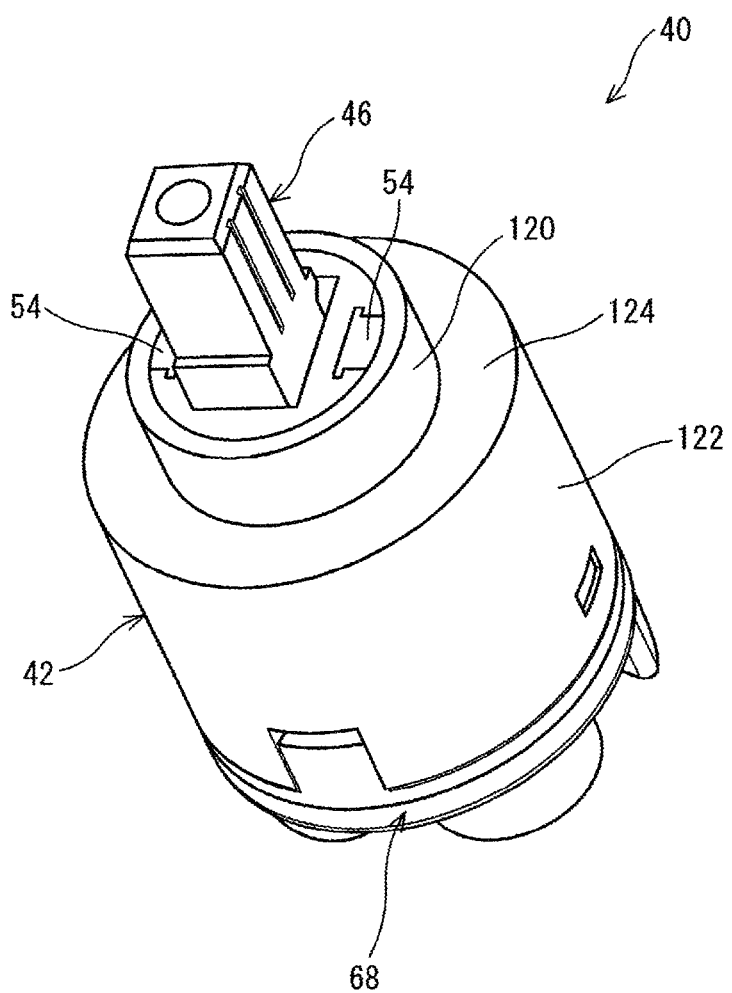
FIG. 5 is a perspective view of a lever assembly.
Figure 6:
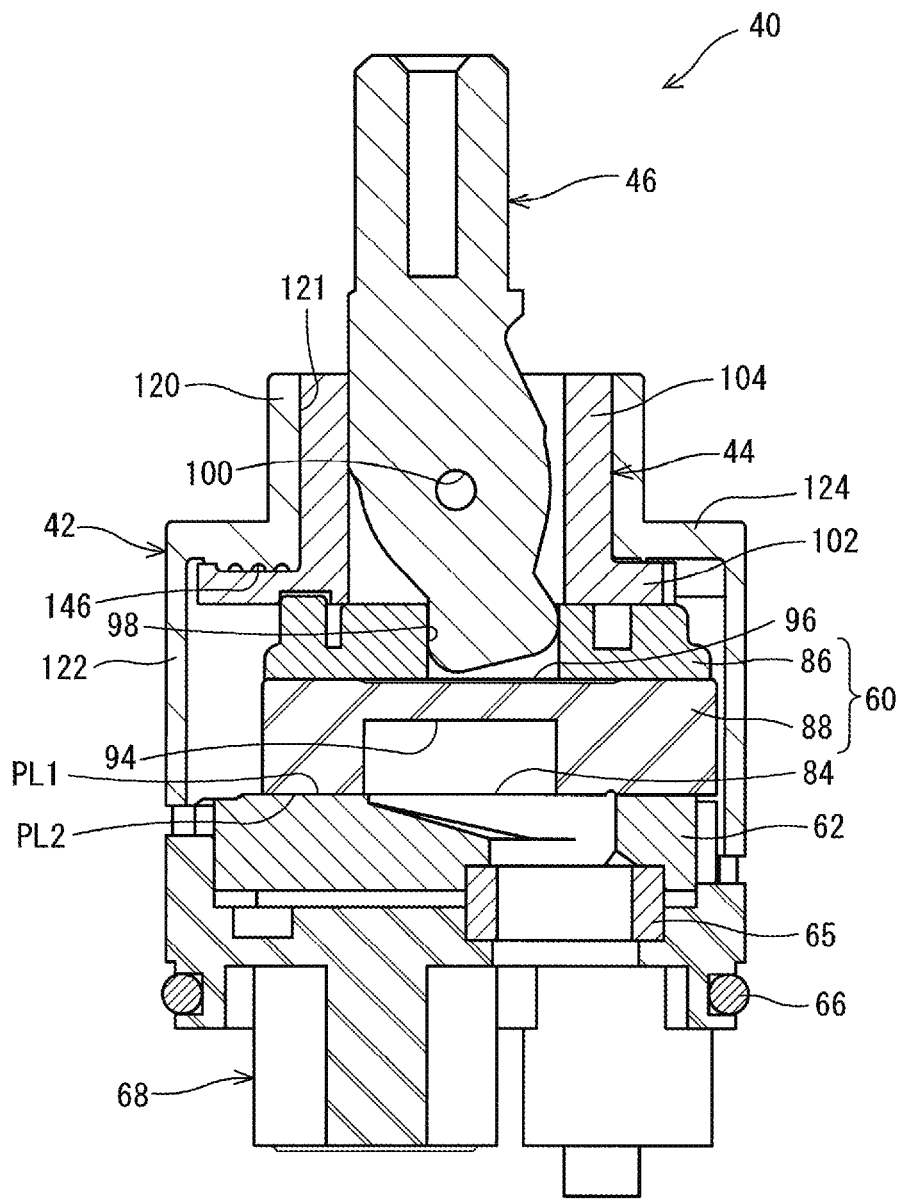
FIG. 6 is a cross-sectional view of the lever assembly taken along a plane vertical to a lever shaft.
Figure 7:
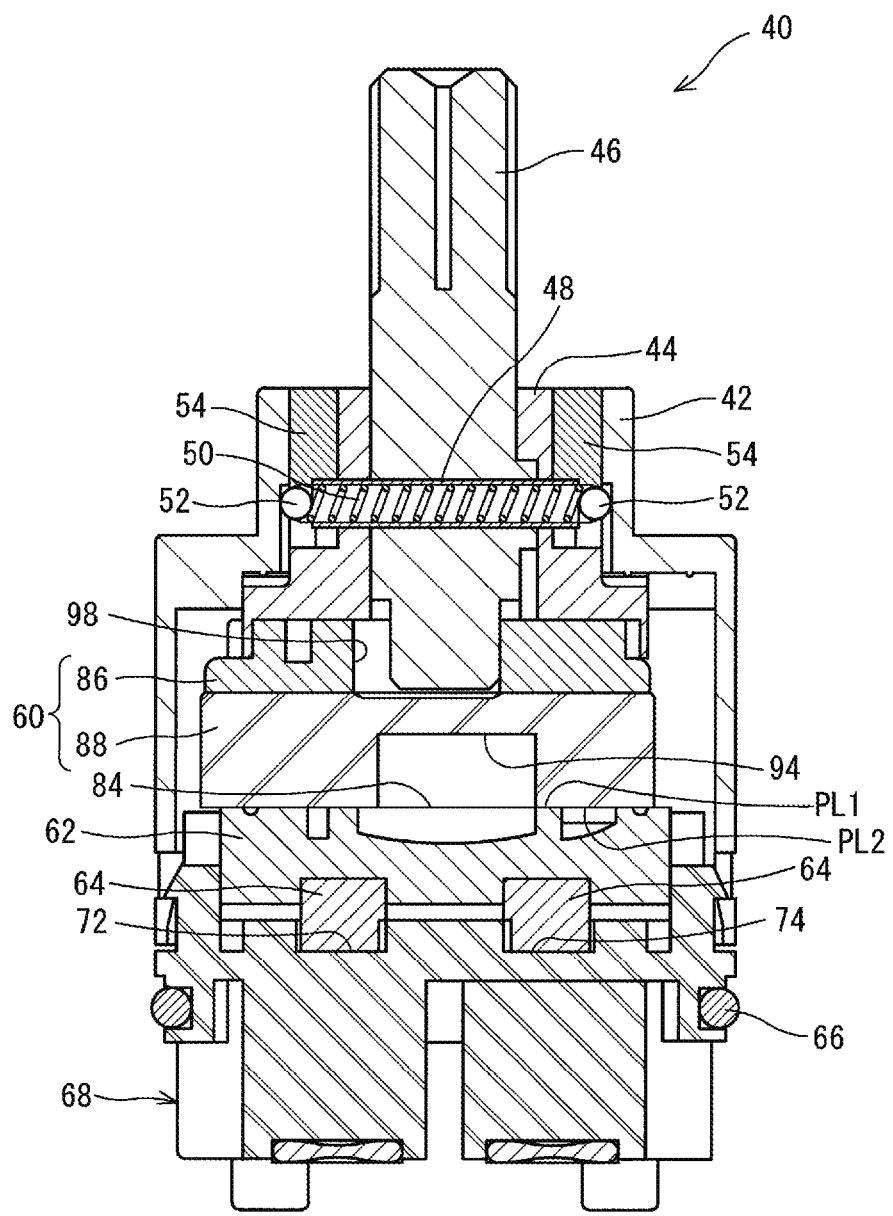
FIG. 7 is a cross-sectional view of the lever assembly and a longitudinal cross-sectional view taken along the center line of the lever shaft.

FIG. 5 is a perspective view of the lever assembly 40. FIG. 6 is a cross-sectional view of the lever assembly 40 along a cross section vertical to a lever shaft. FIG. 7 is a cross-sectional view of the lever assembly 40 along the lever shaft. FIG. 8 is an exploded perspective view of the lever assembly 40. The lever assembly 40 can be handled alone. In the mixer tap 10, the lever assembly 40 is replaceable.

As illustrated in FIG. 8 and other drawings, the lever assembly 40 includes a housing 42, a rotating body 44, the lever 46, a lever shaft 48, a side-to-side click elastic member 50, a side-to-side click ball 52, a shaft holder 54, a back-and-forth click ball 56, a back-and-forth click elastic member 58, a movable valve body 60, a fixed valve body 62, a packing 64, a packing 65, an O-ring 66, and a base body 68. The ball 52 and/or the ball 56 are exemplary contact members. The contact member is not limited to a ball. From the viewpoints of a smooth lever manipulation and a sensation of a click feeling, preferably, the contact member is a ball.

The elastic member 50 and the ball 52 configure an advancing/retracting mechanism for clicking from side to side. The ball 56 and the elastic member 58 configure an advancing/retracting mechanism for clicking back and forth.

The base body 68 includes a heated water inlet port 70, a cold water inlet port 72, and a discharge port 74. Openings corresponding to the heated water inlet port 70, the cold water inlet port 72, and the discharge port 74 are provided on the lower part of the base body 68, and the heated water inlet pipe 18, the cold water inlet pipe 20, and the discharge pipe 22 are individually connected to these openings.

The fixed valve body 62 is fixed on the upper side of the base body 68. The base body 68 is provided with an engaging projection 76 that fixes the fixed valve body 62 and an engaging projection 77 that fixes the housing 42. The fixed valve body 62 is provided with an engaging recess 78 that is engaged with the engaging projection 76.

The fixed valve body 62 includes a heated water valve hole 80, a cold water valve hole 82, and a mixed water valve hole 84. The heated water valve hole 80 is connected to the heated water inlet port 70 of the base body 68. The packing 64 keeps the watertight state of the connection. The cold water valve hole 82 is connected to the cold water inlet port 72 of the base body 68. The packing 64 keeps the watertight state of the connection. The mixed water valve hole 84 is connected to the discharge port 74 of the base body 68. The packing 65 keeps the watertight state of the connection.

The movable valve body 60 includes an upper side member 86 and a lower side member 88. The upper side member 86 is fixed to the lower side member 88. The fixing is made by the engagement between the projection 90 and the recess 92. In the embodiment, the upper side member 86 and the lower side member 88 are separate members. Therefore, the optimum material and a manufacturing method can be selected for each of the upper side member 86 and the lower side member 88. The movable valve body 60 may be integrally molded as a whole.

Although not illustrated in FIG. 8, a passage forming recess 94 is provided on the under surface of the lower side member 88 (see FIGS. 6 and 7). It is noted that a recess 96 is provided on the top surface of the lower side member 88 for avoiding the interference with a lower end 95 of the lever 46 (see FIG. 8).

A flat smooth surface PL1 is provided on the top surface of the fixed valve body 62 (see FIG. 8). The portion where the holes 82, 84, and 80 do not exist is the flat smooth surface PL1. Meanwhile, a flat smooth surface PL2 is provided on the under surface of the lower side member 88 (the movable valve body 60). The flat smooth surface PL2 is provided on the portion where the passage forming recess 94 is not formed. The surface contact between the flat smooth surface PL1 and the flat smooth surface PL2 secures the watertight state.

It is noted that as illustrated in FIG. 8, the packing 64 is in a pipe shape. However, in FIG. 7, the packing 64 is illustrated as though the packing 64 is a solid because of the cross-sectional position. In FIGS. 4 and 6, the lever shaft 48 and the elastic member 50 are omitted.

The top surface of the upper side member 86 is provided with a lever engaging recess 98 that is engaged with the lower end 95 of the lever 46. The lower end 95 of the lever 46 is inserted into the lever engaging recess 98. The movable valve body 60 is slid on the fixed valve body 62 in conjunction with the motion of the lever 46.

It is noted that the engagement between the lever 46 and the lever engaging recess 98 may be direct engagement or indirect engagement. For example, another member may be provided between the lever 46 and the lever engaging recess 98.

The top surface of the upper side member 86 is provided with an engaging projection 99 that can be engaged with the back surface of the rotating body 44. An elastic member disposing portion 101 is provided on the top surface of the engaging projection 99. This elastic member disposing portion 101 is a recess in almost the same shape as the back-and-forth click elastic member 58. The elastic member 58 (a plate spring) is accommodated in the elastic member disposing portion 101.

The lever 46 includes a shaft hole 100. The lever shaft 48 is inserted into the shaft hole 100. The lever shaft 48 is in a pipe shape, and includes a hollow portion. The side-to-side click elastic member 50 is inserted into the lever shaft 48. The elastic member 50 is a coil spring. The longitudinal length of the lever shaft 48 is almost the same as a longitudinal length L1 of the elastic member 50. The side-to-side click ball 52 is disposed at both ends of the lever shaft 48. The ball 52 is disposed on the opening of the hollow portion of the lever shaft 48. At the same time, the ball 52 is disposed at both ends of the elastic member 50. It is noted that the longitudinal length L1 of the elastic member 50 is the longitudinal length between both end portions of the elastic member 50 in the state in which the lever assembly is assembled, and a longitudinal length L2 of an elastic member 200, described later, is defined in the same state. The natural length of the elastic member 50 is longer than the length L1. The natural length of the elastic member 200 is longer than the length L2. The length L1 and the length L2 will be described later.

The rotating body 44 includes a base portion 102 and an upper part 104. The upper part 104 includes a lever insertion hole 106 and a shaft hole 108. The base portion 102 includes a ball through hole 110. This through hole 110 is a long hole. The base portion 102 is slidably mounted on (the upper side member 86 of) the movable valve body 60.

The upper part 104 includes an inserting portion 112 into which the shaft holder 54 is slid and inserted and a slide groove 113. The inserting portion 112 is provided at two opposite positions on the side surface of the upper part 104.

When the lever 46 is inserted into the lever insertion hole 106, the shaft hole 100 of the lever 46 and the shaft hole 108 of the rotating body 44 are coaxially disposed. The lever shaft 48 is inserted into the shaft hole 100 and the shaft hole 108. Moreover, the elastic member 50 is inserted into the lever shaft. The lever shaft 48 is inserted as above, and therefore the lever 46 is fixed to the rotating body 44 in the rotatable state. The dimensions of the lever insertion hole 106 are set so as to permit the rotation (back-and-forth rotation) of the lever 46. It is noted that in the present application, the rotation of the lever 46 that the lever shaft 48 is a rotation axis is also referred to as "back-and-forth rotation".

The housing 42 includes a small-diameter cylindrical portion 120, a large-diameter cylindrical portion 122, and a coupling portion 124. The coupling portion 124 extends in the radial direction of the housing 42. The small-diameter cylindrical portion 120 includes an upper opening 126. The large-diameter cylindrical portion 122 includes a lower opening 128.

The large-diameter cylindrical portion 122 includes an engaging hole 130. The engaging hole 130 is engaged with the engaging projection 77 of the base body 68. With this engagement, the housing 42 is fixed to the base body 68.

The outer diameter of the circumferential surface of the upper part 104 of the rotating body 44 is nearly equal to the inner diameter of the small-diameter cylindrical portion 120. The upper part 104 of the rotating body 44 is held on the small-diameter cylindrical portion 120 in the rotatable state. In the rotation, an outer circumferential surface 105 of the upper part 104 is slid on an inner circumferential surface 121 of the small-diameter cylindrical portion 120. It is noted that when the shaft holder 54 is fit into the inserting portion 112, the outer surface of the shaft holder 54 forms a circumferential surface almost the same as the circumferential surface of the upper part 104. Thus, the shaft holder 54 does not interfere with the rotation of the rotating body 44.

The large-diameter cylindrical portion 122 accommodates the base portion 102 of the rotating body 44, the movable valve body 60, and the fixed valve body 62.

FIGS. 9(a) to 9(h) illustrate the shaft holder 54. FIG. 9(a) is a top view. FIG. 9(b) is a plan view seen from the inner side. FIG. 9(c) is a side view. FIG. 9(d) is a plan view seen from the outer side. FIG. 9(e) is a bottom view. FIG. 9(f) is a cross-sectional view taken along line f-f in FIG. 9(d). FIG. 9(g) is a cross-sectional view taken along line g-g in FIG. 9(d). FIG. 9(h) is a perspective view.

The shaft holder 54 includes a lever shaft holding portion 134, a ball holding portion 136, a rail 138, a ball protruding opening 140, and a notch 142. The rail 138 is inserted into the slide groove 113, and therefore the shaft holder 54 is mounted on the inserting portion 112 of the rotating body 44. The state in which the shaft holder 54 is mounted on the inserting portion 112 is also referred to as the mounting state. In the mounting state, the lever shaft holding portion 134 holds the end portion of the lever shaft 48. In the mounting state, the ball holding portion 136 holds the ball 52. The ball 52 is always biased by the elastic member 50 regardless of the presence or absence of the engagement with a projection 170 (described later). The ball 52 is pressed outwardly by the elastic member 50. The ball 52 is pressed against the ball holding portion 136 by the elastic member 50. As illustrated in FIGS. 9(f) and 9(g), a part of the ball 52 protrudes out of the opening 140. This protrusion can effect a side-to-side click feeling. The diameter of the opening 140 is made smaller than the ball 52. The diameter of the opening 140 is set in consideration of the protruding amount of the ball 52 in such a way that a side-to-side click feeling can be effected.

The shaft holder 54 may not be used. The portion corresponding to the shaft holder 54 may be a part of the rotating body 44. Furthermore, a single shaft holder 54 may be provided. That is, the portion corresponding to one of these two shaft holders 54 may be apart of the rotating body 44. However, when the shaft holder 54 is provided, the rotating body 44 is easily mounted on the lever 46. This mounting includes the steps below.

(Step a): The lever shaft 48 into which the elastic member 50 is inserted is inserted into the shaft hole 100 and the shaft hole 108. Alternatively, the lever shaft 48 is inserted into the shaft hole 100 and the shaft hole 108, and the elastic member 50 is inserted into the lever shaft 48.

(Step b): After Step a above, the balls 52 are disposed at both ends of the lever shaft 48 (the elastic member 50).

(Step c): After Step b above, these two shaft holders 54 are individually inserted into the inserting portions 112.

In Step b above, grease, for example, is used to temporarily fix the two balls 52 at both ends of the elastic member 50. After that, Step c above is performed. In this mounting, as illustrated in Step b above, the balls 52 can be directly disposed at both ends of the elastic member 50. The shaft holder 54 is used, so that the ease of assembly is achieved.

As described above, the shaft holder 54 includes a notch 142. This notch 142 prevents the ball 52 from falling out in Step c above. That is, the disposition of the balls 52 in Step b tends to be maintained in Step c. Thus, the ease of assembly is further improved.

Figure 10:
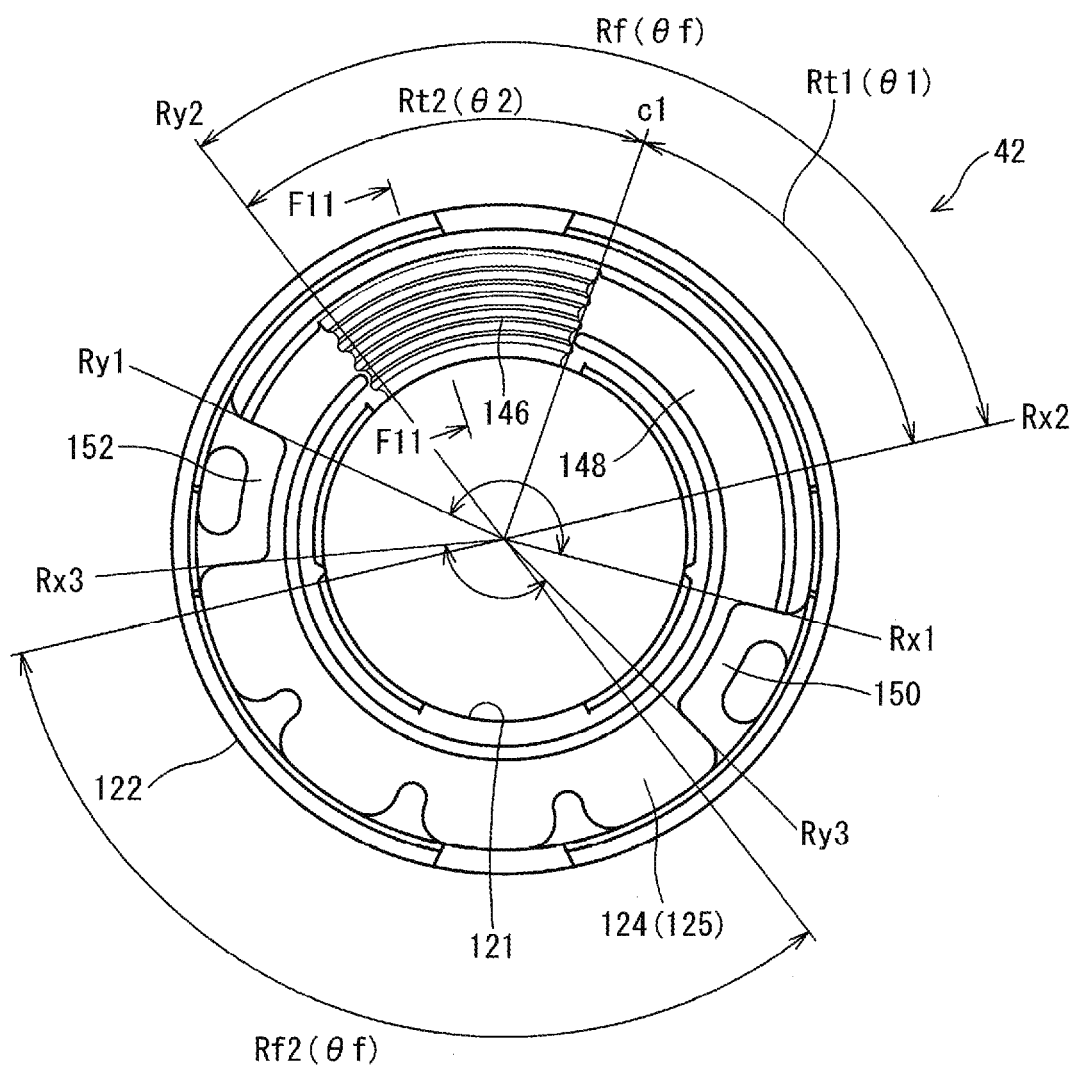
FIG. 10 is a bottom view of a housing.

FIG. 10 is a bottom view of the housing 42 seen from below. Therefore, FIG. 10 illustrates an under surface 125 of the coupling portion 124. The under surface 125 of the coupling portion 124 includes a click effecting portion 146 and a click ineffective portion 148. Moreover, the under surface 125 includes a first stopper 150 and a second stopper 152.

The base portion 102 of the rotating body 44 contacts the under surface 125 of the coupling portion 124. When the rotating body 44 is rotated, the base portion 102 is slid on the under surface 125. The first stopper 150 and the second stopper 152 regulate the rotation range of the rotating body 44.

Figure 11:
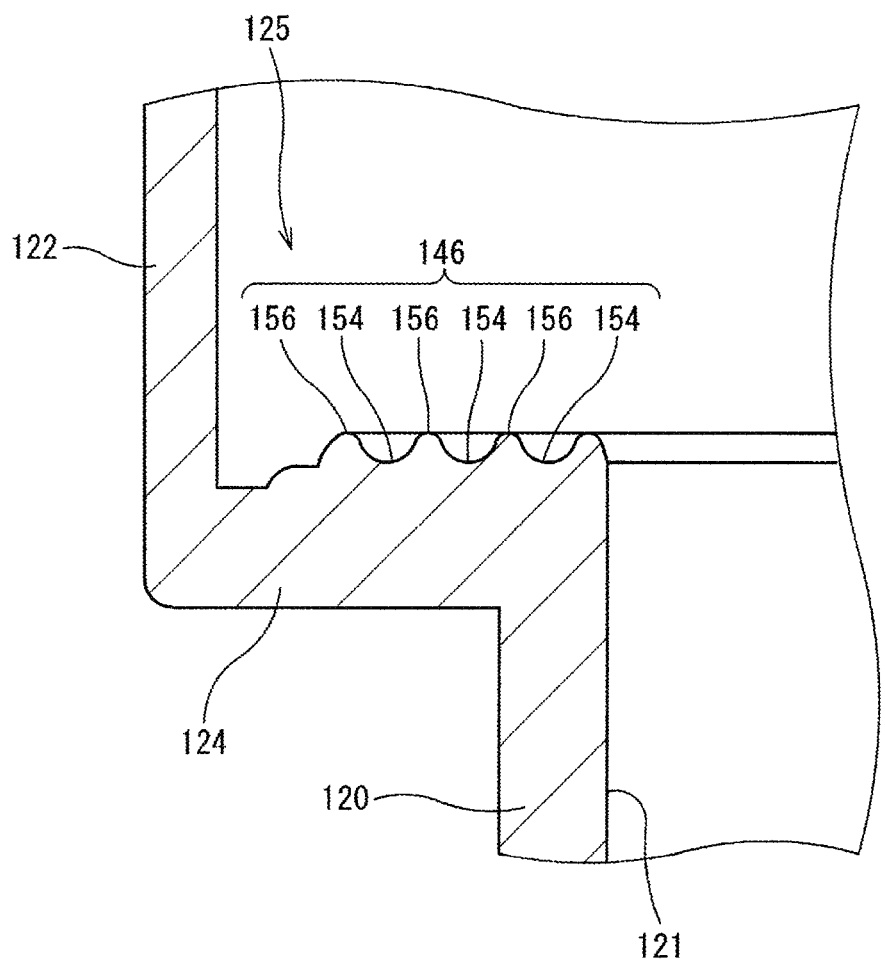
FIG. 11 is a cross-sectional view taken along line F11-F11 in FIG. 10.

FIG. 11 is a cross-sectional view taken along line F11-F11 in FIG. 10. FIG. 11 is a cross-sectional view of the click mechanism effecting portion 146. It is noted that in FIG. 11, the click mechanism effecting portion 146 is shown upside down to the normal use state (FIG. 8). That is, in FIG. 11, the under surface 125 of the coupling portion 124 is on the upper side.

The click mechanism effecting portion 146 includes a plurality of grooves 154. The click mechanism effecting portion 146 includes a plurality of projecting rims 156. The grooves 154 and the projecting rims 156 extend along the circumference of a circle. The groove 154 is an exemplary recess. The projecting rim 156 is an exemplary projection.

Figure 12:
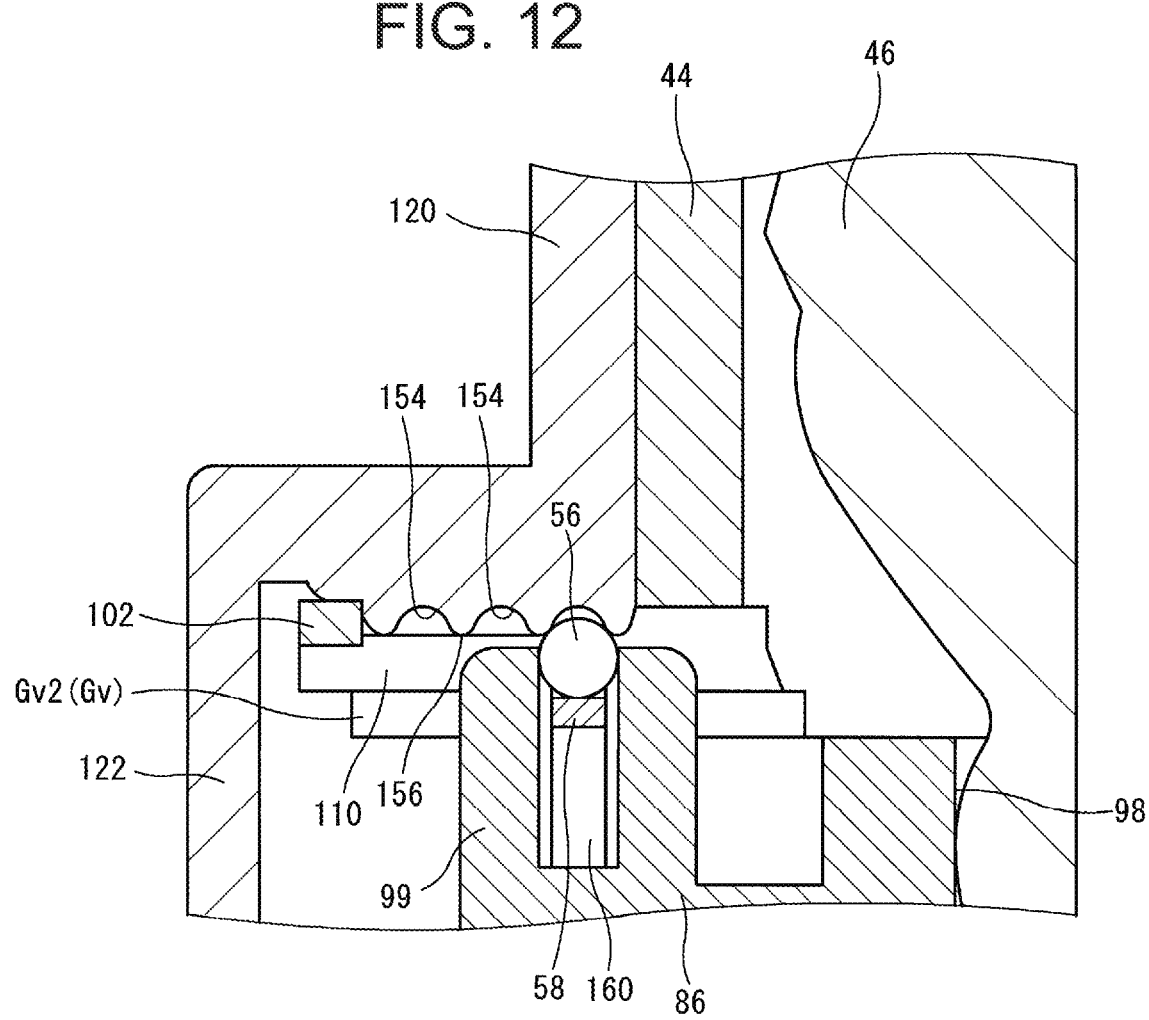
FIG. 12 is an enlarged cross-sectional view of the lever assembly at a position including a back-and-forth click ball.

FIG. 12 is a cross-sectional view of the lever assembly 40 at a position at which the back-and-forth click ball 56 exists. The back-and-forth click elastic member 58 is a plate spring. The elastic member 58 is disposed on the elastic member disposing portion 101 of the upper side member 86. The back-and-forth click ball 56 is mounted on the upper side of the center part of the elastic member 58. The ball 56 can be displaced on the lower side due to the engagement with the projecting rim 156. In the case where this displacement is taken place, the ball 56 is biased on the upper side by the elastic member 58. The elastic member disposing portion 101 includes a space 160 that permits the downward elastic deformation of the center part of the elastic member 58.

Figure 13A:
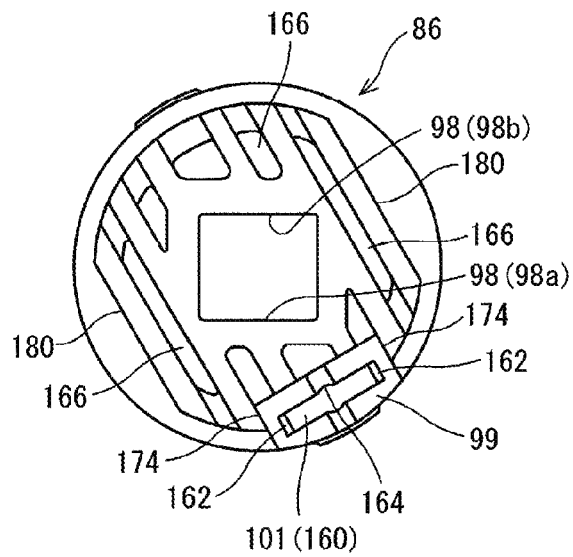
FIG. 13(a) is a plan view of an upper side member.
Figure 13C:
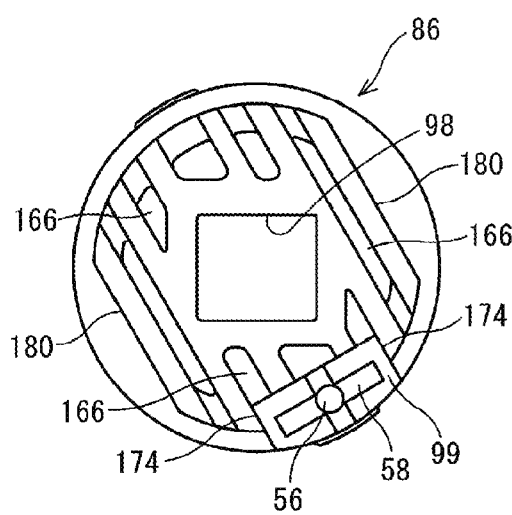
FIG. 13(c) is a plan view of the state in which the back-and-forth click elastic member and the back-and-forth click ball are mounted on the upper side member.
Figure 13B:
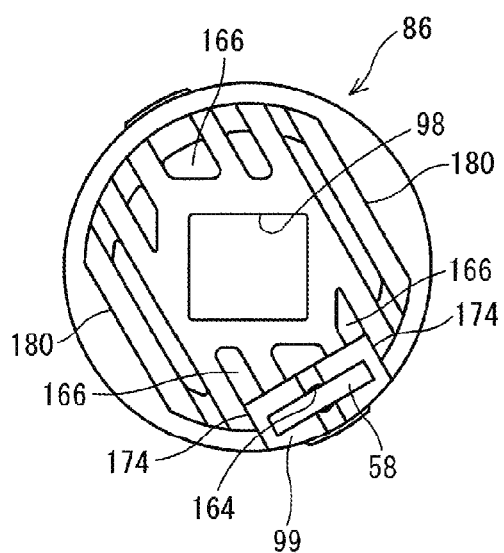
FIG. 13(b) is a plan view of the state in which a back-and-forth click elastic member (a plate spring) is mounted on the upper side member.
Figure 13D:
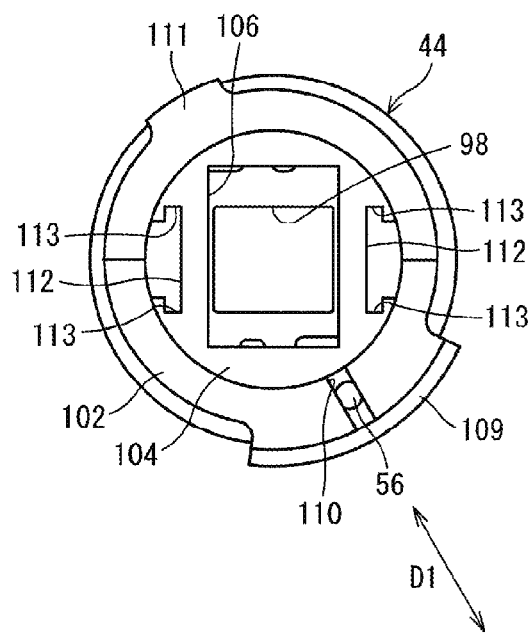
FIG. 13(d) is a plan view of the state in which the rotating body is mounted on the upper side member in the state in FIG. 13(c)

FIG. 13(a) is a plan view of the upper side member 86. FIG. 13(b) is a plan view of the state in which the elastic member 58 is mounted on the upper side member 86. FIG. 13(c) is a plan view of the state in which the elastic member 58 and the back-and-forth click ball 56 are mounted on the upper side member 86. FIG. 13(d) is a plan view of the state in which the rotating body 44 is mounted on the configuration in FIG. 13(c). As illustrated in FIG. 13(a), the elastic member disposing portion 101 includes the space 160 described above, an elastic member mounting surface 162, and a ball holding portion 164. The elastic member mounting surface 162 supports both end portions of the elastic member 58 from below. Since steps are provided around the mounting surface 162, the position of the elastic member 58 is not displaced. The ball 56 is held on the ball holding portion 164 while the ball 56 is mounted on the elastic member 58. The ball holding portion 164 prevents the position of the ball 56 from being displaced. As illustrated in FIGS. 12 and 13(d), in the state in which the rotating body 44 is mounted, the ball 56 protrudes upwardly out of the through hole 110 of the rotating body 44. That is, a part of the ball 56 is an upper protruding portion protruding from the top surface of the rotating body 44. The upper protruding portion contacts the under surface 125 of the coupling portion 124. The under surface 125 is a contact surface that can contact the upper protruding portion. The upwardly protruding ball 56 is moved on the click mechanism effecting portion 146, and the click mechanism is effected.

It is noted that in FIGS. 13(a) to 13(c), a large number of recesses 166 in a long hole shape, for example, are illustrated. These recesses 166 are omitted in FIG. 8. The recesses 166 contribute to reducing the weight of the movable valve body 60.

Figure 15:
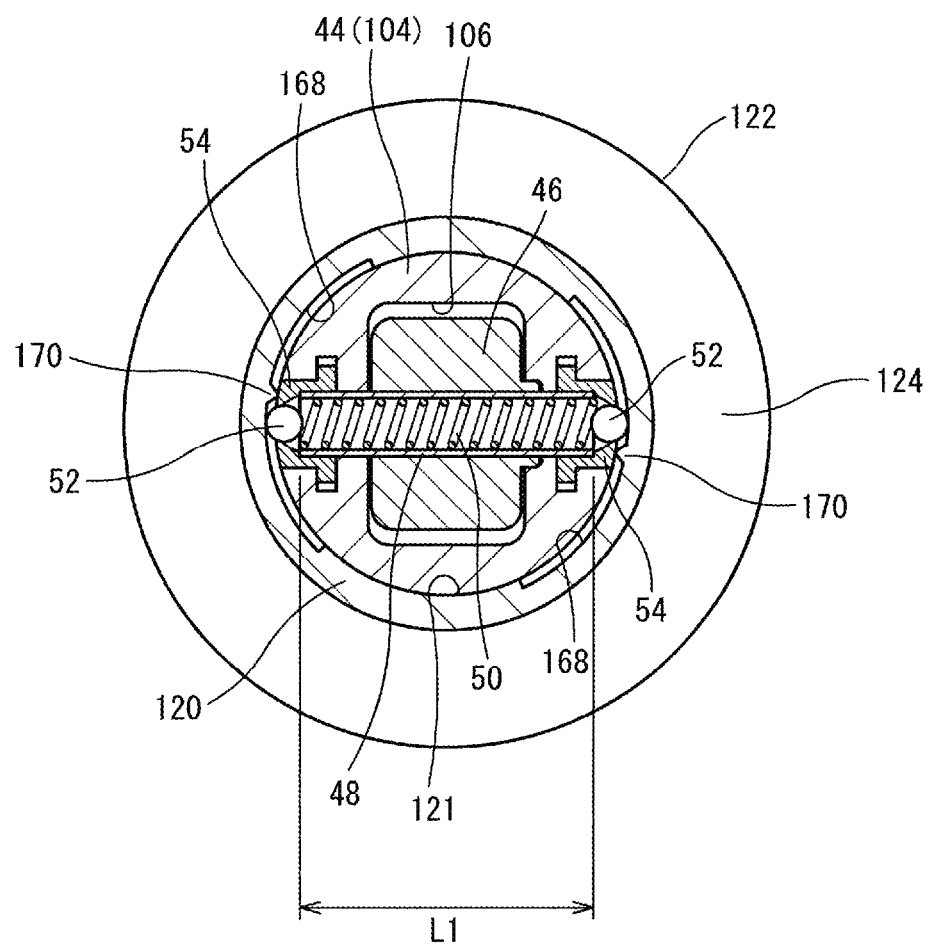
FIG. 15 is a cross-sectional view of the lever assembly and a lateral cross-sectional view taken along the center line of the lever shaft.

FIG. 15 is a cross-sectional view of the lever assembly 40 taken along the line of the center axis of the lever shaft 48. A ball sliding surface 168 is provided on the inner circumferential surface 121 of the small-diameter cylindrical portion 120. The ball sliding surface 168 is a contact surface that can contact the ball 52. The circumferential range in which the ball sliding surface 168 is provided corresponds to the turnable range of the lever 46. The ball sliding surface 168 is provided with the projection 170 for effecting a click. The side-to-side click ball 52 is always pressed against the ball sliding surface 168 by the elastic member 50.

[The Motion of the Components in Association with the Back-and-Forth Rotation of the Lever]

As described above, in the adjustment of the discharge amount, the handle 14 is moved up and down (see the arrow M in FIG. 3). The motion of the handle 14 causes the back-and-forth rotation of the lever 46. In conjunction with the back-and-forth rotation, the lower end 95 of the lever 46 is rotated. The engagement between the lower end 95 and the lever engaging recess 98 moves the movable valve body 60. The movable valve body 60 is slid on the fixed valve body 62 linearly. During the slide, the surface contact between the flat smooth surface PL1 and the flat smooth surface PL2 is maintained. At the same time, the movable valve body 60 is also slid on the rotating body 44.

The moving direction of the movable valve body 60 is regulated by the rotating body 44. Because of the regulation, the mixing ratio between heated water and cold water is not changed only by rotating the lever back and forth. In the embodiment, a plurality of moving direction regulating mechanisms is adopted. The moving direction regulating mechanism is the engagement between the rotating body 44 and the movable valve body 60 (the upper side member 86).

Figure 14A:
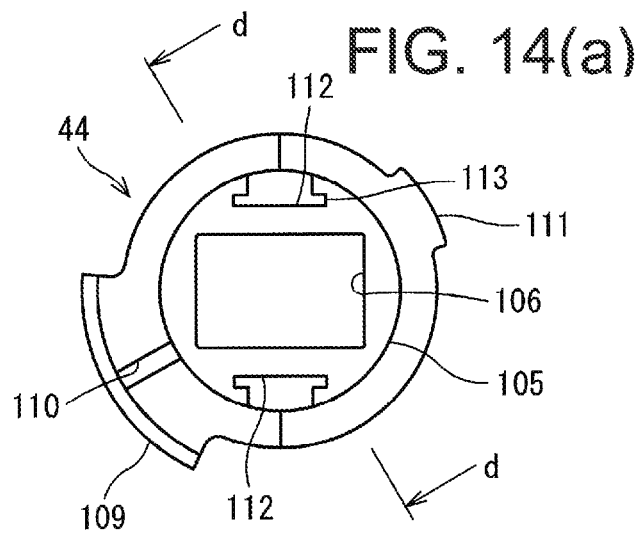
FIG. 14(a) is a plan view of the rotating body.
Figure 14C:
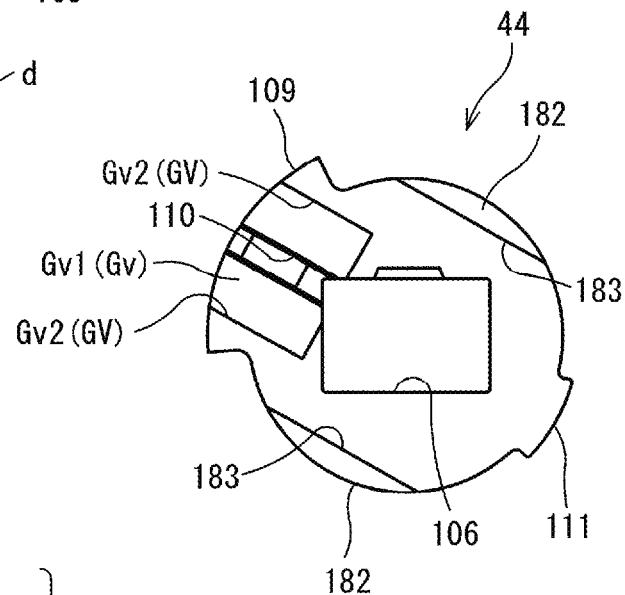
FIG. 14(c) is a bottom view of the rotating body.
Figure 14B:
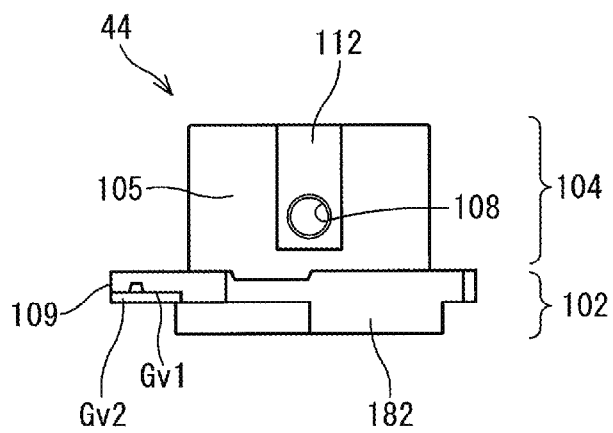
FIG. 14(b) is a side view of the rotating body.
Figure 14D:
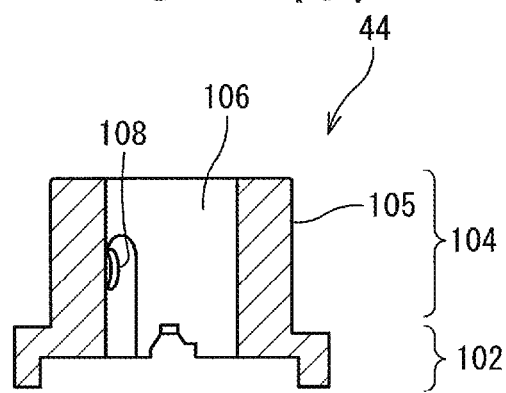
FIG. 14(d) is a cross-sectional view taken along line d-d in FIG. 14(a)

The rotating body 44 is involved in the moving direction regulating mechanisms. FIG. 14(a) is a plan view of the rotating body 44. FIG. 14(b) is a side view of the rotating body 44. FIG. 14(c) is a bottom view of the rotating body 44. FIG. 14(d) is a cross-sectional view taken along line d-d in FIG. 14(a). As illustrated in FIG. 14(c), a slide groove Gv is provided on the back surface (of the base portion 102) of the rotating body 44. The slide groove Gv includes a bottom face Gv1 and two side surface Gv2. The through hole 110 is provided at the center of the bottom face Gv1. The engaging projection 99 is fit into the slide groove Gv.

A first moving direction regulating mechanism is the engagement between the engaging projection 99 of the upper side member 86 and the slide groove Gv of the rotating body 44. More specifically, a side surface 174 of the engaging projection 99 (see FIGS. 13(a) to 13(c)) is slid on the side surface Gv2 of the slide groove Gv. The direction of the slide is a linear direction D1 along the side surface 174 of the engaging projection 99. The engaging projection 99 includes the elastic member disposing portion 101, the elastic member mounting surface 162, the ball holding portion 164, and so on, and also contributes to regulating the moving direction. Moreover, the elastic member 58 and the ball 56 are mounted on the engaging projection 99 which upwardly protrudes, and the positions of the elastic member 58 and the ball 56 are raised. Thus, it is possible to easily cause the ball 56 to protrude from the top surface of the base portion 102 to the upper side. As described above, the engaging projection 99 contributes to regulating the moving direction and to effecting a back-and-forth click mechanism.

It is noted that as described above, the foregoing through hole 110 is provided on the bottom face Gv1 of the slide groove Gv. That is, the thickness of the portion on which the slide groove Gv is formed is reduced by the depth of the slide groove Gv, and the through hole 110 is provided on the thin portion. Thus, the vertical length of the through hole 110 is shortened, so that the upper protruding portion is easily formed.

A second moving direction regulating mechanism is the engagement between a side surface 180 of the upper side member 86 (see FIGS. 13(a) and 8) and a downward projection 182 provided on the base portion 102 of the rotating body 44 (see FIG. 8). The downward projection 182 includes a side surface 183. This side surface 183 is slid on the side surface 180 of the upper side member 86. The moving direction of the engagement is also the foregoing linear direction D1. The side surface 180 is in parallel with the foregoing side surface 174.

As described above, a plurality of the moving direction regulating mechanisms is provided in the same moving direction D1, so that the moving direction is more reliably controlled.

It is noted that as described above, although the through hole 110 is a long hole, the longitudinal direction of this long hole is the linear direction D1 (see FIG. 13(d)). The width and depth of the through hole 110 are constant. In this through hole 110, the ball 56 is moved along the direction D1 (the longitudinal direction of the through hole 110). Even though this motion changes the position of the ball 56, the height of the protrusion of the ball 56 is not changed. It is noted that in the longitudinal direction of the long hole, the width and/or the height of the through hole 110 may be changed. In this case, a change in the position of the ball 56 can change the height of the protrusion of the ball 56. This change in the height of the protrusion can implement Form (B) below.

(B) A back-and-forth click feeling is varied depending on a lever back-and-forth position.

[The Motion of the Components in Association with Turning the Lever]

As described above, in the adjustment of the temperature, the handle 14 is turned (see FIG. 19 described later). The lever 46 is turned by turning the handle 14. The engagement between the lower end 95 of the lever 46 and the lever engaging recess 98 rotates the movable valve body 60. The movable valve body 60 is rotated with respect to the fixed valve body 62. During the rotation, the surface contact between the flat smooth surface PL1 and the flat smooth surface PL2 is maintained. The rotation changes the area ratio R1, and temperature of the discharge water is adjusted. As described above, the mixer tap 10 includes a temperature adjusting mechanism that can adjust the discharge water temperature by rotating the lever 46 from side to side.

The angle range of turning the lever is restricted. As described above, the first stopper 150 and the second stopper 152 are provided on the under surface 125 of the coupling portion 124 (see FIG. 10). Meanwhile, the base portion 102 of the rotating body 44 includes an outer extending portion 109 protruding in the radial direction outwardly (see FIGS. 13(d) and 8). The foregoing through hole 110 is provided on the outer extending portion 109. In association with turning of the lever, the outer extending portion 109 is moved in the circumferential direction in the range from the first stopper 150 to the second stopper 152. That is, the outer extending portion 109 is moved in the circumferential direction in the range from a circumferential position Rx1 to a circumferential position Ry1 (see FIG. 10). In this movement, the moving range of the center position of the outer extending portion 109 in the circumferential direction is from a circumferential position Rx2 to a circumferential position Ry2. An angle range Rf from the circumferential position Rx2 to the circumferential position Ry2 is the turning angle range of the lever 46. The angle range Rf is also the moving range of the back-and-forth click ball 56.

As described above, the engagement between the outer extending portion 109 and the stoppers 150 and 152 is a first turning range regulating mechanism. In addition, a second turning range regulating mechanism is provided. As illustrated in FIGS. 8 and 14(d), a second outer extending portion 111 is provided on the base portion 102 of the rotating body 44. This second outer extending portion 111 is moved in the circumferential direction in the range from a circumferential position Rx3 to a circumferential position Ry3 (see FIG. 10).

These two turning range regulating mechanisms are linked together. When the outer extending portion 109 contacts the first stopper 150, the second outer extending portion 111 contacts the second stopper 152. When the outer extending portion 109 contacts the second stopper 152, the second outer extending portion 111 contacts the first stopper 150. With these two turning range regulating mechanisms, since the impact force when the lever 46 is turned to the limit is distributed, durability is improved.

For example, the turning range can be set freely depending on the positions of the first stopper 150 and the second stopper 152.

The lever assembly 40 in the structure above includes a side-to-side click mechanism and a back-and-forth click mechanism. The side-to-side click mechanism is a mechanism that effects a click feeling in association with turning of the lever 46. The back-and-forth click mechanism is a mechanism that effects a click feeling in association with rotation of the lever 46 back and forth.

[A Click Feeling in the Manipulation of Side-to-Side Rotation (a Side-to-Side Click Feeling)]

A click feeling in the manipulation of side-to-side rotation is caused by the side-to-side click mechanism. In the present application, this click feeling is also simply referred to as a side-to-side click feeling. As illustrated in FIGS. 15 to 17, the side-to-side click feeling is caused by the engagement or releasing the engagement between the side-to-side click ball 52 and the projection 170. FIG. 16 is a cross-sectional view similar to FIG. 15, illustrating the state in which the ball 52 is engaged with the projection 170. FIG. 17 is a cross-sectional view similar to FIG. 15, illustrating the state in which the engagement between the ball 52 and the projection 170 is released. By turning the lever 46, the state in FIG. 15 is changed to the engaging state in FIG. 16, and to the state in which the engagement is released in FIG. 17. In the engaging state illustrated in FIG. 16, the elastic member 50 is compressed as well as the resistance force is increased in turning. A sensation caused by an increase in the resistance force is also an exemplary side-to-side click feeling. Moreover, vibrations are generated at the moment of releasing the engagement. These vibrations cause a typical side-to-side click feeling. Furthermore, a sound is made at the moment of releasing the engagement. A sensation caused by the sound is also an exemplary side-to-side click feeling.

[A Click Feeling in the Manipulation of Back-and-Forth Rotation (a Back-and-Forth Click Feeling)]

A click feeling in the manipulation of back-and-forth rotation is caused by the back-and-forth click mechanism. In the present application, the click feeling is also simply referred to as a back-and-forth click feeling. FIG. 12 shows the state in which the ball 56 is engaged with the groove 154. The click feeling is caused by the engagement or releasing the engagement between the ball 56 and the groove 154. Moreover, the back-and-forth click feeling is caused by the engagement or releasing the engagement between the ball 56 and the projecting rim 156. The back-and-forth rotation of the lever 46 moves the ball 56 on the click mechanism effecting portion 146 in the radial direction. With the movement, the engagement between the ball 56 and the first groove 154 is released, the ball 56 is further moved, and then the ball 56 is engaged with the second groove 154. With these engagements, vibrations can be generated. These vibrations cause a back-and-forth click feeling. With these engagements, the resistance force when the lever is rotated back and forth is changed. A sensation caused by a change in the resistance force is also an exemplary back-and-forth click feeling. Furthermore, a sound is generated at the moment of the engagement. A sensation caused by the sound is also an exemplary back-and-forth click feeling. In addition, the resistance force when the lever is rotated back and forth is increased by the engagement between the ball 56 and the projecting rim 156. A sensation caused by an increase in the resistance force is also an exemplary back-and-forth click feeling.

Figure 18:
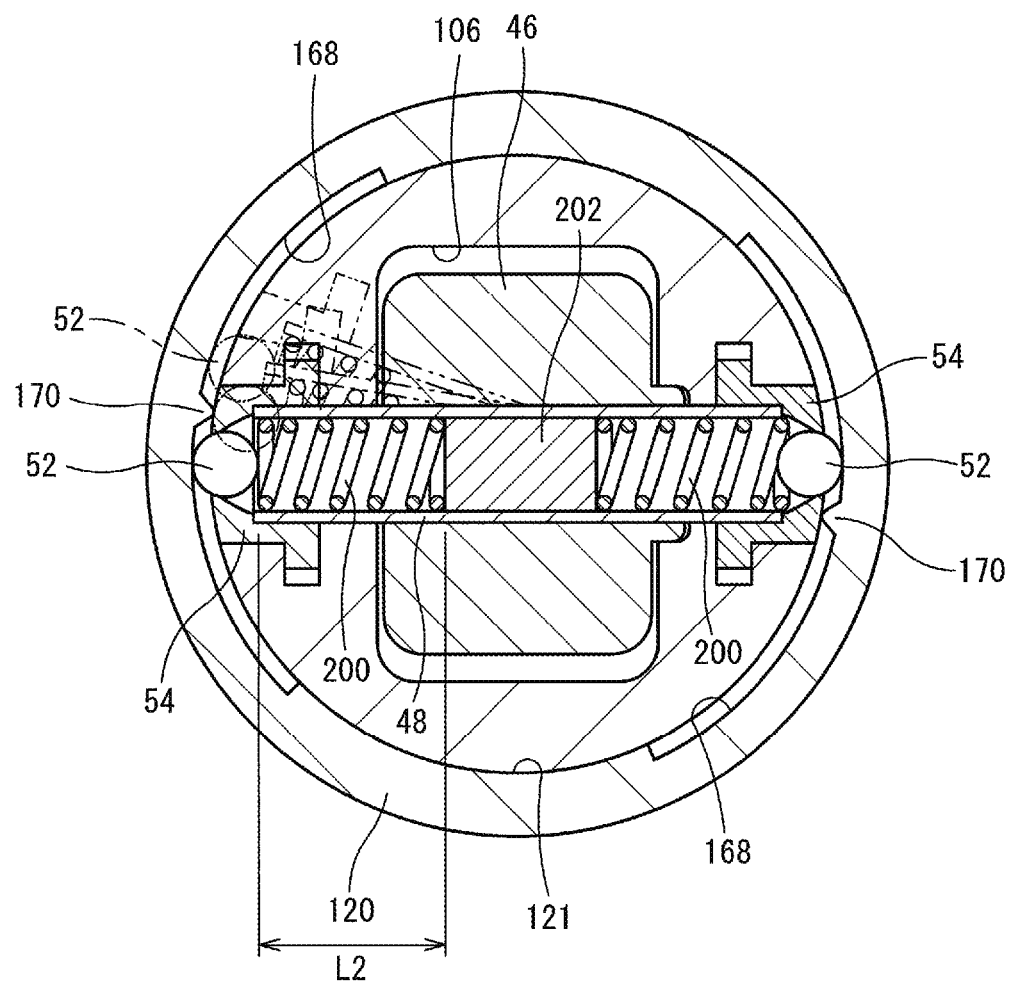
FIG. 18 is a cross-sectional view of an exemplary modification of the lever assembly.

FIG. 18 is an exemplary modification of the embodiment illustrated in FIGS. 15 to 17. In the embodiment, two elastic members 200 are used instead of the elastic member 50. These elastic members 200 are coil springs. The longitudinal length of the elastic member 200 is shorter than the longitudinal length of the elastic member 50. Moreover, the embodiment in FIG. 18 includes an intermediate member 202. The intermediate member 202 is a cylindrical member. The material of the intermediate member 202 is stainless steel. The intermediate member 202 serves as a spacer. The intermediate member 202 sets the spacing between these two elastic members 200. The intermediate member 202 can adjust the degree of compression of the elastic members 200.

The intermediate member 202 is not fixed to the lever shaft 48. The intermediate member 202 may be fixed to the lever shaft 48.

FIG. 19 is a plan view illustrative of turning the handle 14 (side-to-side rotation). The handle 14 is turnable from a left limit ML to a right limit MR. A turnable range RF of the handle 14 corresponds to the angle range Rf in FIG. 10 described above. An angle θf in the range RF is equal to an angle θf in the range Rf. As illustrated in FIG. 19, the handle 14 faces the front at a center circumferential position C1 of the turnable range RF. The center circumferential position C1 corresponds to a center circumferential position c1 in FIG. 10. As illustrated in FIG. 19, the turning range of the handle 14 is in bilateral symmetry to a front position S1.

As illustrated in FIG. 19, an angle range RT1 is on the right side of the center circumferential position C1 when seen from a user side. The angle range RT1 corresponds to an angle range Rt1 in FIG. 10. An angle θ1 in the range RT1 is equal to an angle θ1 in the range Rt1. Thus, the angle range RT1 can be set freely by the disposition of the click ineffective portion 148. When the circumferential position of the handle 14 is in the angle range RT1, heated water is not mixed. That is, when the circumferential position of the handle 14 is in the angle range RT1, the ratio of cold water is 100%. The range RT1 is a cold water discharge position. In the embodiment, when the handle 14 is on the right side of the front, heated water is not mixed.

Also when the circumferential position of the handle 14 is at the center circumferential position C1, heated water is not mixed. That is, when the circumferential position of the handle 14 is at the center circumferential position C1 (the front position S1), the ratio of cold water is 100%. The position C1 (the position S1) is a cold water discharge position.

As illustrated in FIG. 19, an angle range RT2 is on the left side of the center circumferential position C1 when seen from a user. The angle range RT2 corresponds to an angle range Rt2 in FIG. 10. An angle θ2 in the range RT2 is equal to an angle θ2 in the range Rt2. Thus, the angle range RT2 can be set freely by the disposition of the click mechanism effecting portion 146. When the circumferential position of the handle 14 is in the angle range RT2, heated water is mixed with cold water, or cold water is not mixed (heated water is at 100%). That is, when the circumferential position of the handle 14 is in the angle range RT2, the ratio of cold water is 0% or greater and less than 100%. The range RT2 is a heated-water-and-cold-water mixed discharge position and a heated water discharge position.

In the embodiment in FIG. 19, the turnable range RF of the handle 14 is in bilateral symmetry to the front position S1. However, the turnable range RF of the handle 14 may be in bilateral asymmetry. For example, the angle θ2 of the angle range RT2 may be at 60 degrees, and the angle θ1 of the angle range RT1 may be at 40 degrees.

When the angle range RT2 is too small, the angle range of the handle 14 in which the mixing ratio between heated water and cold water can be adjusted becomes too narrow, and the mixing ratio between heated water and cold water is changed too abruptly. From this viewpoint, the angle θ2 in the range RT2 is preferably equal to or greater than 40 degrees, more preferably equal to or greater than 50 degrees, and much more preferably equal to or greater than 55 degrees. When the angle range RT2 is too large, the angle range of the handle 14 in which the mixing ratio between heated water and cold water can be adjusted becomes too wide, and the operability is reduced. From this viewpoint, the angle θ2 in the range RT2 is preferably equal to or less than 100 degrees, more preferably, equal to or less than 90 degrees, and much more preferably, equal to or less than 70 degrees.

The angle θ1 in the angle range RT1 may be set at 0 degree. However, since the angle θ1 is not set at 0 degrees in a typical mixer tap, when the angle θ1 is set at 0 degree, a user might excessively manipulate the handle 14 on the right side of the center circumferential position C1. If the excessive manipulation is repeated, an excessive load is applied to the mixer tap, which sometimes adversely affects the durability of the mixer tap. From this viewpoint, the angle θ1 in the range RT1 is preferably equal to or greater than 10 degrees, more preferably equal to or greater than 20 degrees, and much more preferably equal to or greater than 30 degrees. In the case where the angle θ1 is excessively large, the range in which the ratio of cold water is 100% becomes too wide, and the operability is reduced. From this viewpoint, the angle θ1 in the range RT1 is preferably equal to or less than 70 degrees, more preferably equal to or less than 60 degrees, and much more preferably equal to or less than 50 degrees.

When the ratio of the angle between the angle range RT1 and the angle range RT2 (θ1/θ2) is too small, the angle θ1 becomes too small or the angle θ2 becomes too large, and the foregoing problem is apt to arise. From this viewpoint, the ratio of the angle (θ1/θ2) is preferably equal to or greater than 0.2, more preferably equal to or greater than 0.4, and much more preferably equal to or greater than 0.6. When the ratio of the angle (θ1/θ2) is too large, the angle θ1 becomes too large or the angle θ2 becomes too small, and the foregoing problem is apt to arise. From this viewpoint, the ratio of the angle (θ1/θ2) is preferably equal to or less than 0.9, more preferably equal to or less than 0.8, and much more preferably equal to or less than 0.7.

In the embodiment in FIG. 19, the angle range RT1 is on the right side of the center circumferential position C1 when seen from a user, and the ratio of cold water is 100% on the right side of the center circumferential position C1. Moreover, the angle range RT2 is on the left side of the center circumferential position C1 when seen from a user, and the ratio of cold water is 0% or greater and less than 100% on the left side of the center circumferential position C1. These configurations may be reversed. That is, it may be fine that the angle range RT1 is on the left side of the center circumferential position C1 when seen from a user and the ratio of cold water is 100% on the left side of the center circumferential position C1, and that the angle range RT2 is on the right side of the center circumferential position C1 when seen from a user, and the ratio of cold water is 0% or greater and less than 100% on the right side of the center circumferential position C1. Also in this case, all the foregoing numeric rules on the angle θ1, the angle θ2, and/or the ratio of the angle (θ1/θ2) are applicable. However, as described later, the relationship between the circumferential position of the lever and the mixing ratio of heated water can be set in various ways, and the effects matched with the settings can be exerted.

The circumferential position of the handle 14 is the same as the circumferential position (the lever side-to-side position) of the lever 46. The angle range RT1 is the lever side-to-side position at which heated water is not mixed. The angle range RT2 is the lever side-to-side position at which heated water is mixed. The phrase "heated water is mixed" includes the case where heated water is at 100%.

As illustrated in FIG. 10, the click mechanism effecting portion 146 is provided throughout the angle range Rt2. Thus, when the lever side-to-side position is in the angle range RT2, the back-and-forth click mechanism operates. Meanwhile, the click mechanism effecting portion 146 is not provided throughout the angle range Rt1. The entire area of the angle range Rt1 is the click ineffective portion 148. Thus, when the lever side-to-side position is in the angle range RT1, the back-and-forth click mechanism does not operate.

Therefore, in the embodiment, at the lever side-to-side position at which heated water is not mixed, a back-and-forth click feeling is not effected in the manipulation of back-and-forth rotation. Moreover, at the lever side-to-side position at which heated water is mixed, a back-and-forth click feeling is effected in the manipulation of back-and-forth rotation. Thus, with the manipulation of back-and-forth rotation, it is determined whether heated water is mixed depending on the presence or absence of a back-and-forth click feeling. However, there are a variety of the settings of back-and-forth click feelings, and the effects matched with the settings can be exerted.

The determination whether heated water is mixed can be achieved also by a side-to-side click feeling in association with turn of the lever. In the operation of turning the lever 46, preferably, a side-to-side click feeling is effected at a boundary K1 between the lever side-to-side position at which only cold water is discharged and the lever side-to-side position at which heated water is mixed (see FIG. 19). It is determined whether heated water is mixed depending on the side-to-side click feeling. For example, in the embodiment in FIG. 19, preferably, a side-to-side click feeling is effected at the boundary between the angle range RT1 and the angle range RT2. It can be more reliably determined whether heated water is mixed by the back-and-forth click feeling described above and the side-to-side click feeling. There are a variety of the settings of the combinations of a back-and-forth click feeling and a side-to-side click feeling, and the effects matched with the settings can be exerted.

FIG. 20(*a*) is a plan view of the fixed valve body 62. FIG. 20(*a*) is a diagram of the fixed valve body 62 seen from the upper side. FIG. 20(*b*) is a bottom view of the fixed valve body 62. FIG. 20(*b*) is a diagram of the fixed valve body 62 seen from the lower side. FIG. 20(*c*) is a cross-sectional view taken along line c-c in FIG. 20(*a*), FIG. 20(*d*) is a cross-sectional view taken along line d-d in FIG. 20(*a*), FIG. 20(*e*) is a cross-sectional view taken along line e-e in FIG. 20(*a*), FIG. 20(*f*) is a cross-sectional view taken along line f-f in FIG. 20(*a*), and FIG. 20(*g*) is a cross-sectional view taken along line g-g in FIG. 20(*a*).

As illustrated in FIG. 20(*a*), the heated water valve hole 80 (the top surface opening line 80L) is a bent long hole. The cold water valve hole 82 (a top surface opening line 82L) is also a bent long hole.

As illustrated in FIG. 20(*a*), the heated water valve hole 80 includes a top surface opening line 80L. The top surface opening line 80L is the opening shape of the heated water valve hole 80 on the flat smooth surface PL1. The cold water valve hole 82 includes the top surface opening line 82L. The top surface opening line 82L is the opening shape of the cold water valve hole 82 on the flat smooth surface PL1. The mixed water valve hole 84 includes a top surface opening line 84L. The top surface opening line 84L is the opening shape of the mixed water valve hole 84 on the flat smooth surface PL1.

As illustrated in FIG. 20(*b*), the heated water valve hole 80 includes an under surface opening line 80s. The cold water valve hole 82 includes an under surface opening line 82s. The mixed water valve hole 84 includes an under surface opening line 84s.

As illustrated in FIG. 20(*a*), the cold water valve hole 82 includes a first wall surface portion W1 at one end of the longitudinal direction. The cold water valve hole 82 includes a second wall surface portion W2 at the other end of the longitudinal direction. The heated water valve hole 80 includes a third wall surface portion W3 at one end of the longitudinal direction. The heated water valve hole 80 includes a fourth wall surface portion W4 at the other end of the longitudinal direction.

Preferably, at least one of these wall surface portions W1 to W4 includes an inclined surface. As illustrated in FIGS. 20(*a*) to 20(*g*), the first wall surface portion W1 includes an inclined surface SL1. The second wall surface portion W2 includes an inclined surface SL2. The third wall surface portion W3 includes an inclined surface SL3. The fourth wall surface portion W4 includes an inclined surface SL4.

These inclined surfaces SL1 to SL4 are tilted with respect to the vertical direction in the case where the mixer tap 10 is used. These inclined surfaces SL1 to SL4 are seen from the upper side (the flat smooth surface PL1 side) (see FIG. 20(*a*)).

As described above, the wall surface of the heated water valve hole 80 includes the inclined surfaces SL3 and SL4. Moreover, the wall surface of the cold water valve hole 82 includes the inclined surfaces SL1 and SL2.

These inclined surfaces SL1 to SL4 contribute to suppressing a water hammer. The water hammer means a phenomenon that in switching from the water stop state to the water discharge state, the impact of a water pressure causes a sound in the mixer tap. A sudden flow of heated water or cold water into the heated water valve hole 80 or the cold water valve hole 82 causes a water hammer.

The inclined surfaces SL1 to SL4 suppress this sudden flow. Thus, a water hammer is suppressed. Since heated water or cold water diagonally flows along the inclined surface, the impact of a water pressure is relaxed.

Furthermore, since heated water and cold water diagonally flow, the impact of a water pressure acting on the movable valve body 60, for example, is relaxed. With this relaxation, the durability of the mixer tap 10 can be improved.

It is noted that the inclined surfaces SL1 to SL4 may be a plane, or may be a curved surface. In addition, the inclined surfaces SL1 to SL4 may be smooth, or may be stepped (step-like, for example).

As illustrated in FIG. 20(*a*), the top surface opening line 80L of the heated water valve hole 80 and the top surface opening line 82L of the cold water valve hole 82 are formed in bilateral asymmetry. That is, in the planar view of FIG. 20(*a*), when the diagram is inverted about a certain straight line, there is no symmetry axis as the straight line that the top surface opening line 80L is overlapped with the top surface opening line 82L. For example, the top surface opening line 80L and the top surface opening line 82L are not in symmetry with respect to a lever longitudinal center line Lc (see FIGS. 20(*a*) and 20(*b*)). In the planar view seen from above, the lever longitudinal center line Lc matches the center line of the lever 46 when the lever 46 is at the center circumferential position C1 (see FIG. 19).

One of methods for improving the degree of freedom of the function of switching between heated water and cold water is to variously design the positional relationship among the passage forming recess 94, the heated water valve hole 80, and the cold water valve hole 82. Since the configuration is not limited to the foregoing bilaterally symmetric configuration, the degree of freedom of design for the heated water valve hole 80 and the cold water valve hole 82 is improved. Thus, it is possible to implement various functions of switching between heated water and cold water without causing a great cost increase.

Conventionally, the heated water valve hole 80 and the cold water valve hole 82 were disposed in bilateral symmetry. The inclined surface SL was not provided on the side surfaces of the heated water valve hole 80 and the cold water valve hole 82, and the side surface of the heated water valve hole 80 was vertical to the flat smooth surface PL1. As a result, the top surface opening line and the under surface opening line were at the same position and in the same shape regarding the heated water valve hole 80. Similarly, the top surface opening line and the under surface opening line were at the same position and in the same shape regarding the cold water valve hole 82. In this configuration, when the top surface opening line is formed in an atypical shape such as a laterally asymmetric shape, the under surface opening line also takes an atypical shape. In the case where the under surface opening line is in an atypical shape, the general-purpose base body 68 is not fit to the under surface opening line. That is, such an event is taken place that the general-purpose base body 68 is not enabled to use.

On the contrary, in the foregoing embodiment, the shape and the disposition are different between the top surface opening line 80L and the under surface opening line 80s. Moreover, the shape and the position are different between the top surface opening line 82L and the under surface opening line 82s. The foregoing inclined surfaces SL1 to SL4 cause these differences. In this configuration, it is possible to fit the shapes of the under surface opening lines 80s and 82s to the general-purpose base body 68 while improving the degree of freedom of design for the top surface opening lines 80L and 82L. From this viewpoint, preferably, the under surface opening line 82s and the under surface opening line 80s are in bilateral symmetry (see FIG. 20(b)). The under surface opening line 82s and the under surface opening line 80s are in symmetry (bilateral symmetry), and the symmetry axis is the lever longitudinal center line Lc.

FIG. 21(a) is a plan view of the lower side member 88 of the movable valve body 60. FIG. 21(a) is a diagram of the lower side member 88 seen from above. FIG. 21(b) is a bottom view of the lower side member 88. FIG. 21(b) is a diagram of the lower side member 88 seen from below. FIG. 21(c) is a cross-sectional view taken along line c-c in FIG. 21(b). FIG. 21(d) is a cross-sectional view taken along line d-d in FIG. 21(b).

The passage forming recess 94 includes an under surface opening line 94L. The under surface opening line 94L is the opening shape of the passage forming recess 94 on the flat smooth surface PL2.

FIGS. 22(a) to 22(f) are diagrams of the state in which the top surface of the fixed valve body 62 is overlapped with the under surface of the movable valve body 60 (the lower side member 88). In FIGS. 22(a) to 22(f), the line of the movable valve body 60 hidden behind the fixed valve body 62 when seen from above is depicted by a broken line, and the line of the under surface of the movable valve body 60 (the lower side member 88) is depicted by a solid line. In FIGS. 22(a) to 22(f), the state is illustrated in which the top surface opening line 80L and the top surface opening line 82L are overlapped with the under surface opening line 94L.

In FIGS. 22(a) to 22(f), the line of the under surface of the movable valve body 60, which cannot be seen from above, is depicted by a solid line. Note that this point is different from general drawings.

FIG. 22(a) is the state in which the lever side-to-side position is at the left limit ML, and the lever back-and-forth position is at the upper limit (discharge is stopped). FIG. 22(b) is the state in which the lever side-to-side position is at the left limit ML, and the lever back-and-forth position is at the lower limit (the maximum discharge). FIG. 22(c) is the state in which the lever side-to-side position is at the center circumferential position C1 (the front position S1), and the lever back-and-forth position is at the upper limit (discharge is stopped). FIG. 22(d) is the state in which the lever side-to-side position is at the center circumferential position C1 (the front position S1), and the lever back-and-forth position is at the lower limit (the maximum discharge). FIG. 22(e) is the state in which the lever side-to-side position is at the right limit MR, and the lever back-and-forth position is at the upper limit (discharge is stopped). FIG. 22(f) is the state in which the lever side-to-side position is at the right limit MR, and the lever back-and-forth position is at the lower limit (the maximum discharge position).

Figure 20A:
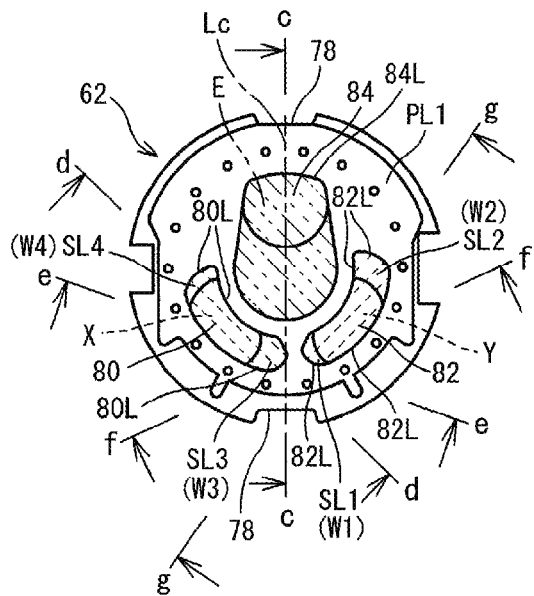
FIG. 20(a) is a plan view of a fixed valve body.
Figure 20B:
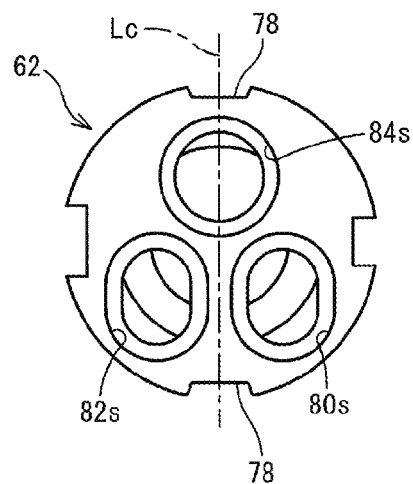
FIG. 20(b) is a bottom view of the fixed valve body.
Figure 20C:
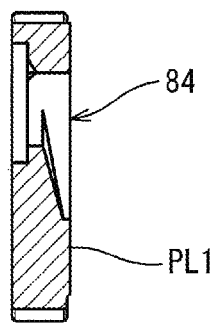
FIG. 20(c) is a cross-sectional view taken along line c-c in FIG. 20(a)
Figure 20D:
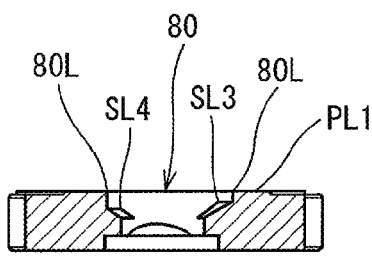
FIG. 20(d) is a cross-sectional view taken along line d-d in FIG. 20(a)
Figure 20E:
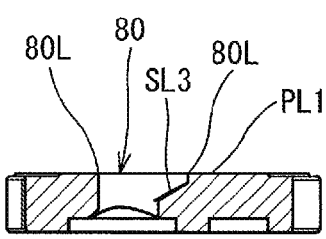
FIG. 20(e) is a cross-sectional view taken along line e-e in FIG. 20(a)
Figure 20F:
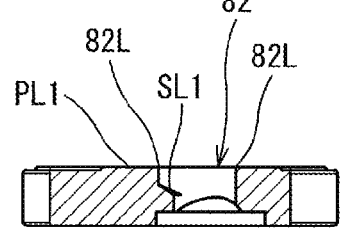
FIG. 20(f) is a cross-sectional view taken along line f-f in FIG. 20(a)
Figure 20G:
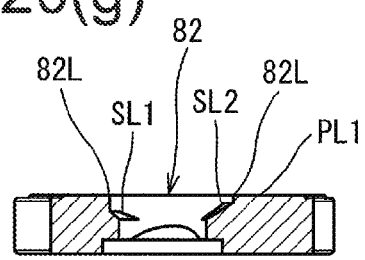
FIG. 20(g) is a cross-sectional view taken along line g-g in FIG. 20(a)

A region X surrounded by the top surface opening line 80L is hatched by broken lines in FIG. 20(a). The region X is the top surface opening region of the heated water valve hole 80. A region Y surrounded by the top surface opening line 82L is hatched by broken lines in FIG. 20(a). The region Y is the top surface opening region of the cold water valve hole 82. A region Z surrounded by the under surface opening line 94L is hatched by broken lines in FIG. 21(b). The region Z is the under surface opening region of the passage forming recess 94 of the movable valve body 60 (the lower side member 88).

A region E hatched by two-dot chain lines in FIG. 20(a) is a region surrounded by the top surface opening line 84L of the mixed water valve hole 84.

A region hatched by solid lines in FIG. 22(b) is a region XZ in which the region X is overlapped with the region Z. A region hatched in FIG. 22(d) is a region YZ in which the region Y is overlapped with the region Z. A region hatched in FIG. 22(e) is the region YZ in which the region Y is overlapped with the region Z.

In the entire movable region, the region E of the mixed water valve hole 84 is overlapped with the region Z of the passage forming recess 94.

[Flows of Heated Water and Cold Water]

Heated water passes through heated water inlet portions (the heated water inlet pipe 18 and the heated water inlet port 70) and reaches the heated water valve hole 80. Cold water passes through cold water inlet portions (the cold water inlet pipe 20 and the cold water inlet port 72) and reaches the cold water valve hole 82.

The heated water that reaches the heated water valve hole 80 flows into the passage forming recess 94. This flow is caused by the region XZ. The area of the region XZ is changed by sliding the movable valve body 60. In the case where the region XZ does not exist, heated water does not flow into the passage forming recess 94. The phrase "the case where the region XZ does not exist" means that the heated water valve hole 80 is completely blocked by the smooth surface PL2 configuring the under surface of the movable valve body 60 (the lower side member 88). An example of the state in which the heated water valve hole 80 is completely blocked by the smooth surface PL2 is illustrated in FIGS. 22(d) and 22(f).

The cold water that reaches the cold water valve hole 82 flows into the passage forming recess 94. This flow is caused by the region YZ. The area of the region YZ is changed by sliding the movable valve body 60. In the case where the region YZ does not exist, cold water does not flow into the passage forming recess 94. The phrase "the case where the region YZ does not exist" means that the cold water valve hole 82 is completely blocked by the flat smooth surface PL2 configuring the under surface of the movable valve body 60 (the lower side member 88). An example of the state in which the cold water valve hole 82 is completely blocked by the flat smooth surface PL2 is illustrated in FIG. 22(b).

The heated water and/or cold water that reaches the passage forming recess 94 passes through the mixed water valve hole 84, the discharge port 74, and the discharge pipe 22, and reaches the discharge portion 16.

The mixing ratio between heated water and cold water depends on the area ratio R1 between the region XZ and the region YZ. The handle 14 is turned to rotate the movable valve body 60 through the lever 46. The rotation of the movable valve body 60 changes the area ratio R1. This change adjusts the water temperature.

The discharge amount depends on a total area Sa of the region XZ and the region YZ. The handle 14 is moved up and down to rotate the lever 46 back and forth, and the movable valve body 60 is moved in the linear direction D1. The movement of the movable valve body 60 changes the total area Sa. This change adjusts the discharge amount. As described above, the mixer tap 10 includes a discharge amount adjustment mechanism that can adjust the discharge amount by rotating the lever 46 back and forth.

In the case where the total area Sa is zero, discharge is stopped. The phrase "the case where the total area Sa is zero" means that the heated water valve hole 80 and the cold water valve hole 82 are completely blocked by the flat smooth surface PL2. An example of the state in which the heated water valve hole 80 and the cold water valve hole 82 are completely blocked by the flat smooth surface PL2 is illustrated in FIGS. 22(a), 22(c), and 22(e).

In FIG. 22(b), the region YZ does not exist. In the case where the lever side-to-side position is at the left limit ML, cold water is not mixed regardless of the position of rotating the lever up and down. That is, in this case, heated water is at 100%.

In FIG. 22(d), the region XZ does not exist. In the case where the lever side-to-side position is at the center circumferential position C1, heated water is not mixed regardless of the position of rotating the lever up and down. That is, in this case, cold water is at 100%. Thus, a water heater is not operated, and energy saving is achieved. Generally, a user of the mixer tap is likely to set the lever at the center circumferential position C1 for use. In the mixer tap 10, energy saving is achieved at the center circumferential position C1, at which the mixer tap is likely to be used.

In FIG. 22(f), the region XZ does not exist. In the case where the lever side-to-side position is at the right limit MR, heated water is not mixed regardless of the position of rotating the lever up and down. That is, in this case, cold water is at 100%.

FIG. 23 is the same drawing as FIG. 22. However, from the viewpoint of easily understanding the drawing, in FIG. 23, the reference signs described in FIG. 22 are partially omitted.

In FIGS. 23(a), 23(c), and 23(e), a two-directional arrow D1 expresses the linear moving directions of the movable valve body 60. Thus, in FIGS. 22(a) to 22(f), the under surface opening line 94L is moved along the linear direction D1.

In FIGS. 23(a), 23(c), and 23(e), a two-directional arrow D2 expresses the longitudinal direction of the back-and-forth rotation of the lever 46. The longitudinal direction D2 is the direction of the back-and-forth rotation of the lever 46 in the planar view seen from the upper side. The longitudinal direction D2 is the direction vertical to the center axis line (the center axis line of the lever shaft 48) of the back-and-forth rotation of the lever 46. When an intersection line Lm (not illustrated) of the flat smooth surface PL2 with a plane vertical to the center axis line of the back-and-forth rotation of the lever 46 is considered, the longitudinal direction D2 is in parallel with the intersection line Lm.

In the mixer tap 10, the longitudinal direction D2 is not in parallel with the linear direction D1. In FIGS. 23(a), 23(c), and 23(e), a two-directional arrow θx expresses an angle formed of the linear direction D1 and the longitudinal direction D2. The setting of the angle θx improves the degree of freedom of the water discharge specifications.

Here, attention is focused on FIGS. 23(c) and 23(d). That is, attention is focused on the case where the lever side-to-side position is at the center circumferential position C1. Suppose that in the case where the movable valve body 60 is moved in the longitudinal direction D2, the region XZ is produced in the discharge state in FIG. 23(d). That is, heated water is mixed by the region XZ. However, in the embodiment, the linear direction D1 is inclined to the longitudinal direction D2. Moreover, the direction of this incline is a direction to avoid the overlap with the heated water valve hole 80 in the state in which the lever side-to-side position is at the center circumferential position C1. Thus, in the case where the lever side-to-side position is at the center circumferential position C1, even though the lever 46 is rotated in the discharge direction, the movable valve body 60 is moved along the linear direction D1, so that only the region YZ is produced, and the region XZ is not produced (see FIG. 23(d)).

Figure 24A:
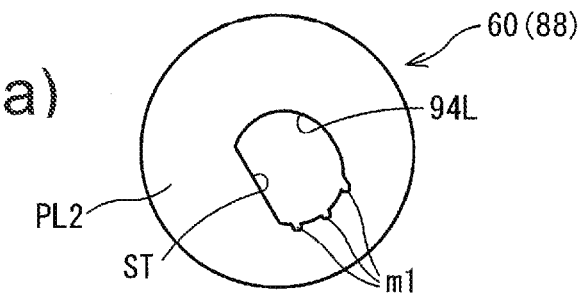
FIGS. 24(a) to 24(d) are plan views of exemplary modifications of the under surface opening line of the movable valve body (the lower side member)
Figure 24B:
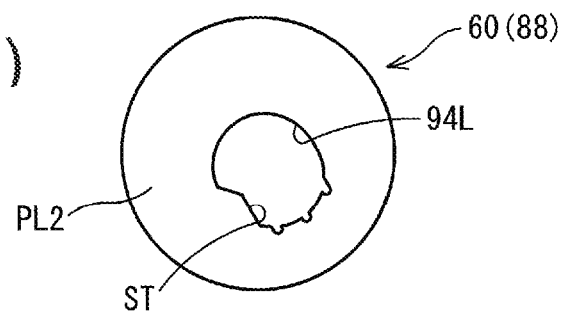
Figure 24C:
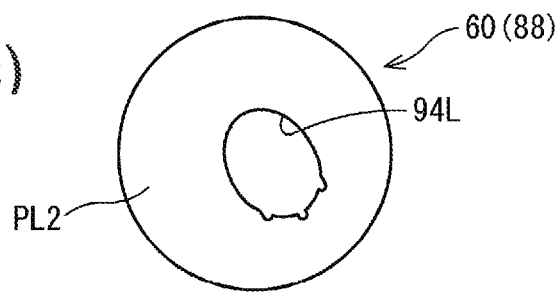
Figure 24D:
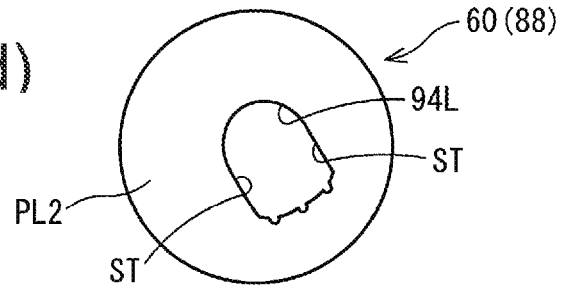

FIG. 24(a) is a plan view of the shape of the under surface opening line 94L. The under surface opening line 94L includes a straight portion ST. The straight portion ST is in parallel with the linear direction D1 (see FIGS. 23(a), 23(c), and 23(e)). The under surface opening line 94L is disposed on the heated water valve hole 80 side. In the state in which the discharge amount is at the maximum, when the state is changed from the state in which only cold water is discharged to the state in which heated water is mixed, it is the straight portion ST that is first overlapped with the top surface opening line 80L in the under surface opening line 94L. In other words, in the process of turning the lever 46 from the state in FIG. 22(d) to the state in FIG. 22(b), it is the straight portion ST that is first overlapped with the top surface opening line 80L. The disposition of the straight portion ST in this manner contributes to preventing heated water from being mixed in the case where the lever side-to-side position is at the center circumferential position C1 (see FIG. 23(d)).

Preferably, the straight portion ST is nearly in parallel with the linear direction D1. The phrase "nearly in parallel with" means that an angle error of ±5 degrees is permitted. This angle error is preferably ±3 degrees, and more preferably the straight portion ST is in parallel with the linear direction D1 as described in the foregoing embodiment. It is noted that in the case where the straight portion ST is not a straight line, the angle error and the parallelism are determined by the linear line connecting both ends of the straight portion ST.

The straight portion ST is provided along the linear direction D1, so that the mixing of heated water is effectively prevented in the entire range of back-and-forth rotation at the center circumferential position C1. Thus, it is suppressed that heated water is unintentionally mixed, and energy saving can be achieved. Moreover, since it is unnecessary to avoid the mixing of heated water with an atypical valve hole shape, the degree of freedom of design for the valve hole is improved.

Since the degree of freedom of design for the valve hole is improved, the back-and-forth click mechanism and/or the side-to-side click mechanism is easily provided on the movable valve body 60 and the fixed valve body 62. For example, a recess and/or a projection can be easily provided, or an advancing/retracting mechanism can be easily provided on the movable valve body 60. Furthermore, a recess and/or a projection can be easily provided, or an advancing/retracting mechanism can be easily provided on the fixed valve body 62. Thus, the degree of freedom of design for the modes of a click feeling can be improved.

In the embodiment, the linear direction D1 is made different from in the longitudinal direction D2, and the occurrence of the region XZ (see FIG. 23(*a*)) is controlled. Therefore, it is possible to reduce the restriction on the valve hole shape. Thus, the degree of freedom of design for the valve hole shape is improved. Due to the improvement of the degree of freedom of design, the degree of freedom is improved in setting the relationship between the lever turning manipulation and the mixing ratio between heated water and cold water. Moreover, the degree of freedom is improved in setting the relationship between the discharge amount and the manipulation of back-and-forth rotation of the lever.

Generally, the supply pressure of heated water to be supplied to the heated water valve hole 80 is lower than the supply pressure of cold water to be supplied to the cold water valve hole 82. This is the result of heated water reaching the mixer tap 10 through the water heater. Since the straight portion ST is provided on the heated water valve hole 80 side, the region XZ (FIG. 23(*b*)) is easily increased by a smaller turning angle in the turning to the heated water side (the turning to the left side in FIG. 19). More specifically, in switching the state from the state in which only cold water is discharged to the state in which heated water is mixed, the mixing ratio of heated water is easily increased. Thus, such an event can be suppressed that the discharge water temperature is hardly increased even though the lever is at the side-to-side position at which heated water is mixed. Accordingly, it is possible to implement the mixer tap 10 that the temperature is easily adjusted.

Lf is the length of the under surface opening line 94L in the direction in parallel with the linear direction D1. In the present application, the straight portion ST means a portion formed of a line that the radius of curvature is equal to or greater than twice the length Lf. The radius of curvature may be changed on the straight portion ST. From the viewpoint of the ease of manufacture and design, the straight portion ST is preferably formed of a line that the radius of curvature is equal to or greater than three times the length Lf, and most preferably, the shape of the straight portion ST is a linear line. It is noted that the radius of curvature of the straight portion ST can be equal to or greater than 20 mm, and equal to or greater than 25 mm as well, and 28 mm, for example.

From the viewpoints of preventing heated water from being mixed in the case where the lever side-to-side position is at the center circumferential position C1, and improving the degree of freedom of design for the valve holes, the angle θx (see FIG. 23) is preferably equal to or greater than 5 degrees, more preferably equal to or greater than 10 degrees, and much more preferably equal to or greater than 20 degrees. From the viewpoint of a smooth manipulation of back-and-forth rotation of the lever 46, the angle θx is preferably equal to or less than 45 degrees, more preferably equal to or less than 40 degrees, and much more preferably equal to or less than 35 degrees. In the embodiment, the angle θx is 30 degrees.

It is noted that projecting portions m1 are provided on the under surface opening line 94L. The projecting portions m1 can relax a sudden flow of heated water or cold water into the passage forming recess 94 in changing the state from the water stop state to the discharge state. Thus, these projecting portions m1 contribute to suppressing a water hammer.

FIGS. 24(*b*), 24(*c*), and 24(*d*) are exemplary modifications of the under surface opening line 94L. As illustrated in FIG. 24(*c*), the straight portion ST may not be provided. Moreover, as illustrated in FIG. 24(*d*), the straight portion ST may be provided on both of the heated water valve hole 80 side and the cold water valve hole 82 side. The water discharge specifications can be modified by the shape of the under surface opening line 94L.

The foregoing moving direction regulating mechanism is the configuration that implements the incline of the linear direction D1 with respect to the longitudinal direction D2. FIGS. 25(*a*) and 25(*b*) are cross-sectional views of the lever assembly 40 in the water discharge state. FIG. 25(*a*) is a cross-sectional view along the top surface of the upper side member 86, and FIG. 25(*b*) is a cross-sectional view along the vertical direction of the shaft hole 100 of the lever 46. FIGS. 25(*c*) and 25(*d*) are cross-sectional views of the lever assembly 40 in the water stop state. FIG. 25(*c*) is a cross-sectional view along the top surface of the upper side member 86, and FIG. 25(*d*) is a cross-sectional view along the vertical direction of the shaft hole 100 of the lever 46. The members in the shaft hole 100 are omitted in FIGS. 25(*b*) and 25(*d*).

As illustrated in FIGS. 25(*a*) and 25(*c*), a gap Gp is provided between the lower end portion (the hatched portion) of the lever 46 and the lever engaging recess 98. As described above, the moving direction of the lower end portion of the lever 46 is the longitudinal direction D2 due to the back-and-forth rotation of the lever 46, and the moving direction of the movable valve body 60 (the upper side member 86) is the linear direction D1. The gap Gp permits the movable valve body 60 to move along the linear direction D1. Because of the existence of the gap Gp, the lower end portion of the lever 46 does not interfere with the movement of the movable valve body 60 although the linear direction D1 is different from the longitudinal direction D2.

As illustrated in FIG. 25(*a*), in the state in which the discharge amount is at the maximum, the gap Gp is located on the right side of the lever 46 when seen from the user side of the mixer tap 10, and in this case, the gap Gp does not substantially exist on the left side of the lever 46. Meanwhile, as illustrated in FIG. 25(*c*), in the water stop state, the gap Gp is located on the left side of the lever 46 when seen from the user side of the mixer tap 10, and in this case, the gap Gp does not substantially exist on the right side of the lever 46. With these configurations, the dimensions of the gap Gp are at the minimum. It is noted that although not illustrated in the drawing, in the intermediate state between the maximum water discharge state and the water stop state, the gap Gp exists on the right side and left side of the lever 46 when seen from the user side of the mixer tap 10. A reference sign G1 in FIG. 25(*a*) expresses a gap distance on the right side of the lever 46. A reference sign G2 in FIG. 25(*c*) expresses a gap distance on the left side of the lever 46. [G1+G2] is constant regardless of the position of the lever 46 in the vertical direction.

The lever engaging recess 98 includes a first side surface 98*a* and a second side surface 98*b* (see FIGS. 13(*a*), 25(*b*), and 25(*d*)). The first side surface 98*a* is a plane. The second side surface 98*b* is a plane.

The lower end portion of the lever 46 includes a first curved surface Rs1 and a second curved surface Rs2. The first curved surface Rs1 and the second curved surface Rs2 are projecting curved surfaces.

In the back-and-forth rotation of the lever 46, the first curved surface Rs1 contacts the first side surface 98*a*. This contact (referred to as a contact 1) is in line contact. When the lever 46 is rotated on the discharge side, the first curved surface Rs1 presses the first side surface 98*a* to move the movable valve body 60. Although the position of line contact is moved in the vertical direction depending on the position in the back-and-forth rotation of the lever, the line contact is kept regardless of the position in the back-and-forth rotation of the lever.

In the back-and-forth rotation of the lever 46, the second curved surface Rs2 contacts the second side surface 98*b*. This contact (referred to as a contact 2) is in line contact. When the lever 46 is rotated on the water stop side, the second curved surface Rs2 presses the second side surface 98b to move the movable valve body 60. Although the position of line contact is moved in the vertical direction depending on the position in the back-and-forth rotation of the lever, the line contact is kept regardless of the position in the back-and-forth rotation of the lever.

As described above, although the contact position is moved in association with the manipulation of back-and-forth rotation of the lever, the first curved surface Rs1 and the second curved surface Rs2 reduce the frictional resistance in association with the movement of the contact position. Thus, a smooth lever manipulation is implemented.

In a cross section taken along a plane vertical to the rotation axis of the lever 46, the cross section line of the first curved surface Rs1 is a circular arc (referred to as a circular arc 1), and it is supposed that the radius of the circular arc 1 is r1. In the cross section taken along the plane vertical to the rotation axis of the lever 46, the cross section line of the second curved surface Rs2 is a circular arc (referred to as a circular arc 2), and it is supposed that the radius of the circular arc 2 is r2. The radius r1 is equal to the radius r2. The center of the circular arc 1 is the same as the center of the circular arc 2. That is, the circular arc 1 and the circular arc 2 are on the same circumference of a circle.

Figure 25A:
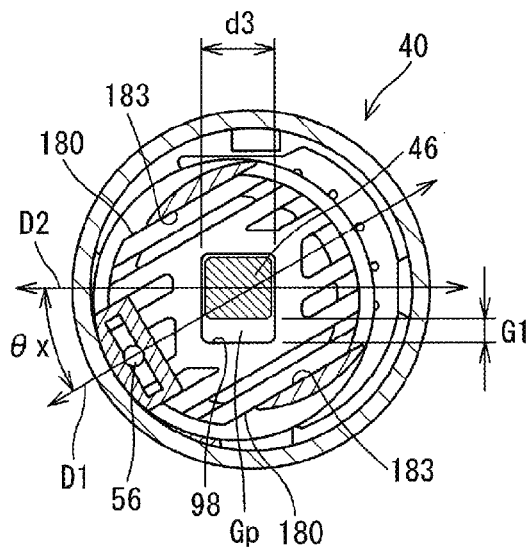
FIG. 25(a) is a cross-sectional view of the lever assembly along the top surface of the upper side member.
Figure 25C:
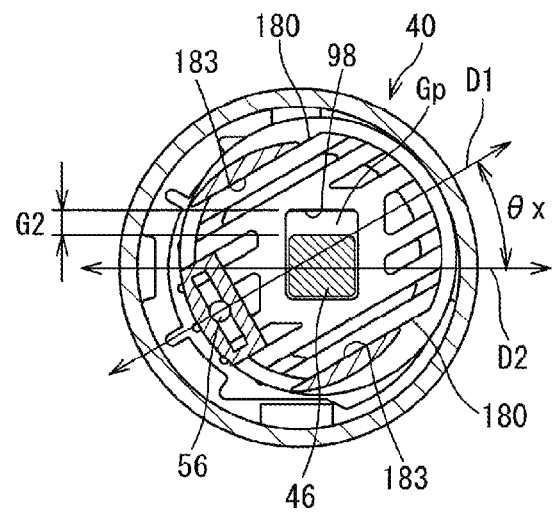
FIG. 25(c) is a cross-sectional view of the lever assembly along the top surface of the upper side member.
Figure 25B:
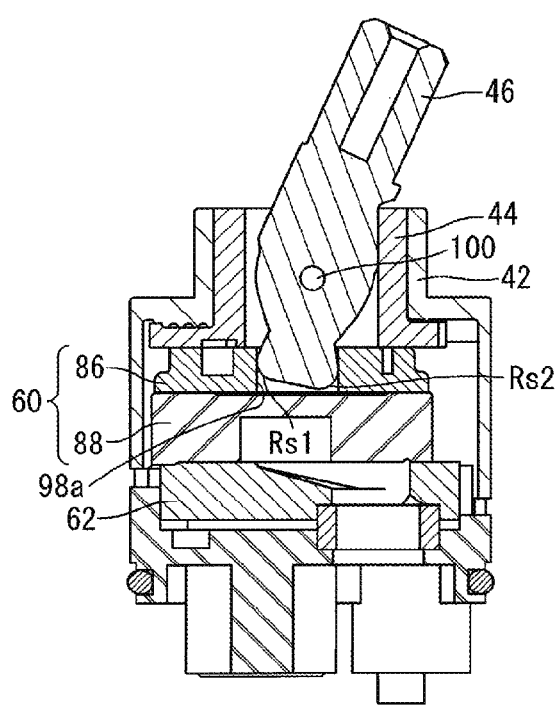
FIG. 25(b) is a cross-sectional view of the lever assembly along the direction vertical to the lever shaft.
Figure 25D:
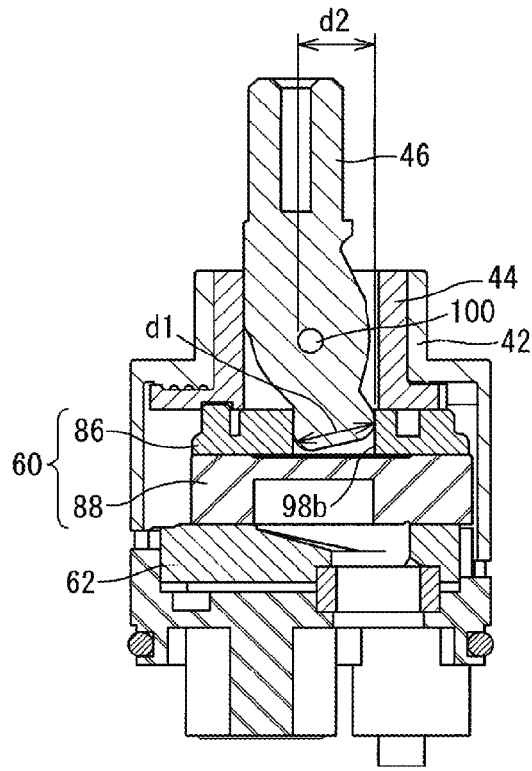
FIG. 25(d) is a cross-sectional view of the lever assembly along the direction vertical to the lever shaft.

A two-directional arrow d1 in FIG. 25(d) expresses the diameter of a circle including the circular arc 1 and the circular arc 2. A two-directional arrow d3 in FIG. 25(a) expresses a distance between the first side surface 98a and the second side surface 98b. From the viewpoint of suppressing a play and rattles in the manipulation of back-and-forth rotation of the lever, a difference (d3−d1) is preferably equal to or less than 0.2 mm, more preferably, equal to or less than 0.1 mm, and much more preferably equal to or less than 0.05 mm. From the viewpoint of relaxing dimension accuracy, a difference (d3−d1) is preferably equal to or greater than 0 mm, more preferably equal to or greater than 0.01 mm and much more preferably equal to or greater than 0.02 mm.

Both of the first curved surface Rs1 and the second curved surface Rs2 are a part of the same cylindrical surface (in the following, referred to as a virtual cylindrical surface). A center axis line Cz of the virtual cylindrical surface is vertical to the longitudinal direction D2. This center axis line Cz is in parallel with the center axis line of the back-and-forth rotation of the lever 46. Even though the movable valve body 60 is moved along the linear direction D1, the first side surface 98a and the second side surface 98b always contact the virtual cylindrical surface. That is, although the linear direction D1 is different from the longitudinal direction D2, the contact between the first side surface 98a and the first curved surface Rs1 is maintained. Similarly, although the linear direction D1 is different from the longitudinal direction D2, the contact between the second side surface 98b and the second curved surface Rs2 is maintained. These contacts are always in line contact. Therefore, a stable contact between the lever engaging recess 98 and the lower end portion of the lever 46 is maintained across the entire range of rotating the lever up and down while implementing the difference between the linear direction D1 and the longitudinal direction D2. Moreover, since the form of contact is in line contact, the frictional resistance is suppressed. Furthermore, the directions of the lines of these line contacts are along the direction of relative displacement between the side surfaces 98a, 98b and the curved surfaces Rs1, Rs2. Thus, the frictional resistance is suppressed. With these configurations, the manipulation of back-and-forth rotation of the lever 46 is smooth and stable.

Since the movable valve body 60 is moved in the linear direction D1 different from the longitudinal direction D2, a slide in the horizontal direction is taken place between the first curved surface Rs1 and the first side surface 98a. The shape of the first curved surface Rs1 reduces the frictional resistance in association with the slide, and a smooth lever manipulation is implemented. Similarly, a slide in the horizontal direction takes place between the second curved surface Rs2 and the second side surface 98b. The shape of the second curved surface Rs2 reduces the frictional resistance in association with the slide, and a smooth lever manipulation is implemented.

It is noted that the depth of the recess 96 (see FIGS. 8 and 21(a)) is set in such a way that the lower end of the lever 46 does not contact the movable valve body 60 (the upper side member 86) in the entire range of the back-and-forth rotation of the lever 46. This makes the manipulation of back-and-forth rotation of the lever 46 smooth.

Because of the smoothness of the side-to-side rotation of the lever 46, the sensitivity of a side-to-side click feeling is improved. For example, a minute side-to-side click feeling is easily recognized. Thus, the degree of freedom of setting a side-to-side click feeling can be improved. Because of the smoothness of the back-and-forth rotation of the lever 46, the sensitivity of a back-and-forth click feeling is improved. For example, a minute back-and-forth click feeling is easily recognized. Thus, the degree of freedom of setting of a back-and-forth click feeling can be improved.

A two-directional arrow d2 in FIG. 25(d) expresses a distance between the rear side end of the shaft hole 100 of the lever 46 (the end on the water stop side) and the second side surface 98b. This distance d2 is measured along the direction vertical to the second side surface 98b. The distance d2 is nearly equal to the diameter of d1. The absolute value of a difference (d1−d2) is set within 0.05 mm. That is, d2=d1±0.05 mm. The relationship of the dimension contributes to downsizing the lower end portion of the lever 46 and the movable valve body 60. For the entire range of the back-and-forth rotation of the lever 46, the position of the shaft hole 100 in the horizontal direction falls between the first side surface 98a and the second side surface 98b.

As described above, in the foregoing embodiment, a click feeling (a back-and-forth click feeling) in the back-and-forth rotation is varied depending on the lever side-to-side position. In the foregoing embodiment, the difference in the back-and-forth click feeling is the presence or absence of a back-and-forth click feeling. The presence or absence of a back-and-forth click feeling is easily determined. In the foregoing embodiment, it is easily determined whether heated water is mixed or not by the presence or absence of a back-and-forth click feeling.

It is difficult to determine whether heated water is mixed or not only from the discharge water temperature. For example, in the case where the mixing ratio of heated water is small, the temperature is less increased as compared with the case where cold water is at 100%. Thus, in this case, it is sometimes difficult to notice the mixing of heated water only from the discharge water temperature. Moreover, even in the case where the mixing ratio of heated water is great, the discharge water temperature is sometimes not increased until heated water heated at a heater such as a water heater reaches a tap. Also in this case, it is sometimes difficult to notice the mixing of heated water only from the discharge water temperature. Furthermore, it may not be possible to accurately determine whether heated water is mixed or not also from the circumferential position of the handle 14. In such a case, heated water is sometimes unintentionally mixed. That is, heated water is sometimes actually mixed although a user intends to use discharge water mixed with no heated water (cold water is at 100%). In this case, energy is wasted. In the foregoing embodiment, it is easily determined whether heated water is mixed or not depending on the presence or absence of a back-and-forth click feeling. Thus, energy waste is suppressed.

In the embodiment, the angle range in which a click feeling is generated can be freely designed by changing the specification of the under surface of the housing 42 (the under surface 125 of the coupling portion 124). For example, the lever side-to-side position at which a back-and-forth click feeling is effected can be freely changed by changing the position of the click mechanism effecting portion 146 (see FIG. 10). Thus, for example, the click mechanism effecting portion 146 and the click ineffective portion 148 in FIG. 10 can be exchanged. In this case, a back-and-forth click feeling is not effected in the heated water mixed discharge range, and a back-and-forth click feeling is effected in the cold water discharge range.

Moreover, for example, the click mechanism effecting portion 146 can also be provided in the angle range Rf2, for example, (see FIG. 10). Thus, the click mechanism effecting portion 146 may be provided only in the angle range Rf as in the embodiment, may be provided in both of the angle range Rf and the angle range Rf2, or may be provided only in the angle range Rf2. Therefore, the degree of freedom of design for a back-and-forth click feeling and a side-to-side click feeling is great.

The area of the under surface of the housing 42 is relatively wide. Thus, the degree of freedom of design for a recess and/or a projection is great. The recess and/or the projection is provided on the housing 42, so that the degree of freedom of design for a click feeling is improved.

The click mechanism effecting portion 146 is not intermittently provided in the circumferential direction. The click mechanism effecting portion 146 may be intermittently provided in the circumferential direction as different from the case above. In this case, the lever side-to-side position at which a back-and-forth click feeling is effected can be intermittently provided.

The click mechanism effecting portion 146 is provided in the entire range of the back-and-forth rotation of the lever. The click mechanism effecting portion 146 may be provided in apart in the range of the back-and-forth rotation of the lever as different from the case above. In this case, the range of the back-and-forth rotation of the lever in which a back-and-forth click feeling is effected can be limited.

Moreover, the specification of a click feeling can also be freely designed. For example, various click feelings can be obtained by changing the number, interval, shape, height, or the like of the grooves 154 or the projecting rims 156. The number of the grooves 154 and/or the number of the projecting rims 156 can determine a count N, described later. The under surface of the housing 42 is used for creating a click feeling, so that the degree of freedom of design for a click feeling is improved.

As described above, the form of the click mechanism effecting portion 146 is changed, so that a back-and-forth click feeling and a side-to-side click feeling can be set in various ways. Thus, a back-and-forth click feeling and a side-to-side click feeling can be set easily. The other exemplary modifications of the click mechanism effecting portion 146 will be described later.

A user can easily distinguish the presence or absence of a click feeling. An exemplary difference in a click feeling is the presence or absence of a click feeling. The setting of the presence or absence of a click feeling includes the following. Setting 1 below is a setting in the foregoing embodiment. In the following, the mixing ratio between heated water and cold water is expressed by percentage (%).

[Setting 1]: At the lever side-to-side position at which the mixing ratio of cold water is 100%, a back-and-forth click feeling is not generated. At the lever side-to-side position at which the mixing ratio of cold water is less than 100%, a back-and-forth click feeling is generated.

[Setting 2]: At the lever side-to-side position at which the mixing ratio of cold water is 100%, a back-and-forth click feeling is generated. At the lever side-to-side position at which the mixing ratio of cold water is less than 100%, a back-and-forth click feeling is not generated.

The other examples of the difference in a click feeling are as follows.

[Setting 3]: A back-and-forth click feeling is varied between the lever side-to-side position at which the mixing ratio of cold water is 100% and the lever side-to-side position at which the mixing ratio of cold water is less than 100%.

Setting 3 includes two types of back-and-forth click feelings, for example. Of course, there may be three types of back-and-forth click feelings or more. An example of this case is Setting 4 below.

[Setting 4]: A first back-and-forth click feeling is generated at the lever side-to-side position at which the mixing ratio of cold water is 100%, a second back-and-forth click feeling is generated at the lever side-to-side position at which the mixing ratio of cold water is Wa % or greater and less than 100%, and a third back-and-forth click feeling is generated at the lever side-to-side position at which the mixing ratio of cold water is less than Wa %.

The mixing ratio Wa % may be set to a ratio at which a water reaches a temperature at which a human body may be burnt when directly touching heated water, for example. In this case, it can be sensed by a click feeling whether hot water will be discharged or not.

The presence or absence of a click feeling and the difference in a click feeling may be combined. Setting 5 below is this example.

[Setting 5]: A back-and-forth click feeling is not generated at the lever side-to-side position at which the mixing ratio of cold water is 100%, a first back-and-forth click feeling is generated at the lever side-to-side position at which the mixing ratio of cold water is Wa % or greater and less than 100%, and a second back-and-forth click feeling is generated at the lever side-to-side position at which the mixing ratio of cold water is less than Wa %.

How to vary a back-and-forth click feeling is not limited. The specifications of back-and-forth click feelings that can be varied include the following.

[Specification 1]: The count N of a back-and-forth click feeling when the lever is rotated from the discharge stop position to the maximum discharge position.

[Specification 2]: A resistance in the manipulation of back-and-forth rotation of the lever when a back-and-forth click feeling is generated.

[Specification 3]: A sound when a back-and-forth click feeling is generated.

In an example related to Specification 1, the count N is equal to or less than 3 at a certain lever side-to-side position, and the count N is equal to or greater than 4 at another lever side-to-side position. In an example related to Specification 2, the resistance is relatively small at a certain lever side-to-side position, and the resistance is relatively great at another lever side-to-side position. In an example related to Specification 3, the frequency of a sound is relatively high at a certain lever side-to-side position, and the frequency of a sound is relatively low at another lever side-to-side position.

It is noted that the resistance is the same meaning as the rotation moment necessary to rotate the lever.

Settings 1 to 5 and Specifications 1 to 3 described above can be easily implemented only by changing the shape of the under surface 125 of the coupling portion 124. In the lever assembly 40, the degree of freedom of design for a click feeling is great.

The click mechanism according to the foregoing embodiment includes the configuration in which the ball is held by the elastic member 50 or the elastic member 58. With this configuration, the degree of freedom of design for a click feeling is great. The adjustment of a click feeling can be easily achieved only by changing the elastic coefficients of the elastic members 50 and 58, for example.

When the diameters of the balls 52 and 56 are changed, the amounts of protruding of the balls to the contact surface side can be changed. The balls 52 and 56 are used to effect the click mechanism, so that a click feeling can be changed only by changing the diameters of the balls. Thus, the adjustment of a click feeling is easy.

In the embodiment in FIG. 18, the degree of freedom of design for a side-to-side click feeling is further improved. In the embodiment, a side-to-side click feeling can be designed only by changing the length of the intermediate member 202 without changing the elastic member 200. Therefore, a side-to-side click feeling can be easily set. Since the intermediate member 202 is adopted, the elastic member 200 can be shorten. This shortness allows the ease of design of a side-to-side click feeling.

It is noted that in the foregoing embodiment, the housing 42 is integrally molded as a whole. The housing 42 may be formed of an assembly of separately molded members. Members that belong to the fixed member Z and can contact the ball 52 or the ball 56 include the housing.

A two-directional arrow L1 in FIG. 15 expresses the longitudinal length of the elastic member 50 in the state in which the ball 52 is not engaged with the projection 170. When the diameter of the upper part 104 is too small, the function necessary for the mixer tap 10 is not sometimes enabled to be implemented. From this viewpoint, the length L1 is preferably equal to or greater than 15 mm, and more preferably equal to or greater than 17 mm. In the mixer tap 10 excessively upsized, the commercial value is degraded. From this viewpoint, the length L1 is preferably equal to or less than 30 mm, and more preferably equal to or less than 25 mm. In the embodiment in FIG. 15, the length L1 was set to 19 mm.

A two-directional arrow L2 in FIG. 18 expresses the longitudinal length of the elastic member 200 in the state in which the ball 52 is not engaged with the projection 170. From the viewpoint of obtaining a smooth side-to-side click feeling, the ratio of the length L2 to the length L1 is preferably equal to or greater than 5%, more preferably equal to or greater than 10%, and much more preferably equal to or greater than 20%. From the viewpoint of facilitating the design of a side-to-side click feeling, the ratio of the length L2 to the length L1 is preferably equal to or less than 45%, more preferably equal to or less than 40%, and much more preferably equal to or less than 35%. In the embodiment in FIG. 18, the ratio of the length L2 to the length L1 in the embodiment in FIG. 15 was 30%.

From the viewpoint of obtaining an clear side-to-side click feeling, a height Ha of the projection 170 (see FIG. 15) is preferably equal to or greater than 0.05 mm, more preferably equal to or greater than 0.1 mm, and much more preferably equal to or greater than 0.15 mm. In the case where the height Ha is excessively large, the thickness of the housing 42 or the rotating body 44 becomes too thin, and durability can be reduced. From this viewpoint, the height Ha is preferably equal to or less than 1.0 mm, more preferably equal to or less than 0.5 mm, and more preferably equal to or less than 0.4 mm. In the foregoing embodiment, the height Ha of the projection 170 was set to 0.3 mm.

From the viewpoint of obtaining a clear back-and-forth click feeling, a height Hb of the projection 156 (the depth Dv of the groove 154) is preferably equal to or greater than 0.05 mm, more preferably equal to or greater than 0.1 mm, and much more preferably equal to or greater than 0.15 mm. In the case where the height Hb is excessively large, the thickness of the housing 42 or the rotating body 44 becomes too thin, and durability can be reduced. From this viewpoint, the height Hb (the depth Dv) is preferably equal to or less than 1.0 mm, more preferably equal to or less than 0.5 mm, and much more preferably equal to or less than 0.4 mm. In the foregoing embodiment, the height Hb of the projection 156 was set to 0.3 mm.

From the viewpoint of the ease of assembly and from the viewpoint of obtaining a clear side-to-side click feeling, the diameter Pa of the ball 52 is preferably equal to or greater than 1.0 mm, more preferably equal to or greater than 2.0 mm, and much more preferably equal to or greater than 3.0 mm. In the case where the diameter Pa is excessively large, the diameter of the lever shaft 48 is sometimes excessively large, or the lever assembly 40 is sometimes excessively upsized. In order to avoid the upsizing, the housing 42, for example, can be excessively reduced in the thickness. From these viewpoints, the diameter Pa is preferably equal to or less than 5.0 mm, and more preferably equal to or less than 4.0 mm. In the foregoing embodiment, the diameter Pa of the ball 52 was set to 3.0 mm.

From the viewpoint of the ease of assembly and from the viewpoint of obtaining an clear back-and-forth click feeling, the diameter Pb of the ball 56 is preferably equal to or greater than 1.0 mm, more preferably equal to or greater than 2.0 mm, and much more preferably equal to or greater than 3.0 mm. In the case where the diameter Pb is excessively large, the width of the through hole 110 for securing the height of the upper protruding portion becomes excessively large. Furthermore, in the case where the diameter Pb is excessively large, the width of the groove 154 that can be engaged with the ball 56 is also formed largely. In this case, it is sometimes difficult to provide a necessary number of the grooves 154 on the under surface 125 which is a limited space. From these viewpoints, the diameter Pb is preferably equal to or less than 5.0 mm, and more preferably equal to or less than 4.0 mm. In the foregoing embodiment, the diameter Pb of the ball 56 was set to 3.0 mm.

The material of the housing includes a resin and a metal. This resin includes a fiber reinforced resin. Preferably, a sound generated in effecting the click mechanism is comfortable and easy to catch. The material of the housing affects this sound. In consideration of the viewpoint of obtaining an excellent sound, durability, antirust properties, and hygiene aspects, a stainless steel alloy and a fiber reinforced resin are preferable for the material of the housing. In the foregoing embodiment, a glass fiber reinforced PPS resin was used. The PPS resin means a polyphenylene sulfide resin.

The material of the rotating body includes a resin and a metal. This resin includes a fiber reinforced resin. When metals are slid on each other in manipulating the lever, an unpleasant sound is sometimes generated. Moreover, the material of the sliding surface affects the operability of the lever because the friction force is varied. From the viewpoints of the operability and avoiding an unpleasant sound, the material of the rotating body is preferably a resin, and more preferably a resin not including reinforced fiber. In the foregoing embodiment, a POM resin not including reinforced fiber was used. The POM resin means a polyacetal resin.

The material of the shaft holder includes a resin and a metal. This resin includes a fiber reinforced resin. When metals are slid on each other in manipulating the lever, an unpleasant sound is sometimes generated. Moreover, the material of the sliding surface affects the operability of the lever because the friction is varied. From the viewpoints of the operability and avoiding an unpleasant sound, the material of the shaft holder is preferably a resin, and more preferably a resin not including reinforced fiber. In the foregoing embodiment, a POM resin not including reinforced fiber was used.

The material of the ball includes a resin and a metal. From the viewpoint of the sound and durability of the click mechanism, a metal is much more preferable. In the foregoing embodiment, stainless steel alloy was used.

The elastic body for use in the click mechanism in turning manipulation includes rubber and a coil spring. From the viewpoint of suppressing degradation due to repeated use and from the viewpoint of the degree of freedom of adjusting a click feeling, a coil spring is preferable. Preferably, the material of this coil spring is a spring steel material. In the foregoing embodiment, a coil spring of a spring steel material was used.

The elastic body for use in the click mechanism in the manipulation of back-and-forth rotation includes rubber, a plate spring, and a coil spring. From the viewpoint of suppressing the space in the vertical direction, a plate spring is preferable. In the foregoing embodiment, a plate spring of a spring steel material was used.

The material of the lever shaft includes a resin and a metal. This resin includes a fiber reinforced resin. From the viewpoint of suppressing corrosion due to cold water, a stainless steel alloy and a resin are preferable. In the foregoing embodiment, a stainless steel alloy was used.

The material of the upper side member of the movable valve body includes a resin and a metal. This resin includes a fiber reinforced resin. When metals are slid on each other in manipulating the lever, an unpleasant sound is sometimes generated. From the viewpoint of avoiding an unpleasant sound, the material of the upper side member is preferably a resin. If the upper side member is made of a resin, manufacturing costs of the movable valve body as a whole are suppressed. In the foregoing embodiment, a POM resin not including reinforced fiber was used.

The material of the lower side member of the movable valve body includes a resin (including a fiber reinforced resin), a metal, and a ceramic. From the viewpoint of the abrasion resistance properties in sliding on the fixed valve body, a ceramic is preferable. Also from the viewpoint of corrosiveness against water, strength, and durability, a ceramic is preferable. In the foregoing embodiment, a ceramic was used. If the under surface of the movable valve body is made of a ceramic, the effect a and the effect b are further improved.

The material of the fixed valve body includes a resin (including a fiber reinforced resin), a metal, and a ceramic. From the viewpoint of abrasion resistance properties in sliding on the movable valve body (the lower side member), a ceramic is preferable. Also from the viewpoint of corrosiveness against water, strength, and durability, a ceramic is preferable. In the foregoing embodiment, a ceramic was used. If the top surface of the fixed valve body is configured of a ceramic, the effect a and the effect b are further improved.

The materials of the packing and the O-ring include a resin and a rubber material (vulcanized rubber). Because of the stretching properties, the ease of assembly can be improved, and manufacture errors (such as dimension errors) can be relaxed. From these viewpoints, a rubber material is preferable. In the foregoing embodiment, a rubber material was used.

The material of the base body includes a resin (including a fiber reinforced resin) and a metal. From the viewpoint of avoiding an unpleasant sound and strength, a fiber reinforced resin is preferable, and a glass fiber reinforced resin is more preferable. In the foregoing embodiment, a glass fiber reinforced PPS resin was used.

In the case where resins are used for the materials of the members descried above, a POM resin and a PPS resin are preferable. The mechanical characteristics (such as tensile strength) of the POM resin do not chance over time when the POM resin is used for a long time and when it is used in a wide temperature range. Moreover, the POM resin is excellent in fatigue resistance against a repeated stress load. Furthermore, the POM resin has a small dimension change due to water absorption. The PPS resin is excellent in strength and stiffness, and also in the abrasion resistance properties. In addition, the PPS resin has a small shrinkage ratio when molded, and can achieve a high dimension accuracy. In order to further improve these characteristics, the resins are preferably reinforced using short fiber such as glass fiber.

FIG. 26 shows a mixer tap according to another embodiment. As described above, RT1 expresses the angle range in which heated water is not mixed, and RT2 expresses the angle range in which heated water is mixed with cold water or cold water is not mixed (heated water is at 100%). In the embodiment, the boundary K1 between the angle range RT1 and the angle range RT2 is positioned on the left side of the front position S1. Thus, even in the case where the lever side-to-side position is displaced from the front position S1, only cold water can be discharged. Therefore, the unintended mixing of heated water can be suppressed, and this can contribute to energy saving. A two-directional arrow θk in FIG. 26 expresses an angle between the front position S1 and the boundary K1. From the viewpoint of energy saving, the angle θk is preferably equal to or greater than 2 degrees, more preferably equal to or greater than 5 degrees, and much more preferably equal to or greater than 8 degrees. When the angle range RT2 becomes excessively narrow, it is sometimes difficult to adjust the discharge water temperature. From this viewpoint, the angle θk is preferably equal to or less than 20 degrees, more preferably equal to or less than 15 degrees, and much more preferably equal to or less than 12 degrees. However, the angle θk can be any angle depending on the purposes.

The circumferential position (the angle θk) of the boundary K1 is adjusted according to the foregoing angle θx, for example. Of course, the angle θk may be adjusted according to the positions and shapes, for example, of the valve holes and the passage forming recess.

Figure 27:
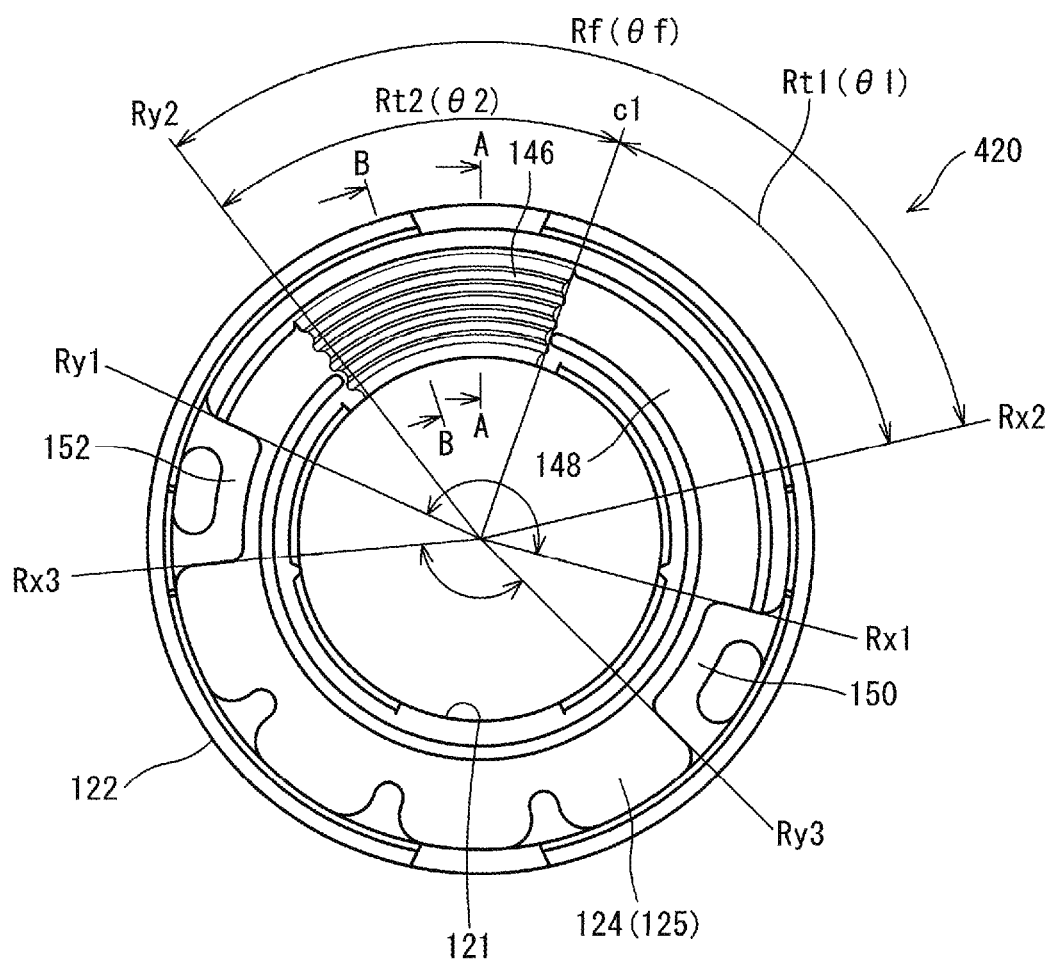
FIG. 27 is a bottom view of a housing according to an exemplary modification.

FIGS. 27, 28(a), and 28(b) show a housing 420 according to an exemplary modification. The difference between the housing 420 and the foregoing housing 42 is only the cross-sectional shape of the click mechanism effecting portion 146.

FIG. 28(a) is a cross-sectional view taken along line A-A in FIG. 27. FIG. 28(b) is a cross-sectional view taken along line B-B in FIG. 27. In the housing 420, the depth Dv of the groove 154 (the height Hb of the projecting rim 156) is varied at positions in the circumferential direction. The depth Dv in FIG. 28(b) is greater than the depth Dv in FIG. 28(a). Because of the difference in the depth Dv, a back-and-forth click feeling is different. A back-and-forth click feeling (for example, manipulation resistance, a vibration, a sound, or the combination of them) becomes greater as the depth Dv becomes greater. The difference in the depth Dv can be set in various ways. The depth Dv may be changed gradually (continuously) in the circumferential direction, or may be changed step by step (uncontinuously) in the circumferential direction. Moreover, the depth Dv may become greater as the temperature is increased, or the depth Dv may become greater as the temperature is reduced.

The housing 420 achieves Difference (A) below.

(A) A back-and-forth click feeling is varied depending on the lever side-to-side position.

In the case where the depth Dv is uncontinuously changed, a side-to-side click feeling can be generated due to the uncontinuous change (such as steps). Moreover, a recess and/or a projection may be locally provided in the circumferential direction in the click mechanism effecting portion 146. The recess and/or the projection can effect a side-to-side click feeling. As described above, the click mechanism effecting portion 146 can cause aback-and-forth click feeling as well as a side-to-side click feeling.

Figure 29:
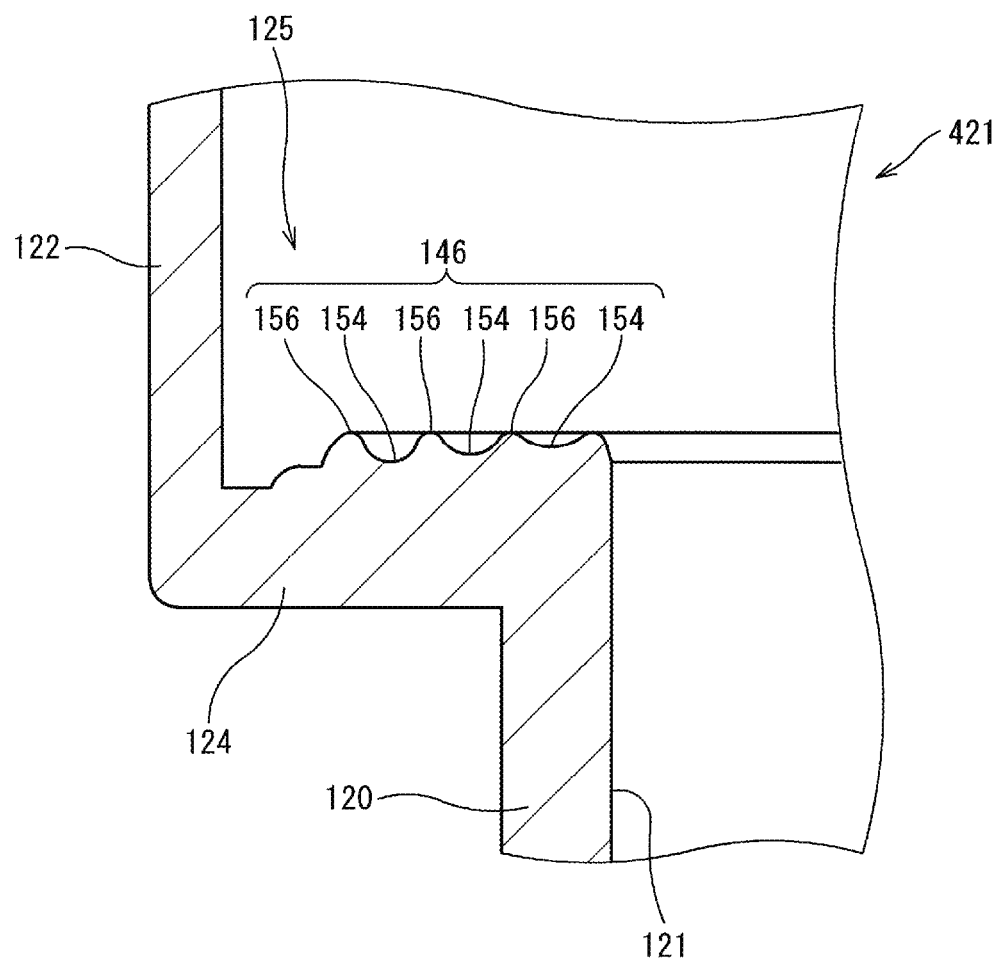
FIG. 29 is a cross-sectional view of a housing according to another exemplary modification.

FIG. 29 is a housing 421 according to still another exemplary modification. In the housing 421, the depth Dv of the groove 154 (the height of the projecting rim 156) is varied depending on the radial positions in the housing 421. In the embodiment in FIG. 29, the depth Dv is made greater as going to the outer radial direction. The difference in the depth Dv can be set in various ways. The depth Dv may be made greater as going to the outer radial direction, or may be made smaller as going to the outer radial direction. In the embodiment, Difference (B) below is achieved.

(B) A back-and-forth click feeling is varied depending on the lever back-and-forth position.

The configuration of the housing 420 may be combined with the configuration of the housing 421. That is, the depth Dv may be varied depending on the positions in the circumferential direction and varied depending on the radial positions. This combination can effect various click feelings.

Figure 30:
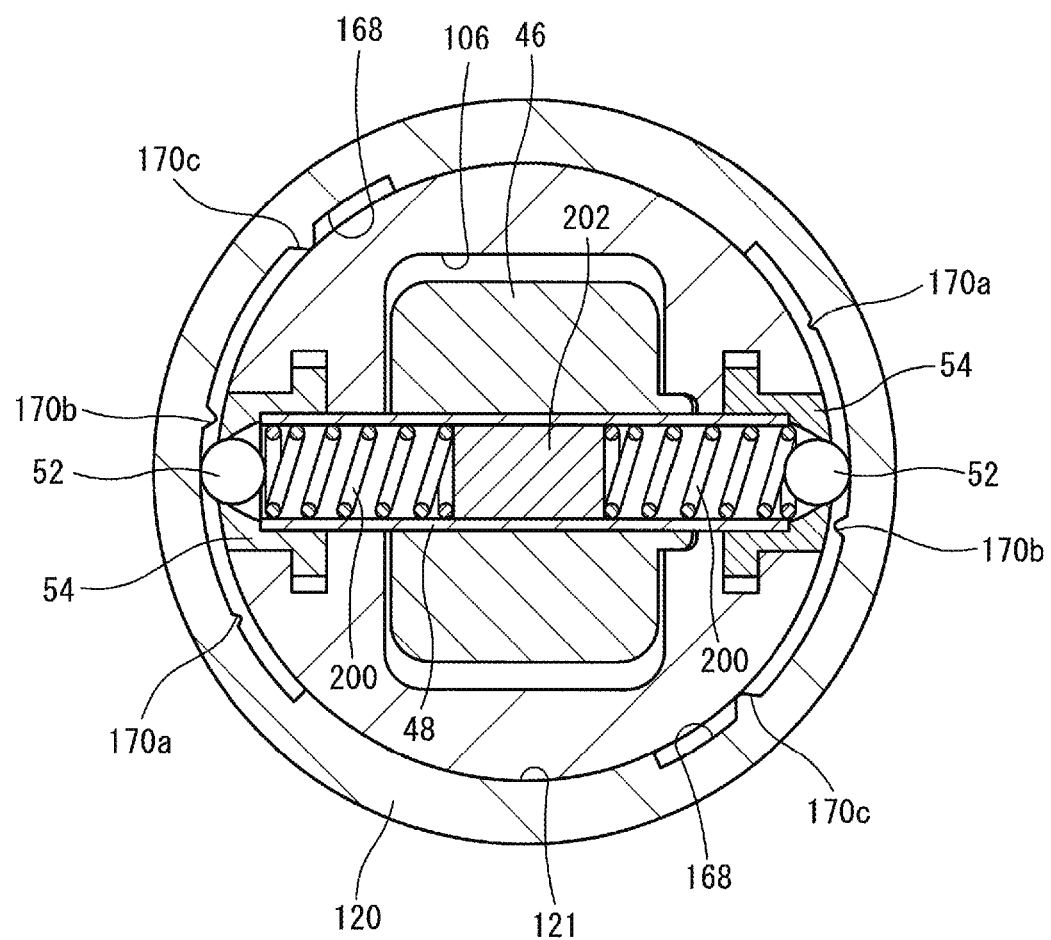
FIG. 30 is a cross-sectional view of a lever assembly according to an exemplary modification.

FIG. 30 is a cross-sectional view of an exemplary modification of the embodiment in FIG. 18. In the embodiment, the height of the projection 170 is varied depending on the positions in the circumferential direction. The embodiment includes a projection 170a in a first height H1, a projection 170b in a second height H2, and a projection 170c in a third height H3. In the embodiment, the relationship of the sizes among the heights is H3>H2>H1. The forms of the differences among the heights are not limited, and include H3<H2<H1, H3<H2>H1 and H3>H2<H1, for example. The difference of the height allows an increase in a side-to-side click feeling at higher temperature, or an increase in a side-to-side click feeling at lower temperature, for example. Moreover, a side-to-side click feeling can be made at the maximum at a specific lever side-to-side position. Various side-to-side click feelings can be obtained by changing the number and height of the projections. Of course, recesses in different depths may be adopted instead of the projections in different heights. In the embodiment, Difference (C) below is achieved.

(C) A side-to-side click feeling is varied depending on the lever side-to-side position.

Here, the sorts of members X, Y, and Z will be described. The members configuring the lever assembly 40 can be sorted into three members below.

(1) The member X: a member that is rotated in conjunction with rotation of the lever from side to side and moved in conjunction with rotation of the lever back and forth.

(2) The member Y: a member that is rotated in conjunction with rotation of the lever from side to side but not moved by rotating the lever back and forth.

(3) The fixed member Z: a member that is not moved in conjunction by any manipulations of the lever (the member is not moved and not rotated).

The member X in (1) above includes the movable valve body 60 (the upper side member 86 and the lower side member 88). The member Y in (2) above includes the rotating body 44. The fixed member Z in (3) above includes the housing 42, the fixed valve body 62, and the base body 68.

In the foregoing embodiment, a back-and-forth click feeling can be varied depending on the lever side-to-side position. In the foregoing embodiment, the back-and-forth click mechanism is implemented by the engagement between the member X and the fixed member Z.

Preferably, the rotating body 44 is not moved in the back-and-forth rotation of the lever 46 in order to change the back-and-forth rotation of the lever 46 along with the linear movement of the movable valve body 60. Meanwhile, preferably, the rotating body 44 is rotated by turning the lever 46 in order to transmit the turning of the lever 46 to the movable valve body 60. The rotating body 44 (the member Y) is positioned on the upper side of the member X (the movable valve body 60). That is, the rotating body 44 (the member Y) is provided between the member X (the movable valve body 60) and the under surface of the member Z (the housing 42). Thus, it is difficult to engage the member X with the member Z. However, in the embodiment, despite of the interposition of the member Y (the rotating body 44), the engagement between the member X (the movable valve body 60) and the member Z (the housing 42) is implemented. With this configuration, a back-and-forth click feeling can be varied depending on the lever side-to-side position.

The back-and-forth click mechanism can be configured between the members that are relatively displaced in association with back and forth rotation of the lever, for example. The members that are relatively displaced include the combination of the member X and the fixed member Z. Preferably, the back-and-forth click mechanism is configured between the member X and the fixed member Z. For example, it is possible to implement the back-and-forth click mechanism by providing a recess and/or a projection and an advancing/retracting mechanism between the member X and the fixed member Z. The advancing/retracting mechanism may be provided on the member X, or may be provided on the fixed member Z. The recess and/or the projection may be provided on the member X, or may be provided on the fixed member Z. From the viewpoint of the degree of freedom of design for a click feeling, preferably, the degree of freedom of design for a recess and/or a projection is great. From this viewpoint, preferably, the area of providing the recess and/or the projection is wide. From the viewpoint of providing the area, preferably, the recess and/or the projection is provided on the fixed member Z, and more preferably, provided on the housing 42.

In the foregoing embodiment, as an example of the member X concerning the back-and-forth click mechanism, the movable valve body 60 (the upper side member 86) is adopted. In the foregoing embodiment, as an example of the fixed member Z concerning the back-and-forth click mechanism, the housing 42 is adopted. In the foregoing embodiment, as an example of the advancing/retracting mechanism, the combination of the elastic body and the contact member (the ball) is adopted. Then, it is possible to implement Form (A) and/or Form (B) below in which a plurality of recesses and/or a plurality of projections are provided and the depth of the recess and/or the height of the projection are varied, for example.

(A) A back-and-forth click feeling is varied depending on the lever side-to-side position.

(B) A back-and-forth click feeling is varied depending on the lever back-and-forth position.

As described above, the back-and-forth click mechanism can be configured between the members that are relatively displaced in association with back and forth rotation of the lever. Thus, the combination of the member X and the fixed member Z for configuring the back-and-forth click mechanism is not limited to the foregoing embodiment. For example, the back-and-forth click mechanism may be configured between the movable valve body 60 (the lower side member 88) and the fixed valve body 62.

An exemplary configuration that can implement Form (A) is the housing 42 illustrated in FIG. 10 et al. and the housing 420 illustrated in FIGS. 27, 28(a), and 28(b), for example. Moreover, an exemplary configuration that can implement Form (B) is the housing 421 illustrated in FIG. 29.

The side-to-side click mechanism can be configured between the members that are relatively rotated in association with side-to-side rotation of the lever, for example. The members that are relatively rotated include the combination of the member Y and the fixed member Z. Preferably, the side-to-side click mechanism is configured between the member Y and the fixed member Z. For example, it is possible to implement the side-to-side click mechanism by providing a recess and/or a projection and an advancing/retracting mechanism between the member Y and the fixed member Z. In the foregoing embodiment, as an example of the member Y concerning the side-to-side click mechanism, the rotating body 44 is adopted. In the foregoing embodiment, as an example of the fixed member Z concerning the side-to-side click mechanism, the housing 42 is adopted. In the foregoing embodiment, as an example of the advancing/retracting mechanism, the combination of the elastic body and the ball is adopted. Then, it is possible to implement Form (C) below in which a plurality of recesses and/or a plurality of projections are provided and the depth of the recess and/or the height of the projection are varied, for example.

(C) A side-to-side click feeling is varied depending on the lever side-to-side position.

An exemplary configuration that can implement Form (C) is the embodiment illustrated in FIG. 30.

Moreover, Form (D) below is also possible.

(D) A side-to-side click feeling is varied depending on the lever back-and-forth position. An exemplary configuration that can implement Form (D) is (Dx) below.

(Dx) In the embodiment illustrated in FIGS. 10 and 11, projections and/or recesses are different depending on each of the grooves 154, and the position in the circumferential direction and/or the shape of the projection and/or the recess is varied in the individual grooves 154.

As described above, in the embodiment, the back-and-forth click mechanism is configured using the relative displacement between the member X and the fixed member Z. Thus, the degree of freedom of design for a back-and-forth click feeling can be improved. Moreover, the side-to-side click mechanism is configured using the relative rotation between the member Y and the fixed member Z. Thus, the degree of freedom of design for a side-to-side click feeling can be improved.

In the case where the back-and-forth click mechanism is configured using the relative displacement between the member X and the fixed member Z, preferably, the member X directly contacts the fixed member Z. However, another member may be provided between these two members. In this case, a through hole is provided in this another member, for example, and it is possible to implement the back-and-forth click mechanism using the relative displacement between the member X and the fixed member Z. An example of this through hole is the foregoing through hole 110. Similarly, the side-to-side click mechanism between the member Y and the fixed member Z may be possible even though the member Y does not directly contact the fixed member Z.

A click feeling is sensed by a human. A click feeling can provide a user with various items of information that are not enabled to be obtained through a visual sense. Preferably, a click feeling is sensed by a hearing sense and/or a tactile sense. From the viewpoint of improving sensitivity, a hearing sense and a tactile sense may be employed together. A click feeling sensed by a hearing sense includes a sound. A click feeling sensed by a tactile sense includes a change in the resistance and vibrations when manipulating the lever. The duration of a click feeling is not limited. Although a typical click feeling includes a change in a resistance and a sound for a relatively short time, a click feeling for relatively a long time is also possible.

Various items of information can be obtained by a click feeling. The items of information includes the following.

[Information 1]: Information related to the discharge water temperature.

[Information 2]: Information related to the discharge amount.

[Information 3]: Information related to the presence or absence of the mixing of heated water.

[Information 4]: Information related to the lever back-and-forth position.

[Information 5]: Information related to the lever side-to-side position.

The click feeling of Information 1 above includes the following.

[1a]: A side-to-side click feeling telling that the discharge water temperature becomes a high temperature.

[1b]: A side-to-side click feeling telling water discharge only with cold water (heated water is not mixed).

[1c]: A plurality of side-to-side click feelings telling stepwise that the discharge water temperature is changed.

[1d]: A back-and-forth click feeling telling that the discharge water temperature is at high temperature.

[1e]: A back-and-forth click feeling telling water discharge only with cold water (heated water is not mixed).

The side-to-side click feeling in 1a can contribute to suppressing water discharge at unintended high temperature, for example. The side-to-side click feeling in 1b can contribute to energy saving, for example. The side-to-side click feeling in 1c can facilitate setting a desired temperature, for example. The back-and-forth click feeling in 1d can contribute to avoiding water discharge at excessively high temperature, for example. The back-and-forth click feeling in 1e can contribute to energy saving, for example.

A click feeling of Information 2 above includes the following.

[2a]: A back-and-forth click feeling telling that the discharge amount is reached to apply the water heater.

[2b]: A plurality of back-and-forth click feelings telling stepwise that the discharge amount is changed.

The back-and-forth click feeling in 2a can contribute to energy saving, for example. The back-and-forth click feeling in 2b can contribute to avoiding an unintended discharge amount, for example.

The click feeling of Information 3 above includes the following.

[3a]: A side-to-side click feeling effected at the boundary K1.
[3b]: A side-to-side click feeling effected at the vicinity of the boundary K1.

The side-to-side click feeling in 3a can contribute to energy saving, for example. A side-to-side click feeling in 3b can contribute to energy saving, for example.

The vicinity of the boundary K1 in the feeling in 3b includes a range within ±10 degrees from the boundary K1, a range within ±7 degrees from the boundary K1, a range within ±5 degrees from the boundary K1, and a range within ±3 degrees from the boundary K1, for example.

The items of information of Information 4 above includes the following.
[4a]: A back-and-forth click feeling telling that the lever back-and-forth position is coming close to the maximum discharge position.
[4b]: A back-and-forth click feeling telling that the lever back-and-forth position is at the maximum discharge position.

The back-and-forth click feelings in 4a and 4b can contribute to relaxing an impact when the lever reaches the limit position, for example. The relaxing of the impact can suppress degradation in association with repeated use.

The items of information of Information 5 above includes the following.
[5a]: A side-to-side click feeling telling that the lever side-to-side position is coming close to the right limit MR.
[5b]: A side-to-side click feeling telling that the lever side-to-side position is coming close to the left limit ML.
[5c]: A side-to-side click feeling telling that the lever side-to-side position is at the right limit MR.
[5d]: A side-to-side click feeling telling that the lever side-to-side position is at the left limit ML.

The back-and-forth click feelings in 5a, 5b, 5c, and 5d can contribute to relaxing an impact when the lever reaches the limit position, for example. The relaxing of the impact can suppress degradation in association with repeated use.

In the mixer tap according to a preferable form, a click feeling is varied depending on the lever back-and-forth position and/or the lever side-to-side position. The difference allows a larger number of items of information to be transmitted to the user. The difference allows one or more items selected from the items of information to be effectively transmitted to the user, for example. Thus, a highly convenient mixer tap can be implemented.

The difference in the click feeling includes (A), (B), (C), and (D) below.
(A) A back-and-forth click feeling is varied depending on the lever side-to-side position.
(B) A back-and-forth click feeling is varied depending on the lever back-and-forth position.
(C) A side-to-side click feeling is varied depending on the lever side-to-side position.
(D) A side-to-side click feeling is varied depending on the lever back-and-forth position.

A more preferable form is at least one or a combination of two or more selected from (A), (B) and (C).

Form (A) above can exert various effects. Form (A) can provide a user with information related to the discharge water temperature (the mixing ratio of heated water). For example, when a back-and-forth click feeling is made more noticeable as the mixing ratio of heated water is more increased, Form (A) is useful for energy saving. The operation of rotating the lever back and forth without changing the lever side-to-side position is frequently performed in actual use. Form (A) is much more preferable because of the energy saving effect in the highly frequent operation. Moreover, the discharge water temperature can be easily adjusted.

Form (B) above can exert various effects. Form (B) can provide a user with information related to the discharge amount. For example, when a back-and-forth click feeling is made more noticeable as the discharge amount is more increased, Form (B) is useful for saving water sources and/or energy. Furthermore, the discharge amount of water can be easily adjusted.

Form (C) above can exert various effects. Form (C) can provide a user with information related to the discharge water temperature (the mixing ratio of heated water). For example, when a side-to-side click feeling is made more noticeable as the mixing ratio of heated water is more increased, Form (C) is useful for energy saving. In addition, the discharge water temperature can be easily adjusted.

Form (A) above includes the following.
(A1) A back-and-forth click feeling is varied between the cold water discharge position (cold water is at 100%) and the heated water mixed discharge position (heated water at 100% is included).
(A2) A back-and-forth click feeling is varied among the cold water discharge position (cold water is at 100%), the heated water mixed discharge position at which the ratio of cold water is high, the heated water mixed discharge position at which the ratio of cold water is low (heated water at 100% is included).
(A3) A back-and-forth click feeling is varied among the cold water discharge position (cold water is at 100%), the heated water mixed discharge position (heated water at 100% is not included), and the heated water discharge position (heated water is at 100%).
(A4) A back-and-forth click feeling is varied among the cold water discharge position (cold water is at 100%), the heated water mixed discharge position at which the ratio of cold water is high, the heated water mixed discharge position at which the ratio of cold water is low, and the heated water discharge position (heated water is at 100%).
(A5) A back-and-forth click feeling is varied among the cold water discharge position (cold water is at 100%), the heated water mixed discharge position at which the use frequency is high, and the heated water mixed discharge position at which the use frequency is not high (heated water at 100% is included).
(A6) A back-and-forth click feeling is varied among the cold water discharge position (cold water is at 100%), the heated water mixed discharge position at which the use frequency is high, the heated water mixed discharge position at which the use frequency is not high (heated water at 100% is not included), and the heated water discharge position (heated water is at 100%).

From the viewpoint of versatility, (A1), (A2), and (A3) are preferable. From the viewpoint of saving heated water, (A1) that is simple and easily shows whether heated water is used or not is preferable. Moreover, in the case where importance is put on the operability, (A2), (A3), (A4), (A5), and (A6) are preferable. From (A2) to (A6), the amount of information obtained from the difference in a click feeling is great, and the status of water discharge is easily understood.

Form (C) above includes the following.
(C1) A side-to-side click feeling is varied between the cold water discharge position (cold water is at 100%) and the heated water mixed discharge position (heated water at 100% is included).
(C2) A side-to-side click feeling is varied among the cold water discharge position (cold water is at 100%), the heated water mixed discharge position at which the ratio of cold water is high, and the heated water mixed discharge position at which the ratio of cold water is low (heated water at 100% is included).

(C3) A side-to-side click feeling is varied among the cold water discharge position (cold water is at 100%), the heated water mixed discharge position (heated water at 100% is not included), and the heated water discharge position (heated water is at 100%).

(C4) A side-to-side click feeling is varied among the cold water discharge position (cold water is at 100%), the heated water mixed discharge position at which the ratio of cold water is high, the heated water mixed discharge position at which the ratio of cold water is low, and the heated water discharge position (heated water is at 100%).

(C5) A side-to-side click feeling is varied among the cold water discharge position (cold water is at 100%), the heated water mixed discharge position at which the use frequency is high, and the heated water mixed discharge position at which the use frequency is not high (heated water at 100% is included).

(C6) A side-to-side click feeling is varied among the cold water discharge position (cold water is at 100%), the heated water mixed discharge position at which the use frequency is high, the heated water mixed discharge position at which the use frequency is not high (heated water at 100% is not included), and the heated water discharge position (heated water is at 100%).

From the viewpoint of versatility, (C1), (C2), and (C3) are preferable. From the viewpoint of saving heated water, (C1) that is simple and easily shows whether heated water is used or not is preferable. Moreover, in the case where importance is put on the operability, (C2), (C3), (C4), (C5), and (C6) are preferable. From (C2) to (C6), the amount of information obtained from the difference in a click feeling is great, and the status of water discharge is easily understood.

(C1) above may be combined with (C11) below.
(C11) A side-to-side click feeling is effected at the boundary between the cold water discharge range and the heated water mixed discharge position.

(C2) above may be combined with (C21) below.
(C21) A side-to-side click feeling kc1 is effected at the boundary between the cold water discharge range and the heated water mixed discharge range in which the ratio of cold water is high, and a side-to-side click feeling kc2 is effected at the boundary between the heated water mixed discharge range in which the ratio of cold water is high and the heated water mixed discharge range in which the ratio of cold water is low.

In (C21), the side-to-side click feeling kc1 may be different from the side-to-side click feeling kc2.

(C3) above may be combined with (C31) below.
(C31) A side-to-side click feeling kc3 is effected at the boundary between the cold water discharge range and the heated water mixed discharge range, and a side-to-side click feeling kc4 is effected at the boundary between the heated water mixed discharge range and the heated water discharge range.

In (C31), the side-to-side click feeling kc3 may be different from the side-to-side click feeling kc4.

(C4) above may be combined with (C41) below.
(C41) A side-to-side click feeling kc5 is effected at the boundary between the cold water discharge range and the heated water mixed discharge range in which the ratio of cold water is high, a side-to-side click feeling kc6 is effected between the heated water mixed discharge range in which the ratio of cold water is high and the heated water mixed discharge range in which the ratio of cold water is low, and a side-to-side click feeling kc7 is effected between the heated water mixed discharge range in which the ratio of cold water is low and the heated water discharge range.

In (C41), at least two or all three selected from the side-to-side click feeling kc5, the side-to-side click feeling kc6, and the side-to-side click feeling kc7 may be different from each other.

(C5) above may be combined with (C51) below.
(C51) A side-to-side click feeling kc8 is effected at the boundary between the cold water discharge range and the heated water mixed discharge range in which the use frequency is high, and a side-to-side click feeling kc9 is effected at the boundary between the heated water mixed discharge range in which the use frequency is high and the heated water mixed discharge range in which the use frequency is not high.

In (C51), the side-to-side click feeling kc8 may be different from the side-to-side click feeling kc9.

(C6) above may be combined with (C61) below.
(C61) A side-to-side click feeling kc10 is effected at the boundary between the cold water discharge range and the heated water mixed discharge range in which the use frequency is high, a side-to-side click feeling kc11 is effected at the boundary between the heated water mixed discharge range in which the use frequency is high and the heated water mixed discharge range in which the use frequency is not high, and a side-to-side click feeling kc12 is effected between the heated water mixed discharge range in which the use frequency is not high and the heated water discharge range.

In (C61), at least two or all three selected from the side-to-side click feeling kc10, the side-to-side click feeling kc11, and the side-to-side click feeling kc12 may be different from each other.

In Form (A) above, preferably, the lever side-to-side position is divided into a plurality of ranges, and a back-and-forth click feeling is varied for these individual ranges. Moreover, in (C) above, preferably, the lever side-to-side position is divided into a plurality of ranges, and a side-to-side click feeling is varied for these individual ranges. Furthermore, as shown in (C11), (C21), (C31), (C41), (C51), and (C61) above, a side-to-side click feeling may be effected at the boundary between a plurality of the divided ranges. The side-to-side click feeling at this boundary can be combined with any forms described in the present application.

The difference in a back-and-forth click feeling in Forms (A) and (B) above includes the following.
(X1) The presence or absence of a back-and-forth click feeling.
(X2) The difference in a sensation of a back-and-forth click feeling.
(X3) The difference in the count of a back-and-forth click feeling.
(X4) The difference in the interval of a back-and-forth click feeling.
(X5) A combination of two or more selected from (X1) to (X4) above.

From the viewpoint of putting impotence on saving heated water, Difference (X1) that the difference in a sensation is noticeable is preferable. Moreover, in the case where it is desired to recognize a plurality of ranges for the lever side-to-side position, preferably, the information obtained from the difference in a back-and-forth click feeling is increased from (X5) above, and the combination of Difference (X1) and Difference (X3), for example, is preferable.

A sensation of a back-and-forth click feeling includes a sensation of a tactile sense (a resistance, for example) and a sensation of a hearing sense (a sound). Difference (X2) above includes the difference in resistances and the difference in sounds. The difference in sounds includes the difference in the frequency of the sounds.

For example, Difference (X2) above can be implemented by varying the depths of recesses and/or the heights of projections. For example, Difference (X3) above can be implemented by varying the number of recesses and/or the number of projections. For example, Difference (X4) above can be implemented by varying the spacing between recesses and/or the spacing between projections. The count in Difference (X3) above means the number of times of a back-and-forth click feeling generated in the entire range of back-and-forth rotation, for example, (the count N described above).

In the present application, other inventions not included in claims (including independent claims) are described as well. The forms, the members, the configurations, and the combinations thereof described in claims and the embodiments of the present application are recognized as the inventions based on the operations and the effects included in the forms, the members, the configurations, and the combinations.

The forms, the members, and the configurations, for example, shown in the foregoing embodiments are individually applicable to all the inventions described in the present application including the inventions according to claims of the present application even if all the forms, the members, or the configurations of these embodiments are not included.

INDUSTRIAL APPLICABILITY

The present invention is applicable to mixer taps for use in any purposes.

REFERENCE CHARACTER LIST

10 Mixer tap
12 Mixer tap main body
14 Handle
16 Discharge portion
18 Heated water inlet pipe
20 Cold water inlet pipe
22 Discharge pipe
40 Lever assembly
42 Housing
44 Rotating body
46 Lever
48 Lever shaft
50 Side-to-side click elastic member
52 Side-to-side click ball (contact member)
54 Shaft holder
56 Back-and-forth click ball (contact member)
58 Back-and-forth click elastic member
60 Movable valve body
62 Fixing valve body
64, 65 Packing
68 Base body
80 Heated water valve hole
80L Top surface opening line of the heated water valve hole
82 Cold water valve hole
82L Top surface opening line of the cold water valve hole
84 Mixed water valve hole
84L Top surface opening line of the mixed water valve hole
86 Upper side member of the movable valve body
88 Lower side member of the movable valve body
94 Passage forming recess
98 Lever engaging recess
100 Shaft hole of the lever
106 Lever insertion hole
108 Shaft hole of the rotating body
110 Ball through hole
170, 170a, 170b, 170c Projection
420 Housing
421 Housing
PL1 Flat smooth surface of the top surface of the fixed valve body
PL2 Flat smooth surface of the under surface of the movable valve body
W1 First wall surface portion
W2 Second wall surface portion
W3 Third wall surface portion
W4 Fourth wall surface portion
SL1 Inclined surface of the first wall surface portion
SL2 Inclined surface of the second wall surface portion
SL3 Inclined surface of the third wall surface portion
SL4 Inclined surface of the fourth wall surface portion
ST Straight portion
X Region surrounded by the top surface opening line of the heated water valve hole
Y Region surrounded by the top surface opening line of the cold water valve hole
Z Region surrounded by the under surface opening line of the passage forming recess
XZ Overlapped region of the region X with the region Z
YZ Overlapped region of the region Y with the region Z
D1 Linear direction of moving the movable valve body
D2 Direction of the back-and-forth rotation of the lever in a planar view seen from the upper side

The invention claimed is:

1. A mixer tap comprising:
a lever;
a temperature adjusting mechanism configured to enable adjusting a discharge water temperature by rotating the lever from side to side;
a discharge amount adjustment mechanism configured to enable adjusting a discharge amount by rotating the lever back and forth;
a first member that is rotated in conjunction with side to side rotation of the lever and moved in conjunction with back and forth rotation of the lever;
a second member that is rotated in conjunction with rotation of the lever from side to side and not moved by rotating the lever back and forth; and
a fixed member that is not moved and not rotated in conjunction with any manipulations of the lever;
a side-to-side click mechanism configured to effect a side-to-side click feel in association with rotation of the lever from side to side using relative rotation between the second member and the fixed member; and
a back-and-forth click mechanism configured to effect a back-and-forth click feel in association with rotation of the lever back and forth using relative displacement between the first member and the fixed member, wherein:
the back-and-forth click feel is varied depending on the lever side-to-side position.

2. The mixer tap according to claim 1, comprising:
a mixer tap main body;
a housing provided in the mixer tap main body;
a fixed valve body provided in the housing and including a heated water valve hole, a cold water valve hole, and a discharge valve hole;
a movable valve body slidably disposed on a top surface of the fixed valve body and including a passage forming recess and a lever engaging hole;

wherein the lever is rotatable from side to side and back and forth; and a rotating body configured to rotatably support the lever back and forth, wherein:

the movable valve body is turned with respect to the fixed valve body by turning the lever, and a mixing ratio between heated water and cold water is adjustable by the turn of the movable valve body;

the movable valve body is moved with respect to the fixed valve body by rotating the lever back and forth about a lever shaft, and a discharge amount is adjusted by the movement;

the first member is the movable valve body;

the second member is the rotating body; and the fixed member is the housing or the fixed valve body.

3. The mixer tap according to claim 1, comprising:

a mixer tap main body;

a housing provided in the mixer tap main body;

a fixed valve body provided in the housing and including a heated water valve hole, a cold water valve hole, and a discharge valve hole;

a movable valve body slidably disposed on a top surface of the fixed valve body and including a passage forming recess and a lever engaging hole;

a rotating body including a lever insertion hole penetrating in a vertical direction and a lever shaft holding hole penetrating in a lateral direction;

wherein the lever is inserted into the lever insertion hole and includes a lever shaft insertion hole;

a lever shaft inserted into the lever shaft holding hole and the lever shaft insertion hole and configured to rotatably support the lever back and forth;

an elastic member; and a contact member, wherein:

the movable valve body is turned with respect to the fixed valve body by turning the lever, and a mixing ratio between heated water and cold water is adjustable by the turn of the movable valve body;

the movable valve body is moved with respect to the fixed valve body by rotating the lever back and forth about the lever shaft, and a discharge amount is adjusted by the movement;

the elastic member is disposed on an upper side or a lower side of the movable valve body;

the contact member is supported by the elastic member;

an under surface of the housing or a top surface of the fixed valve body includes a contact surface enabled to contact the contact member supported by the elastic member;

the contact surface includes at least one of a recess and a projection;

the contact member is moved with respect to the contact surface in association with the movement of the movable valve body; and engagement is made and engagement is released between the recess or the projection and the contact member in the movement, and the engagement or the releasing of engagement between the recess or the projection and the contact member causes the back-and-forth click feel.

4. The mixer tap according to claim 1, wherein:

the back-and-forth click feel is varied between a cold water discharge position and a heated water mixed discharge position, where the heated water mixed discharge position includes a position at which heated water is at 100%.

5. The mixer tap according to claim 1, wherein:

the back-and-forth click feel is varied among a cold water discharge position, a heated water mixed discharge position at which a ratio of cold water is high, and a heated water mixed discharge position at which a ratio of cold water is low, where the heated water mixed discharge position at which a ratio of cold water is low includes a position at which heated water is at 100%.

6. The mixer tap according to claim 1, wherein:

the back-and-forth click feel is varied among a cold water discharge position, a heated water mixed discharge position, and a heated water discharge position, where the heated water mixed discharge position does not include a position at which heated water is at 100%.

7. The mixer tap according to claim 1, wherein:

the back-and-forth click feel is varied among a cold water discharge position, a heated water mixed discharge position at which a ratio of cold water is high, a heated water mixed discharge position at which a ratio of cold water is low, and a heated water discharge position.

8. The mixer tap according to claim 1, wherein:

the back-and-forth click feel is varied among a cold water discharge position, a heated water mixed discharge position at which a use frequency is high, and a heated water mixed discharge position at which a use frequency is not high, where the heated water mixed discharge position at which a use frequency is not high includes a position at which heated water is at 100%.

9. The mixer tap according to claim 1, wherein:

the back-and-forth click feel is varied among a cold water discharge position, a heated water mixed discharge position at which a use frequency is high, a heated water mixed discharge position at which a use frequency is not high, and a heated water discharge position, where the heated water mixed discharge position at which a use frequency is not high does not include heated water at 100%.

10. A mixer tap comprising:

a lever;

a temperature adjusting mechanism configured to enable adjusting a discharge water temperature by rotating the lever from side to side;

a discharge amount adjustment mechanism configured to enable adjusting a discharge amount by rotating the lever back and forth;

a member that is rotated in conjunction with side to side rotation of the lever and moved in conjunction with back and forth rotation of the lever;

a fixed member that is not moved and not rotated in conjunction with any manipulations of the lever; and a back-and-forth click mechanism configured to effect a back-and-forth click feel by using relative displacement between the member and the fixed member in association with rotation of the lever back and forth, wherein:

the back-and-forth click feel is varied depending on a lever side-to-side position; and the variation is caused by a difference in the back-and-forth click mechanism.

11. A mixer tap comprising:

a lever;

a temperature adjusting mechanism configured to enable adjusting a discharge water temperature by rotating the lever from side to side;

a discharge amount adjustment mechanism configured to enable adjusting a discharge amount by rotating the lever back and forth;

a member that is rotated in conjunction with side to side rotation of the lever and moved in conjunction with back and forth rotation of the lever; and a fixed member that is not moved and not rotated in conjunction with any manipulations of the lever, wherein:

a back-and-forth click mechanism that is configured to generate a back-and-forth click by engagement or releasing of engagement between the member and the fixed member achieved through changing relative displacement between the member and the fixed member; and at least one selected from the group consisting of the following (a), (b), (c) and (d) is varied depending on a lever side-to-side position:

(a) presence or absence of the back-and-forth click;
(b) the number of times of the back-and-forth click generated in an entire range of the back and forth rotation;
(c) interval of the back-and-forth click in the back and forth rotation of the lever; and
(d) resistance force of the back-and-forth click in the back and forth rotation of the lever.

* * * * *